(12) United States Patent
Ho et al.

(10) Patent No.: US 12,404,356 B2
(45) Date of Patent: Sep. 2, 2025

(54) METHOD FOR COMPOSITE DELAMINATION

(71) Applicant: GRST SINGAPORE PTE. LTD., Singapore (SG)

(72) Inventors: Kam Piu Ho, Hong Kong (CN); Yingkai Jiang, Shenzhen (CN); Yangjian Dong, Mianyang (CN)

(73) Assignee: GRST SINGAPORE PTE. LTD., Singapore (SG)

( * ) Notice: Subject to any disclaimer, the term of this patent is extended or adjusted under 35 U.S.C. 154(b) by 492 days.

(21) Appl. No.: 17/912,038

(22) PCT Filed: Dec. 25, 2020

(86) PCT No.: PCT/CN2020/139555
§ 371 (c)(1),
(2) Date: Sep. 16, 2022

(87) PCT Pub. No.: WO2021/253787
PCT Pub. Date: Dec. 23, 2021

(65) Prior Publication Data
US 2023/0138359 A1    May 4, 2023

(30) Foreign Application Priority Data

Jun. 17, 2020 (WO) ............... PCT/CN2020/096672
Aug. 19, 2020 (WO) ............... PCT/CN2020/110065
(Continued)

(51) Int. Cl.
*C08F 22/02* (2006.01)
*C08F 6/12* (2006.01)
*C08F 22/30* (2006.01)

(52) U.S. Cl.
CPC ............ *C08F 22/02* (2013.01); *C08F 6/12* (2013.01); *C08F 22/30* (2013.01)

(58) Field of Classification Search
CPC .. C08F 22/02; C08F 22/30; C08F 6/12; B29B 17/02; B29B 2017/0021;
(Continued)

(56) References Cited

U.S. PATENT DOCUMENTS

| | | | |
|---|---|---|---|
| 10,205,200 B2 * | 2/2019 | Ho | H01M 10/0525 |
| 11,721,850 B2 * | 8/2023 | Bai | H01M 10/54 |
| | | | 429/231.8 |

(Continued)

FOREIGN PATENT DOCUMENTS

| | | | | |
|---|---|---|---|---|
| CN | 106750506 A | | 5/2017 | |
| CN | 109478698 A | * | 3/2019 | ........ H01M 10/0525 |

(Continued)

OTHER PUBLICATIONS

International Search Report of PCT Patent Application No. PCT/CN2020/139555 issued on Mar. 29, 2021.
(Continued)

*Primary Examiner* — Bayan Salone

(57) ABSTRACT

Provided is a method for delaminating a composite by immersing the composite into a delamination solution; wherein the composite comprises a substrate and a coating applied on one side or both sides of the substrate comprising a polymeric binder; and wherein the polymeric binder comprises a copolymer comprising a structural unit derived from an acid group-containing monomer. The use of weak acid-containing delamination solution allows for complete delamination of the composite in a highly efficient manner. Furthermore, the delamination method disclosed herein circumvents complex separation process, contamination and corrosion of substrate and enables an excellent materials recovery. An application of the method for delaminating an electrode for a battery is also disclosed.

23 Claims, 4 Drawing Sheets

(30) Foreign Application Priority Data

| | | | |
|---|---|---|---|
| Aug. 19, 2020 | (WO) | ................ | PCT/CN2020/110105 |
| Sep. 25, 2020 | (WO) | ................ | PCT/CN2020/117615 |
| Sep. 25, 2020 | (WO) | ................ | PCT/CN2020/117738 |
| Sep. 25, 2020 | (WO) | ................ | PCT/CN2020/117767 |
| Sep. 25, 2020 | (WO) | ................ | PCT/CN2020/117789 |
| Nov. 16, 2020 | (WO) | ................ | PCT/CN2020/129129 |

(58) Field of Classification Search
CPC ........ B29B 2017/0293; B09B 2101/16; B09B 3/40; B09B 3/70; B29L 2009/008; H01M 6/52; H01M 10/0525; H01M 10/54; H01M 50/105; H01M 4/366; H01M 4/5825; H01M 4/587; H01M 4/62; H01M 4/621; H01M 4/625; H01M 4/04; H01M 4/0404; H01M 4/622; Y02E 60/10; Y02W 30/62; Y02W 30/84
See application file for complete search history.

(56) References Cited

U.S. PATENT DOCUMENTS

| | | | | |
|---|---|---|---|---|
| 12,080,861 | B2 * | 9/2024 | Sloop | ................ H01M 10/0525 |
| 2018/0013181 | A1 * | 1/2018 | Ho | .......................... H01M 6/52 |
| 2018/0069230 | A1 * | 3/2018 | Lee | ........................ H01G 11/32 |
| 2019/0260100 | A1 * | 8/2019 | Sloop | .................... H01M 4/131 |
| 2020/0328482 | A1 * | 10/2020 | Ho | ........................ H01M 10/54 |

FOREIGN PATENT DOCUMENTS

| | | | | | |
|---|---|---|---|---|---|
| CN | 106750506 | B | * | 7/2019 | .............. C08J 11/00 |
| CN | 110233235 | A | * | 9/2019 | ........ H01M 10/0525 |
| JP | 2003260437 | A | * | 9/2003 | .......... B29B 17/021 |
| JP | 2006331707 | A | * | 12/2006 | |
| KR | 20130099568 | A | * | 9/2013 | |
| KR | 20200043844 | A | * | 4/2020 | |

OTHER PUBLICATIONS

European Search Report of European Patent Application No. 20941173.5 issued on Apr. 10, 2024.

* cited by examiner

METHOD FOR COMPOSITE DELAMINATION

CROSS-REFERENCE TO RELATED APPLICATIONS

This is a U.S. national stage application of the International Patent Application No. PCT/CN2020/139555, filed Dec. 25, 2020, which claims the benefit under 35 U.S.C. § 365(c) of International Patent Application No. PCT/CN2020/096672, filed Jun. 17, 2020, International Patent Application No. PCT/CN2020/110065, filed Aug. 19, 2020, International Patent Application No. PCT/CN2020/110105, filed Aug. 19, 2020, International Patent Application No. PCT/CN2020/117615, filed Sep. 25, 2020, International Patent Application No. PCT/CN2020/117738, filed Sep. 25, 2020, International Patent Application No. PCT/CN2020/117767, filed Sep. 25, 2020, International Patent Application No. PCT/CN2020/117789, filed Sep. 25, 2020 and International Patent Application No. PCT/CN2020/129129, filed Nov. 16, 2020, the content of all of which are incorporated herein by reference in their entireties.

FIELD OF THE INVENTION

The present invention relates to the field of methods of materials recycling. In particular, this invention relates to a method of delamination of a composite comprising a substrate and a coating applied on one side or both sides of the substrate.

BACKGROUND OF THE INVENTION

The increasing urbanization, rapid development of technology innovations and consequent frequent replacement of products or disposal of waste consumables have resulted in shorter lifespans for products and/or over-production of waste. With the emergence of the growing problems associated with waste over-generation such as detrimental effects on human health, adverse environmental impacts and resource depletion, there has been an urge in taking prompt actions to resolve these complications worldwide using various means of waste processing.

Recycling, being a key component in waste reduction hierarchy, aims to recover invaluable materials from waste for reuse. Recycling of materials brings about conservation of natural resources, reduction in energy consumption (and hence, production costs) associated with extraction of raw materials and alleviates environmental impacts by reducing greenhouse gases and $SO_x$ emissions. Owing to the substantial benefits that materials recycling has to offer, developing highly efficient methods to recycle materials is of utmost importance in achieving a circular economy.

Separation of composites is a technique that is heavily involved in materials recycling. The term "composite" refers to a metal substrate with a coating applied on one side or both sides of the metal substrate, wherein the coating comprises a polymeric binder. The polymeric binder is responsible for the adhesion between the coating and the metal substrate. Application of a coating on a metal substrate is a way for altering surface properties to meet performance requirement in a variety of technical applications. It has been utilized for purposes of adhesion, barrier formation, scratch and abrasion resistance, chemical resistance, wettability, biocompatibility, etc. Coating on a metal substrate has been frequently adopted in battery manufacturing, membrane technology, packaging materials, printed circuit boards, wirings or cables and biomedical applications.

However, as the products have reached their end-of-life or with the generation of product rejects during the manufacturing process which are ready for immediate recycling, undergoing the step of separation of the composites contained within the products during recycling is presented with several difficulties.

In one respect, the delamination of the composite might occur within the bulk layer of the composite constituents, rather than at the coating-metal substrate interface. For example, separation of the composite takes place at the bulk of the coating where the coating is not fully delaminated from the metal substrate with parts of coating remain intact on the metal substrate.

This will give rise to an undesirable recovery loss of coating materials and a reclaimed metal substrate with high levels of impurities that requires introduction of subsequent separation process. In another respect, delamination of the coating from the metal substrate might be highly inefficient, taking up to several hours. Exposing the composite to drastic delamination conditions for a sustained period of time is likely to cause side effects such as corrosion, dissolution and damage of composite constituents, generation of side reaction products, etc.

In further respect, aqueous polymeric binders that are suitable for use in water-based coating exhibit superior dispersion and stability in water, and hence are capable of promoting an exceptionally strong coating-metal substrate adhesion, with which poses an additional challenge in the delamination of water-based coating from their associated metal substrates in the subsequent recycling stage.

The use of aqueous polymeric binder in the composite is preferred in the present invention. Commonly used polymeric binders responsible for coating-metal substrate adhesion, such as polyvinylidene fluoride (PVDF), have their own downsides, being their insolubility in water and can only dissolve in some specific organic solvents such as N-methyl-2-pyrrolidone (NMP) which is flammable and toxic and hence requires specific handling. An NMP recovery system must be in place during the drying process to recover NMP vapors. This will generate significant costs in the manufacturing process since it requires a large capital investment. Therefore, for applications where exposure to moisture in the manufacturing process is not a significant concern, the use of polymeric binders that utilizes less expensive and more environmentally-friendly solvents, such as aqueous solvents, most commonly water, is preferred in the present invention since it can reduce the large capital cost of the recovery system.

Delamination of composite is achieved via bond disruption and/or breakage between the polymeric binder comprised in the coating and the metal substrate at the coating-metal substrate interface. However, with the many polymeric binders of different compositions being developed that display varying specific properties, it would be highly implausible for a single delamination method to be applicable in the separation of composites regardless of the compositions of the polymeric binders contained within.

In view of the above, attempts have been made in developing a method in attaining complete delamination of composite.

KR Patent Application Publication No. 20130099568 A discloses a method for separating a composite comprising a polymer film coated on a metal surface by carbonizing the polymer using an electromagnetic induction phenomenon. The metal-polymer composite is first subjected to a step of pre-treatment wherein the polymer-metal composite is charged in an induction furnace so as to receive the maximum influence of magnetic density per unit area during induction heating, making the movement of electrons on the metal surface more active. Through induction heating, the metal-polymer composite is then heated up to 500-900° C. which weakens the binding force between the polymer and the metal surface, subsequently induces the thermal decomposition of the polymer coated on the metal surface and allows for easy separation. This method offers significant energy savings by employing an induction heating practice. However, the proposed method brings about the carbonization of the polymer where reclaim of the polymer is not possible. Furthermore, hazardous or toxic pollutants might be produced in the process of polymer decomposition.

In view of the above-mentioned challenges, there is always a need to develop a unified and simple method to achieve highly efficient and complete delamination of composite at the coating-metal substrate interface, wherein the coating in the composite comprises aqueous polymeric binder. The method for delamination of composite disclosed herein is developed to achieve bond disruption and/or breakage between an aqueous polymeric binder in the coating of the composite and the metal substrate. The polymeric binder comprises a copolymer comprising a structural unit derived from an acid group-containing monomer. A delamination method that fulfills these qualities is applicable to composite comprising aqueous polymeric binder and would circumvent both complex separation process and contamination of metal substrate, enable an excellent materials recovery and allow the delamination of composite to be accomplished within a short time frame.

SUMMARY OF THE INVENTION

The aforementioned needs are met by various aspects and embodiments disclosed herein. In one aspect, provided herein is a method for delaminating a composite by immersing the composite into a delamination solution; wherein the composite comprises a substrate and a coating applied on one side or both sides of the substrate comprising a polymeric binder; and wherein the polymeric binder comprises a copolymer comprising a structural unit derived from an acid group-containing monomer.

In some embodiments, the substrate is a metal substrate. In some embodiments, the substrate is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof. In some embodiments, the substrate further comprises an electrically-conductive resin.

In some embodiments, the delamination solution comprises a delamination agent and an aqueous solvent.

In some embodiments, the delamination agent is a weak acid. In some embodiments, the weak acid is an organic acid. In some embodiments, the organic acid is selected from the group consisting of formic acid, acetic acid, glycolic acid, glyoxylic acid, oxalic acid, propionic acid, acrylic acid, propiolic acid, lactic acid, 3-hydroxipropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutiric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid or combinations thereof.

Delamination of a composite attained using the method provided herein is swift and straightforward and does not incur a penalty in terms of suffering from recovery loss of coating materials, damaging coating materials and introducing impurities in metal substrates.

In another aspect, as one of the applications of the present invention, the aforementioned method is employed in delaminating a battery electrode, wherein the composite is a battery electrode, the substrate is a current collector and the coating is an electrode layer. Provided herein is a method for delaminating a battery electrode by immersing the electrode into a delamination solution; wherein the electrode comprises a current collector and an electrode layer coated on one side or both sides of the current collector comprising a polymeric binder; and wherein the polymeric binder comprises a copolymer comprising a structural unit derived from an acid group-containing monomer.

The simple utilization of a delamination solution in the present invention to delaminate a battery electrode at the electrode layer-current collector interface can drastically shorten the time taken to achieve complete delamination, maximize invaluable materials recovery, eliminate contamination of current collector and prevent the need for subsequent downstream processing. Furthermore, the method disclosed herein is found to be applicable to the delamination of both cathodes and anodes without presenting corrosion concerns to the current collector and/or electrode active materials within the electrode layer.

DETAILED DESCRIPTION OF THE INVENTION

Figure 1:
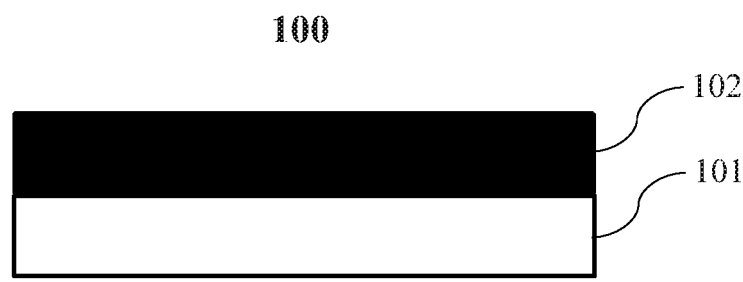
FIG. 1 shows a simplified view of an embodiment of a composite.

In one aspect, provided herein is a method for delaminating a composite by immersing the composite into a delamination solution; wherein the composite comprises a substrate and a coating applied on one side or both sides of the substrate comprising a polymeric binder; and wherein the polymeric binder comprises a copolymer comprising a structural unit derived from an acid group-containing monomer.

In another aspect, provided herein is a method for delaminating a lithium-ion battery electrode by immersing the electrode into a delamination solution; wherein the electrode comprises a current collector and an electrode layer coated on one side or both sides of the current collector comprising a polymeric binder; and wherein the polymeric binder comprises a copolymer comprising a structural unit derived from an acid group-containing monomer.

The term "electrode" refers to a "cathode" or an "anode."

The term "positive electrode" is used interchangeably with cathode. Likewise, the term "negative electrode" is used interchangeably with anode.

The term "polymeric binder", "binder" or "binder material" refers to a chemical compound, mixture of compounds, or polymer that is used to hold material(s) in place and adhere them onto a conductive metal substrate to form a composite. In some embodiments, the polymeric binder refers to a chemical compound, mixture of compounds, or polymer that is used to hold an electrode material and/or a conductive agent in place and adhere them onto a conductive metal part to form an electrode. In some embodiments, the electrode does not comprise any conductive agent. In some embodiments, the polymeric binder forms a colloid in an aqueous solvent such as water. In some embodiments, the polymeric binder forms a solution or dispersion in an aqueous solvent such as water.

The term "conductive agent" refers to a material which is chemically inactive and has good electrical conductivity. Therefore, the conductive agent is often mixed with an electrode active material at the time of forming an electrode to improve electrical conductivity of the electrode.

The term "composite" refers to a metal substrate with a coating applied on one side or both sides of the metal substrate.

The term "bulk" refers to the main body of a mass of solid or liquid material as compared to the surface where all types of interactions occur.

The term "polymer" refers to a compound prepared by polymerizing monomers, whether of the same or a different type. The generic term "polymer" embraces the terms "homopolymer" as well as "copolymer".

The term "homopolymer" refers to a polymer prepared by the polymerization of the same type of monomer.

The term "copolymer" refers to a polymer prepared by the polymerization of two or more different types of monomers.

The term "unsaturated" as used herein, refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, $(C_1-C_8)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, $(C_3-C_7)$cycloalkyl groups, such as cyclopropyl, cyclobutyl, cyclopentyl, cyclohexyl, and cycloheptyl, and saturated cyclic and bicyclic terpenes and $(C_3-C_7)$cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, or 2-propenyl, which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, or tolanyl group, sexiphenylene, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to a $C_1$ to $C_{30}$ alkyl group, a $C_2$ to $C_{30}$ alkenyl group, a $C_2$ to $C_{30}$ alkynyl group, a $C_1$ to $C_{30}$ alkylene group, a $C_2$ to $C_{30}$ alkenylene group, or a $C_2$ to $C_{30}$ alkynylene group. In some embodiments, the alkyl group contains at least 2, 3, 4, 5, 6, 7, or 8 carbon atoms.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. Examples of substituents include, but are not limited to, halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —$CO_2CH_3$; —$CONH_2$; —$OCH_2CONH_2$; —$NH_2$; —$SO_2NH_2$; —$OCHF_2$; —$CF_3$; —$OCF_3$; —NH(alkyl); —N(alkyl)$_2$; —NH(aryl); —N(alkyl)(aryl); —N(aryl)$_2$; —CHO; —CO(alkyl); —CO(aryl); —$CO_2$(alkyl); and —$CO_2$(aryl); and such moieties can also be optionally substituted by a fused-ring structure or bridge, for example —$OCH_2O$—. These substituents can optionally be further substituted with a substituent selected from such groups. All chemical groups disclosed herein can be substituted, unless it is specified otherwise.

The term "halogen" or "halo" refers to F, Cl, Br or I.

The term "monomeric unit" refers to the constitutional unit contributed by a single monomer to the structure of a polymer.

The term "structural unit" refers to the total monomeric units contributed by the same monomer type in a polymer.

The term "acid salt group" refers to the acid salt formed when an acid reacts with a base. In some embodiments, the proton of the acid is replaced with a metal cation. In some embodiments, the proton of the acid is replaced with an ammonium ion. In some embodiments, acid salt group is formed when an acid reacts with water.

The term "planetary mixer" refers to an equipment that can be used to mix or stir different materials for producing a homogeneous mixture, which consists of blades conducting a planetary motion within a vessel. In some embodiments, the planetary mixer comprises at least one planetary blade and at least one high-speed dispersion blade. The planetary and the high-speed dispersion blades rotate on their own axes and also rotate continuously around the vessel. The rotation speed can be expressed in unit of rotations per minute (rpm) which refers to the number of rotations that a rotating body completes in one minute.

The term "ultrasonicator" refers to an equipment that can apply ultrasound energy to agitate particles in a sample. Any ultrasonicator that can disperse the slurry disclosed herein can be used herein. Some non-limiting examples of the ultrasonicator include an ultrasonic bath, a probe-type ultrasonicator, and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication.

The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "applying" refers to an act of laying or spreading a substance on a surface.

The term "current collector" refers to any conductive substrate, which is in contact with an electrode layer and is capable of conducting an electrical current flowing to electrodes during discharging or charging a secondary battery. Some non-limiting examples of the current collector include a single conductive metal layer or substrate and a single conductive metal layer or substrate with an overlying conductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer, which is in contact with a current collector, that comprises an electrochemically active material. In some embodiments, the electrode layer is made by applying a coating on to the current collector. In some embodiments, the electrode layer is located on one side or both sides of the current collector. In other embodiments, the three-dimensional porous current collector is coated conformally with an electrode layer.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "solid content" refers to the amount of non-volatile material remaining after evaporation.

The term "peeling strength" refers to the amount of force required to separate a current collector and an electrode active material coating that are bonded to each other. It is a measure of the binding strength between such two materials and is usually expressed in N/cm.

The term "adhesive strength" refers to the amount of force required to separate a current collector and a polymeric binder coating that are bonded to each other. It is a measure of the adhesion strength between such two materials and is usually expressed in N/cm.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 ampere-hour (Ah) is the equivalent of 3,600 coulombs of electrical charge. Similarly, the term "milliampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 0 percent to 100 percent. Moreover, any numerical range defined by two R numbers as defined in the above is also specifically disclosed.

Composite as described herein refers to a metal substrate with a coating applied on one side or both sides of the metal substrate, wherein the coating comprises a polymeric binder. FIG. 1 shows a simplified view of the composite, represented by 100. The composite 100 comprises a metal substrate 101 with a coating 102 applied on one side of the metal substrate 101. Applying a coating on a metal substrate, i.e. formation of a composite, is one of the most commonly used techniques in provoking alteration in the surface characteristics of the substrate in meeting performance requirements for various applications. It has been frequently utilized for purposes of protection (e.g. against chemicals, corrosion, scratch and abrasion, etc.), adhesion, wettability modification, biocompatibility, etc. Adhesion between the coating and the metal substrate within the composite is attained via the interactions between the polymeric binder comprised in the coating and the surface of the metal substrate to which the coating is applied on.

The incorporation of an aqueous polymeric binder, that utilizes aqueous solvents, most commonly water, is preferred in the present invention, which forms the basis for the making of a water-based coating. Aqueous polymeric binders are capable of achieving good dispersion and stability in water, and hence can strongly adhere the coating to the metal substrate.

In some embodiments, the polymeric binder comprises a copolymer. In some embodiments, the copolymer comprises a structural unit (a) derived from an acid group-containing monomer. In some embodiments, the copolymer comprises a structural unit (a) derived from an acid group-containing monomer and a structural unit (b) derived from a nitrile group-containing monomer. In some embodiments, the copolymer comprises a structural unit (a) derived from an acid group-containing monomer, a structural unit (b) derived from a nitrile group-containing monomer, a structural unit (c) derived from an amide group-containing monomer or combinations thereof. In some embodiments, the copolymer further comprises a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof.

Each of the above-mentioned monomers that can potentially constitute the make-up of the copolymer independently consists of either a strongly electronegative atom, particularly nitrogen (N), oxygen (O) or fluorine (F) atom (known as a hydrogen bond donor, Dn) that is covalently bonded to a hydrogen (H) atom or another electronegative atom bearing a lone pair of electrons in the outermost electron shell of the atom (known as a hydrogen bond acceptor, Ac). This allows potential hydrogen bond formation with another molecule (e.g. located at the metal substrate surface) of the same feature. Therefore, each of the above-mentioned monomers independently comprises at least one hydrogen bond-forming group. A hydrogen bond forming system is generally denoted as Formula (1) below:

$$\text{Dn-H} \ldots \text{Ac} \qquad \text{Formula (1)}$$

wherein Dn is a hydrogen bond donor; Ac is a hydrogen bond acceptor; the solid line denotes a polar covalent bond and the dotted line indicates a hydrogen bond.

In some embodiments, structural unit (a) derived from an acid group-containing monomer comprises an acid salt group. In some embodiments, an acid salt group is a salt of an acid group. The anion of the acid salt group is capable of forming ion-dipole interactions with a partially positively charged species (for example a partially positively charged metal species, M at the metal substrate surface). In some embodiments, structural unit (a) comprises an alkali metal carboxylic salt group. Examples of an alkali metal forming the alkali metal acid salt include lithium, sodium and potassium. In some embodiments, structural unit (a) comprises an ammonium carboxylic salt group.

In some embodiments, the substrate is a metal substrate. In some embodiments, the substrate is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof. In some embodiments, the substrate further comprises an electrically-conductive resin.

Quite often, metal substrate is exposed to ambient air for a period of time prior to applying a coating on the surface(s) of the metal substrate. Ambient air contains primarily oxygen, water and several organic and inorganic species.

Upon exposure of metal substrate to naturally occurring oxygen in the atmosphere, it is inevitable for metal oxide to be developed on the metal substrate surface(s). For example, metallic aluminium is naturally very reactive with atmospheric oxygen, initiating the formation of aluminium oxide on the exposed aluminium surface(s). This aluminium oxide protects the aluminium contained within from undergoing further oxidation and consequently develops a good corrosion resistance. As the metal oxide on the surface of the metal substrate comes into contact with moisture in ambient air, hydroxylation of the metal oxide occurs, enriching the surface of the metal oxide with hydroxyl (—OH) groups. However, an overabundance of hydroxyl groups tends to make a metal substrate surface hygroscopic. For that reason, exposure of metal substrate to ambient air for a prolong period of time is not recommended.

The hydroxyl group at the metal substrate surface consists of a H atom covalently bonded to a more electronegative O atom and an electronegative O atom bearing a lone pair of electrons in the outmost electron shell, either of which is capable of forming hydrogen bond with another molecule (e.g. a monomer that assists in the construction of the polymeric binder in the coating) of the same feature (i.e. containing a H atom which is covalently bonded to a hydrogen bond donor and/or a hydrogen bond acceptor).

Meanwhile, metal parts of the substrate are still present on the metal substrate surface in forms of a partially positively charged metal species ($M^{\delta+}$), as part of an ionic lattice, for example in the metal oxide developed on the metal substrate surface.

Figure 2:
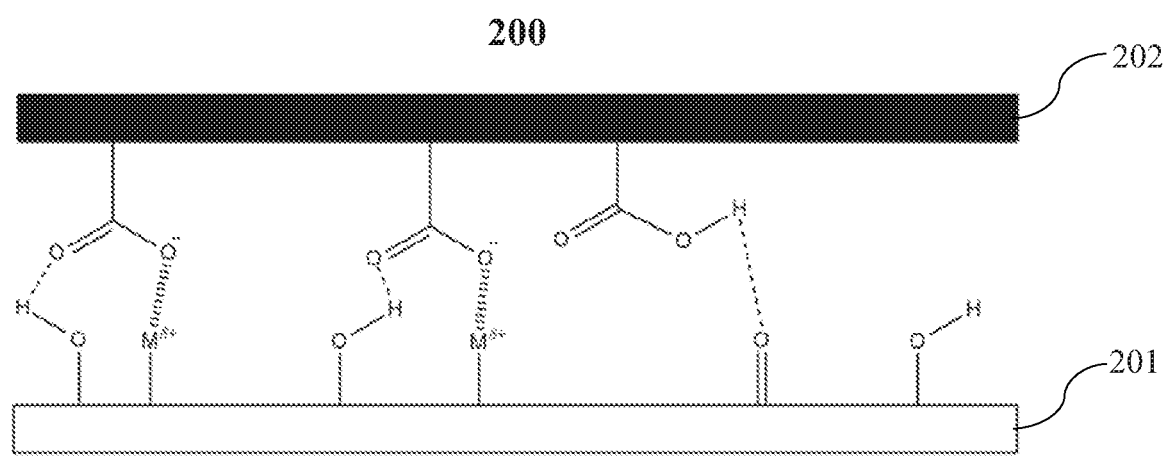
FIG. 2 illustrates a schematic of the proposed coating-metal substrate interfacial structure of a composite.

FIG. 2 illustrates a schematic of the proposed coating-metal substrate interfacial structure of a composite, represented by 200. Hydroxyl (—OH) groups, partially positively charged metal species ($M^{\delta+}$) and oxygen (O) atoms of the metal oxide are present on the surface of the metal substrate 201. Polymeric binder contained within the coating 202 and/or at the surface of the coating 202 comprises a copolymer comprising structural units derived from a carboxylic acid group-containing monomer. The structural unit derived from a carboxylic acid group-containing monomer in this case comprises a carboxylic salt group, wherein a carboxylic salt group is a salt of a carboxylic acid group.

Oxygen (O) and hydrogen (H) atoms present in the copolymer of polymeric binder are likely to interact with the O and/or H atoms of the hydroxyl groups and the O atom(s) in metal oxide at the metal substrate surface via hydrogen bond formations. In addition, an ion-dipole interaction is exerted between the anion of the carboxylic salt group, $COO^-$ in this case, contained within polymeric binder and the $M^{\delta+}$ species at the metal substrate surface. Hydrogen bonding and/or ion-dipole attractions are the two types of interactions primarily formed at the coating-metal substrate interface and thus independently contribute considerably to the adhesion of the coating onto the surface of the metal substrate.

Interactions between the coating and the metal substrate surface could proceed through other means, for instance via ionic interactions, London dispersion forces, dipole-dipole interactions, dipole-induced dipole interactions and ion-induced dipole interactions. However, in consideration of the molecular structures of the polymeric binder contained within the coating and the metal substrate surface, the principal electrostatic interactions that give rise to adhesion of the polymeric binder (and hence the coating) to the metal substrate surface occur via hydrogen bonding and/or ion-dipole interactions. The other interactions mentioned above that could arise between the coating and the surface of the metal surface may also be disrupted based on the proposed mechanism via the introduction of the delamination agent and solvation of charged or partially charged species. These interactions are not displayed for ease of interpretation.

The aqueous polymeric binders disclosed herein are formulated to provide an exceptionally strong coating-metal substrate adhesion for various applications. In some embodiments, the copolymer of the aqueous polymeric binder comprises a structural unit (a) derived from an acid group-containing monomer. In some embodiments, the copolymer of the aqueous polymeric binder comprises a structural unit (a) derived from an acid group-containing monomer and a structural unit (b) derived from a nitrile group-containing monomer.

Based on our studies, the copolymer comprising a structural unit (a) derived from an acid group-containing monomer exhibits a strong adhesive capability. Meanwhile, the copolymer comprising a structural unit (a) derived from an acid group-containing monomer and a structural unit (b) derived from a nitrile group-containing monomer is found to possess an enhanced binding strength in comparison. For that reason, with the adhesive strength being the attribute of utmost importance for a binder material, the presence of both of a structural unit (a) derived from an acid group-containing monomer and a structural unit (b) derived from a nitrile group-containing monomer in the copolymer of the aqueous polymeric binder is recommended. The combination of structural units derived from an acid group-containing monomer and a nitrile group-containing monomer in the copolymer not only severely improves the binding capability of the polymeric binder, but also helps develop abrasion resistance and solvent resistance.

However, the strong adhesion presents an added challenge in the detachment of the coating from its associated metal substrate in the subsequent recycling step as the composite-containing product reaches the end of its usefulness or lifespan or as the product rejects are generated during production.

Delamination of the coating from the metal substrate in the composite is accomplished via bond disruption and/or breakage between the copolymer of polymeric binder comprised in the coating and the metal substrate surface. Copolymers of different compositions that display varying specific properties would require different approaches to separate the coating from the metal substrate. Accordingly, the method of the present invention is specifically developed to delaminate a composite by disrupting and/or breaking the bonds between the aqueous polymeric binders disclosed herein and a metal substrate surface. More specifically, the method of the present invention is developed to delaminate a copolymer comprising a structural unit derived from an acid group-containing monomer from a metal substrate surface. Optionally, the copolymer further comprises a structural unit derived from a hydrogen bond-forming group-containing monomer. The hydrogen bond-forming group-containing monomer may be a nitrile group-containing monomer, an amide group-containing monomer, a hydroxyl group-containing monomer, an ester group-containing monomer, an epoxy group-containing monomer, a fluorine-containing monomer or combinations thereof.

The present invention provides a method for delaminating a composite by immersing the composite into a delamination solution; wherein the composite comprises a substrate and a coating applied on one side or both sides of the substrate comprising a polymeric binder; and wherein the polymeric binder comprises a copolymer comprising a structural unit derived from an acid group-containing monomer.

In some embodiments, delamination of the composite occurs along the coating-metal substrate interface.

In some embodiments, the delamination solution comprises a delamination agent and an aqueous solvent. In some embodiments, the delamination agent is a weak acid. In some embodiments, the aqueous solvent consists solely of water.

Within the delamination solution, a weak acid partially dissociates in an aqueous solvent with the release of a proton (i.e. hydrogen ion $H^+$). The said weak acid dissociation reaction is generally denoted as:

(Equation 1)

wherein HA is a weak acid; $H^+$ is a proton, i.e. a hydrogen ion and $A^-$ is a conjugate base of the weak acid HA.

As the composite is immersed into a delamination solution, the protons released from the partial dissociation of the weak acid interact with the hydroxyl (—OH) groups that are initially formed on the metal substrate surface. This brings about the formation of oxidaniumyl groups ($H_2O^+$) on the metal substrate surface. In other words, the following reaction occurs:

(Equation 2)

wherein M refers to the metal that is used as the metal substrate; a refers to the oxidation state of the metal M and $H_2O^+$ refers to an oxidaniumyl group.

Structural units derived from an acid group-containing monomer, a nitrile group-containing monomer, an amide group-containing monomer, a hydroxyl group-containing monomer, an ester group-containing monomer, an epoxy group-containing monomer, a fluorine-containing monomer or combinations thereof comprised within the copolymer in the polymeric binder constitute some non-limiting examples of functional groups that can form hydrogen bonding with the hydroxyl groups at the metal substrate surface. The formation of oxidaniumyl groups ($H_2O^+$) on the metal substrate surface removes the hydrogen bond-forming sites that are originally present at the metal substrate surface which disrupts and breaks up the hydrogen bonds that are initially formed between the polymeric binder in the coating and the hydroxyl groups at the metal substrate surface. In addition, the weak acid HA and the conjugate base of the weak acid $A^-$ could compete with the polymeric binder over the remaining hydrogen bond-forming sites at the metal substrate surface, further reducing the extent of hydrogen bonding formed between the coating and the metal substrate surface.

Meanwhile, the conjugate base of the weak acid $A^-$ has a tendency to compete with polymeric binder over ion-dipole interacting sites (e.g. partially positively charged metal species $M^{\delta+}$) at the metal substrate surface, which reduces the degree of ion-dipole interactions between the polymeric binder in the coating and $M^{\delta+}$ at the metal substrate surface and thus leads to disruption of the ion-dipole interactions that are initially formed at the coating-metal substrate interface. Furthermore, upon exposure of the composite to a delamination solution, the aqueous solvent (e.g. water) present in the delamination solution brings about disruption to the ion-dipole interactions between the polymeric binder in the coating and $M^{\delta+}$ at the metal substrate surface. Charged and partially charged species (e.g. charged species within the polymeric binder and partially positively charged metal species $M^{\delta+}$ at the metal substrate surface) interact strongly with the aqueous solvent. The aqueous solvent molecules solvate the charged or partially charged species by orientating the appropriate partially charged portion of the molecules towards the charged or partially charged species through electrostatic attraction. This creates solvation shells (hydration shells in the case of water) around each charged or partially charged species which severely diminishes the strength of ion-dipole interactions between the polymeric binder of the coating and the metal substrate. Any acid salt groups and/or acid groups contained within the polymeric binder in the coating may also undergo proton transfer reactions.

Consequently, immersion of the composite into a delamination solution comprising a delamination agent (e.g. a weak acid) and an aqueous solvent (e.g. water) would undoubtedly result in reductions in both hydrogen bonding and ion-dipole interactions between the polymeric binder in the coating and the metal substrate surface, with weak acid primarily responsible for interrupting hydrogen bond interactions and water directed towards diminishing the ion-dipole interactions. With hydrogen bonding and ion-dipole interactions being the two main types of intermolecular forces formed at the coating-metal substrate interface, the combined application of weak acid and water considerably weakens the adhesion of the coating onto the surface of the metal substrate, thereby achieving complete delamination of the coating from the metal substrate with high degrees of efficacy.

Figure 3:
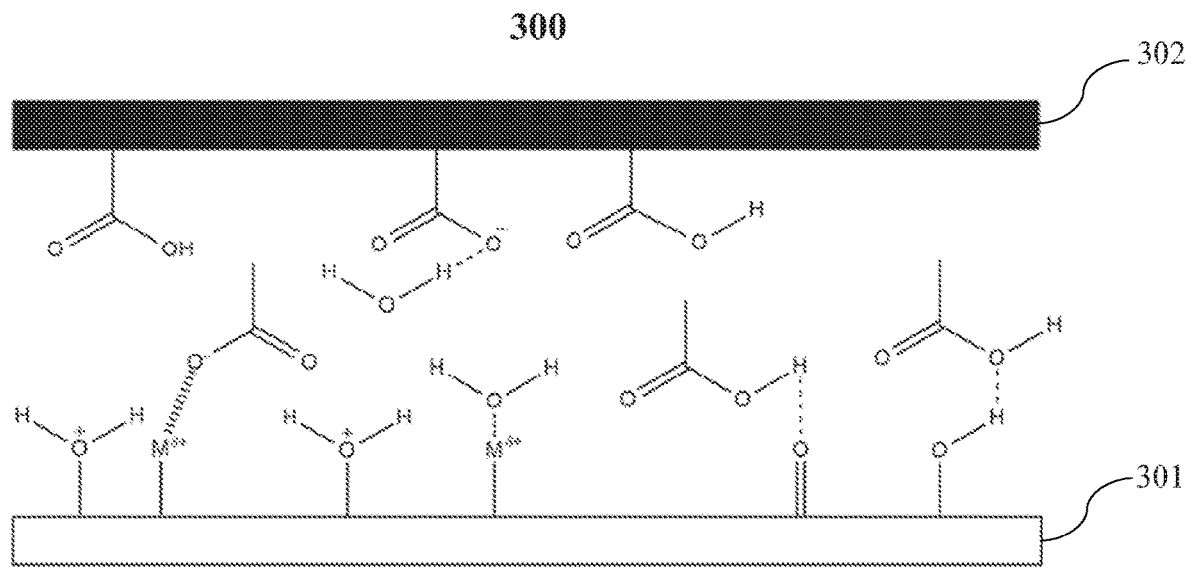
FIG. 3 illustrates a schematic of the proposed coating-metal substrate interfacial structure of a composite when the composite is immersed in a delamination solution.

FIG. 3, represented by 300, illustrates a schematic of the proposed coating-metal substrate interfacial structure of a composite of 200 when the composite is immersed in a delamination solution. The composite 300 comprises a metal substrate 301 with a coating 302 coated on one side of the metal substrate 301. Polymeric binder contained within the coating 302 and/or at the surface of the coating 302 comprises a copolymer comprising structural units derived from a carboxylic acid group-containing monomer. The delamination solution in this case comprises acetic acid (a weak acid) of 0.50 wt % concentration and water.

The acetic acid undergoes partial dissociation with the release of protons (i.e. $H^+$) which interact with the initially formed hydroxyl groups at the metal substrate surface, forming oxidaniumyl groups ($H_2O^+$). This prohibits the hydroxyl groups from acting as hydrogen bond-forming sites which breaks up the hydrogen bonds that are originally formed between the polymeric binder in the coating and the hydroxyl groups at the metal substrate surface. The acetic acid also competes with the polymeric binder over the remaining hydroxyl groups and oxygen atom(s) in the metal oxide (hydrogen bond-forming sites) at the metal substrate surface, further lowering the extent of hydrogen bonds formed between the coating and the metal substrate interface.

Acetate formed from the partial dissociation of acetic acid competes with the polymeric binder over partially positively charged metal species $M^{\delta+}$ (ion-dipole interacting sites) at the metal substrate surface, disrupting the ion-dipole interactions between the polymeric binder and the $M^{\delta+}$ at the metal substrate surface. In addition, the water further diminishes the strength of the ion-dipole interactions between charged species (i.e. anion of the carboxylic salt group $COO^-$ in this case) within the polymeric binder in the coating and the partially positively charged metal species $M^{\delta+}$ at the metal substrate surface by inducing solvation.

The anion of the carboxylic salt group, $COO^-$, within the polymeric binder that is originally present in the coating 202 is also shown to accept a proton in forming a carboxylic acid group, COOH.

The application of acetic acid and water in combination substantially diminishes the adhesion between the coating and metal substrate surface, and thus highly effective and complete delamination of the coating from the metal substrate surface is accomplished.

The method disclosed herein of the present invention is directed towards achieving delamination of a composite by disrupting and/or breaking the hydrogen and/or ion-dipole interactions between a coating and a metal substrate surface via the use of a delamination solution. The proposed method is applicable to a composite comprising a metal substrate and a coating containing aqueous polymeric binders. It is simple and prevents the involvement of complex separation process. The proposed method ensures complete delamination of composite at the coating-metal substrate interface with no contamination of metal substrate which enables exceptional materials recovery and allows the delamination of composite to be achieved with high efficiency.

In some embodiments, the delamination solution comprises a delamination agent and an aqueous solvent.

The delamination solution aims to diminish the strength of interactions between the polymeric binder containing within the coating and the metal substrate surface and thus reduce the adhesion of the polymeric binder to the metal substrate. This brings about the delamination of the coating from the metal substrate. The use of delamination agent and aqueous solvent independently as the delamination solution may be inadequate in attaining a complete delamination of the coating from the metal substrate.

The ionized copolymer constituents mainly interact with the metal substrate surface via ion-dipole interactions. Use of the delamination agent alone as the delamination solution in removal of hydrogen bond-forming sites may be incapable of disrupting the stronger ion-dipole interactions between the ionized copolymer constituents within the coating and the metal substrate surface, and thus complete delamination of the composite could not be achieved.

Meanwhile, the use of aqueous solvent alone as the delamination solution may be insufficient in completely delaminating the coating from the metal substrate as the uncharged copolymer constituents do not possess the ability to interact with the metal substrate surface via ion-dipole interactions. Solvation ability of the aqueous solvent on these uncharged copolymer constituents would be noticeably lower and the interactions, mostly hydrogen bonding, between these copolymer constituents within the coating and the metal substrate surface would often not be disrupted and diminished to an extent where complete delamination of the composite is made possible.

Therefore, a delamination agent and an aqueous solvent are to be used in conjunction as the delamination solution to achieve superior delamination performance of the composite.

In some embodiments, the delamination agent is a weak acid. Weak acid is one that does not fully ionize or dissociate to produce hydrogen ions when dissolved in water. In some embodiments, the weak acid is an organic acid. In some embodiments, the organic acid is selected from the group consisting of formic acid, acetic acid, glycolic acid, glyoxylic acid, oxalic acid, propionic acid, acrylic acid, propiolic acid, lactic acid, 3-hydroxipropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutiric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid or combinations thereof.

In some embodiments, the weak acid is phosphoric acid, nitrous acid or combinations thereof.

In some embodiments, the aqueous solvent is a solution containing water as the major component and a volatile solvent, such as alcohols, lower aliphatic ketones, lower alkyl acetates or the like, as the minor component in addition to water. In some embodiments, the proportion of water in the aqueous solvent is from about 51% to about 100%, from about 51% to about 95%, from about 51% to about 90%, from about 51% to about 85%, from about 51% to about 80%, from about 51% to about 75%, from about 51% to about 70%, from about 55% to about 100%, from about 55% to about 95%, from about 55% to about 90%, from about 55% to about 85%, from about 55% to about 80%, from about 60% to about 100%, from about 60% to about 95%, from about 60% to about 90%, from about 60% to about 85%, from about 60% to about 80%, from about 65% to about 100%, from about 65% to about 95%, from about 65% to about 90%, from about 65% to about 85%, from about 70% to about 100%, from about 70% to about 95%, from about 70% to about 90%, from about 70% to about 85%, from about 75% to about 100%, from about 75% to about 95% or from about 80% to about 100% by weight.

In some embodiments, the proportion of water in the aqueous solvent is more than 50%, more than 55%, more than 60%, more than 65%, more than 70%, more than 75%, more than 80%, more than 85%, more than 90% or more than 95% by weight. In some embodiments, the proportion of water in the aqueous solvent is less than 55%, less than 60%, less than 65%, less than 70%, less than 75%, less than 80%, less than 85%, less than 90% or less than 95% by weight. In some embodiments, the aqueous solvent consists solely of water, that is, the proportion of water in the aqueous solvent is 100% by weight.

Some non-limiting examples of water include tap water, bottled water, purified water, pure water, distilled water, de-ionized water, $D_2O$, or a combination thereof. In some embodiments, the aqueous solvent is de-ionized water. Water may be applied as part of the delamination solution to form solvation shells around various charged or partially charged species present in the polymeric binder of the coating and the metal substrate surface at the coating-metal substrate surface interface. This helps to disrupt the interactions between the polymeric binder in the coating and the metal substrate surface and consequently gives rise to the complete delamination of the composite.

Any water-miscible solvents or volatile solvents can be used as the minor component (i.e. solvents other than water) of the aqueous solvent. Some non-limiting examples of the water-miscible solvents or volatile solvents include alcohols, lower aliphatic ketones, lower alkyl acetates and combinations thereof. The addition of alcohol can improve the solubility of the delamination agent and lower the freezing point of water. Some non-limiting examples of the alcohol include $C_1$-$C_4$ alcohols, such as methanol, ethanol, isopropanol, n-propanol, tert-butanol, n-butanol and combinations thereof. Some non-limiting examples of the lower aliphatic ketones include acetone, dimethyl ketone, methyl ethyl ketone (MEK) and combinations thereof. Some non-limiting examples of the lower alkyl acetates include ethyl acetate (EA), isopropyl acetate, propyl acetate, butyl acetate (BA) and combinations thereof. In some embodiments, the aqueous solvent does not comprise an alcohol, a lower aliphatic ketone, a lower alkyl acetate or combinations thereof.

In some embodiments, the composite comprises a substrate and a coating applied on one side or both sides of the substrate.

In some embodiments, the coating comprises a polymeric binder. The intention of the polymeric binder in the coating is to provide adhesion between the coating and the metal substrate within the composite. In some embodiments, the polymeric binder comprises a copolymer.

In some embodiments, the copolymer comprises at least one structural unit derived from a hydrogen bond-forming group-containing monomer. In some embodiments, the hydrogen bond-forming group-containing monomer is selected from the group consisting of an acid group-containing monomer, a nitrile group-containing monomer, an amide group-containing monomer, a hydroxyl group-containing monomer, an ester group-containing monomer, an epoxy group-containing monomer, a fluorine-containing monomer or combinations thereof. In some embodiments, the hydrogen bond-forming group-containing monomer is selected from the group consisting of a nitrile group-containing monomer, an amide group-containing monomer, a hydroxyl group-containing monomer, an ester group-containing monomer, an epoxy group-containing monomer, a fluorine-containing monomer or combinations thereof. In some embodiments, the copolymer does not comprise a structural unit derived from a nitrile group-containing monomer, an amide group-containing monomer, a hydroxyl group-containing monomer, an ester group-containing monomer, an epoxy group-containing monomer, a fluorine-containing monomer or combinations thereof.

In some embodiments, the proportion of structural unit derived from a hydrogen bond-forming group-containing monomer is from about 0% to about 95%, from about 0% to about 90%, from about 0% to about 85%, from about 0% to about 80%, from about 0% to about 75%, from about 0% to about 70%, from about 0% to about 65%, from about 0% to about 60%, from about 0% to about 55%, from about 0% to about 50%, from about 5% to about 95%, from about 5% to about 90%, from about 5% to about 85%, from about 5% to about 80%, from about 5% to about 75%, from about 5% to about 70%, from about 5% to about 65%, from about 5% to about 60%, from about 5% to about 55%, from about 5% to about 50%, from about 10% to about 95%, from about 10% to about 90%, from about 10% to about 85%, from about 10% to about 80%, from about 10% to about 75%, from about 10% to about 70%, from about 10% to about 65%, from about 10% to about 60%, from about 10% to about 55%, from about 10% to about 50%, from about 15% to about 95%, from about 15% to about 90%, from about 15% to about 85%, from about 15% to about 80%, from about 15% to about 75%, from about 15% to about 70%, from about 15% to about 65%, from about 15% to about 60%, from about 15% to about 55%, from about 15% to about 50%, from about 20% to about 95%, from about 20% to about 90%, from about 20% to about 85%, from about 20% to about 80%, from about 20% to about 75%, from about 20% to about 70%, from about 20% to about 65%, from about 20% to about 60%, from about 20% to about 55%, from about 20% to about 50%, from about 25% to about 95%, from about 25% to about 90%, from about 25% to about 85%, from about 25% to about 80%, from about 25% to about 75%, from about 25% to about 70%, from about 25% to about 65%, from about 25% to about 60%, from about 25% to about 55%, from about 25% to about 50%, from about 30% to about 95%, from about 30% to about 90%, from about 30% to about 85%, from about 30% to about 80%, from about 30% to about 75%, from about 30% to about 70%, from about 30% to about 65%, from about 30% to about 60%, from about 30% to about 55%, from about 30% to about 50%, from about 35% to about 95%, from about 35% to about 90%, from about 35% to about 85%, from about 35% to about 80%, from about 35% to about 75%, from about 35% to about 70%, from about 35% to about 65%, from about 35% to about 60%, from about 35% to about 55%, from about 35% to about 50%, from about 40% to about 95%, from about 42% to about 95%, from about 44% to about 95%, from about 46% to about 95%, from about 48% to about 95%, from about 50% to about 95%, from about 52% to about 95%, from about 54% to about 95%, from about 56% to about 95%, from about 58% to about 95%, from about 60% to about 95%, from about 62% to about 95%, from about 64% to about 95%, from about 66% to about 95%, from about 68% to about 95%, from about 70% to about 95%, from about 72% to about 95%, from about 75% to about 95%, from about 40% to about 90%, from about 42% to about 90%, from about 44% to about 90%, from about 46% to about 90%, from about 48% to about 90%, from about 50% to about 90%, from about 52% to about 90%, from about 54% to about 90%, from about 56% to about 90%, from about 58% to about 90%, from about 60% to about 90%, from about 62% to about 90%, from about 64% to about 90%, from about 66% to about 90%, from about 68% to about 90%, from about 70% to about 90%, from about 40% to about 85%, from about 42% to about 85%, from about 44% to about 85%, from about 46% to about 85%, from about 48% to about 85%, from about 50% to about 85%, from about 52% to about 85%, from about 54% to about 85%, from about 56% to about 85%, from about 58% to about 85%, from about 60% to about 85%, from about 62% to about 85%, from about 64% to about 85%, from about 40% to about 80%, from about 42% to about 80%, from about 44% to about 80%, from about 46% to about 80%, from about 48% to about 80%, from about 50% to about 80%, from about 52% to about 80%, from about 54% to about 80%, from about 56% to about 80%, from about 58% to about 80% or from about 60% to about 80% by mole, based on the total number moles of monomeric units in the copolymer in the polymeric binder.

In some embodiments, the proportion of structural unit derived from a hydrogen bond-forming group-containing monomer is less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10% or less than 5% by mole, based on the total number moles of monomeric units in the copolymer in the polymeric binder. In some embodiments, the proportion of structural unit derived from a hydrogen bond-forming group-containing monomer is more than 0%, more than 5%, more than 10%, more than 15%, more than 20%, more than 25%, more than 30%, more than 35%, more than 40%, more than 45%, more than 50%, more than 55%, more than 60%, more than 65%, more than 70%, more than 75%, more than 80%, more than 85% or more than 90% by mole, based on the total number moles of monomeric units in the copolymer in the polymeric binder.

In some embodiments, the copolymer comprises a structural unit (a) derived from an acid group-containing monomer. In some embodiments, the copolymer comprises a structural unit (a) derived from an acid group-containing monomer and a structural unit (b) derived from a nitrile group-containing monomer. In some embodiments, the copolymer comprises a structural unit (a) derived from an acid group-containing monomer, a structural unit (b) derived from a nitrile group-containing monomer, a structural unit (c) derived from an amide group-containing monomer or combinations thereof. In some embodiments, the copolymer further comprises a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof.

Structural unit (a) is derived from an acid group-containing monomer. Any monomer that has at least one acid group may be used as acid group-containing monomer without any specific limitations.

In some embodiments, the acid group-containing monomer is a carboxylic acid group-containing monomer. In some embodiments, the carboxylic acid group-containing monomer is acrylic acid, methacrylic acid, crotonic acid, 2-butyl crotonic acid, cinnamic acid, maleic acid, maleic anhydride, fumaric acid, itaconic acid, itaconic anhydride, tetraconic acid or a combination thereof. In certain embodiments, the carboxylic acid group-containing monomer is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid or a combination thereof. In some embodiments, the carboxylic acid group-containing monomer is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate or a combination thereof. In some embodiments, the carboxylic acid group-containing monomer is maleic anhydride, methyl maleic anhydride, dimethyl maleic anhydride, acrylic anhydride, methacrylic anhydride, methacrolein, methacryloyl chloride, methacryloyl fluoride, methacryloyl bromide, or a combination thereof.

In some embodiments, structural unit (a) derived from a carboxylic acid group-containing monomer comprises a carboxylic salt group. In some embodiments, a carboxylic salt group is a salt of a carboxylic acid group. In some embodiments, structural unit (a) derived from a carboxylic acid group-containing monomer comprises an alkali metal carboxylic salt group. Examples of an alkali metal forming the alkali metal carboxylic salt include lithium, sodium and potassium. In some embodiments, structural unit (a) derived from a carboxylic acid group-containing monomer comprises an ammonium carboxylic salt group. In some embodiments, structural unit (a) derived from a carboxylic acid group-containing monomer comprises a combination of a carboxylic salt group and a carboxylic acid group.

Any monomer that has at least one carboxylic salt group may be used as carboxylic salt group-containing monomer without any specific limitations. In some embodiments, the carboxylic salt group-containing monomer is acrylic acid salt, methacrylic acid salt, crotonic acid salt, 2-butyl crotonic acid salt, cinnamic acid salt, maleic acid salt, maleic anhydride salt, fumaric acid salt, itaconic acid salt, itaconic anhydride salt, tetraconic acid salt or a combination thereof. In certain embodiments, the carboxylic salt group-containing monomer is 2-ethylacrylic acid salt, isocrotonic acid salt, cis-2-pentenoic acid salt, trans-2-pentenoic acid salt, angelic acid salt, tiglic acid salt, 3,3-dimethyl acrylic acid salt, 3-propyl acrylic acid salt, trans-2-methyl-3-ethyl acrylic acid salt, cis-2-methyl-3-ethyl acrylic acid salt, 3-isopropyl acrylic acid salt, trans-3-methyl-3-ethyl acrylic acid salt, cis-3-methyl-3-ethyl acrylic acid salt, 2-isopropyl acrylic acid salt, trimethyl acrylic acid salt, 2-methyl-3,3-diethyl acrylic acid salt, 3-butyl acrylic acid salt, 2-butyl acrylic acid salt, 2-pentyl acrylic acid salt, 2-methyl-2-hexenoic acid salt, trans-3-methyl-2-hexenoic acid salt, 3-methyl-3-propyl acrylic acid salt, 2-ethyl-3-propyl acrylic acid salt, 2,3-diethyl acrylic acid salt, 3,3-diethyl acrylic acid salt, 3-methyl-3-hexyl acrylic acid salt, 3-methyl-3-tert-butyl acrylic acid salt, 2-methyl-3-pentyl acrylic acid salt, 3-methyl-3-pentyl acrylic acid salt, 4-methyl-2-hexenoic acid salt, 4-ethyl-2-hexenoic acid salt, 3-methyl-2-ethyl-2-hexenoic acid salt, 3-tert-butyl acrylic acid salt, 2,3-dimethyl-3-ethyl acrylic acid salt, 3,3-dimethyl-2-ethyl acrylic acid salt, 3-methyl-3-isopropyl acrylic acid salt, 2-methyl-3-isopropyl acrylic acid salt, trans-2-octenoic acid salt, cis-2-octenoic acid salt, trans-2-decenoic acid salt, α-acetoxyacrylic acid salt, 3-trans-aryloxyacrylic acid salt, α-chloro-β-E-methoxyacrylic acid salt or a combination thereof. In some embodiments, the carboxylic salt group-containing monomer is methyl maleic acid salt, dimethyl maleic acid salt, phenyl maleic acid salt, bromo maleic acid salt, chloromaleic acid salt, dichloromaleic acid salt, fluoromaleic acid salt, difluoro maleic acid salt or a combination thereof.

In some embodiments, the acid group-containing monomer is a sulfonic acid group-containing monomer. In some embodiments, the sulfonic acid group-containing monomer is vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid or a combination thereof.

In some embodiments, structural unit (a) derived from a sulfonic acid group-containing monomer comprises a sulfonic salt group. In some embodiments, a sulfonic salt group is a salt of a sulfonic acid group. In some embodiments, structural unit (a) derived from a sulfonic acid group-containing monomer comprises an alkali metal sulfonic salt group. Examples of an alkali metal forming the alkali metal sulfonic salt include lithium, sodium and potassium. In some embodiments, structural unit (a) derived from a sulfonic acid group-containing monomer comprises an ammonium sulfonic salt group. In some embodiments, structural unit (a) derived from a sulfonic acid group-containing monomer comprises a combination of a sulfonic salt group and a sulfonic acid group.

Any monomer that has at least one sulfonic salt group may be used as sulfonic salt group-containing monomer without any specific limitations. In some embodiments, the sulfonic salt group-containing monomer is vinylsulfonic acid salt, methylvinylsulfonic acid salt, allylvinylsulfonic acid salt, allylsulfonic acid salt, methallylsulfonic acid salt, styrenesulfonic acid salt, 2-sulfoethyl methacrylic acid salt, 2-methylprop-2-ene-1-sulfonic acid salt, 2-acrylamido-2-methyl-1-propane sulfonic acid salt, 3-allyloxy-2-hydroxy-1-propane sulfonic acid salt or a combination thereof.

In some embodiments, the acid group-containing monomer is a phosphonic acid group-containing monomer. In some embodiments, the phosphonic acid group-containing monomer is vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid or a combination thereof.

In some embodiments, structural unit (a) derived from a phosphonic acid group-containing monomer comprises a phosphonic salt group. In some embodiments, a phosphonic salt group is a salt of a phosphonic acid group. In some embodiments, structural unit (a) derived from a phosphonic acid group-containing monomer comprises an alkali metal phosphonic salt group. Examples of an alkali metal forming the alkali metal phosphonic salt include lithium, sodium and potassium. In some embodiments, structural unit (a) derived from a phosphonic acid group-containing monomer comprises an ammonium phosphonic salt group. In some embodiments, structural unit (a) derived from a phosphonic acid group-containing monomer comprises a combination of a phosphonic salt group and a phosphonic acid group.

Any monomer that has at least one phosphonic salt group may be used as phosphonic salt group-containing monomer without any specific limitations. In some embodiments, the phosphonic salt group-containing monomer is salt of vinyl phosphonic acid, salt of allyl phosphonic acid, salt of vinyl benzyl phosphonic acid, salt of acrylamide alkyl salt of phosphonic acid, salt of methacrylamide alkyl phosphonic acid, salt of acrylamide alkyl diphosphonic acid, salt of acryloylphosphonic acid, salt of 2-methacryloyloxyethyl phosphonic acid, salt of bis(2-methacryloyloxyethyl) phosphonic acid, salt of ethylene 2-methacryloyloxyethyl phosphonic acid, salt of ethyl-methacryloyloxyethyl phosphonic acid or a combination thereof.

In some embodiments, the structural unit (a) is derived from a carboxylic acid group-containing monomer, a sulfonic acid group-containing monomer, a phosphonic acid group-containing monomer or a combination thereof.

In some embodiments, structural unit (a) derived from an acid group-containing monomer comprises an acid salt group. In some embodiments, an acid salt group is a salt of an acid group. Any monomer that has at least one acid salt group may be used as acid salt group-containing monomer without any specific limitations. In some embodiments, the acid salt group-containing monomer is selected from the group consisting of a carboxylic salt group-containing monomer, a sulfonic salt group-containing monomer, a phosphonic salt group-containing monomer or a combination thereof. In some embodiments, structural unit (a) derived from an acid group-containing monomer comprises an alkali metal acid salt group. Examples of an alkali metal forming the alkali metal acid salt include lithium, sodium and potassium. In some embodiments, structural unit (a) derived from an acid group-containing monomer comprises an ammonium acid salt group. In some embodiments, structural unit (a) derived from an acid group-containing monomer comprises a combination of an acid salt group and an acid group.

In some embodiments, structural unit (a) derived from an acid group-containing monomer comprises atom(s) that is/are capable of forming hydrogen bond(s). In some embodiments, structural unit (a) derived from an acid group-containing monomer further comprises charged species that is/are capable of inducing ion-dipole interactions and/or forming ionic bond(s). For example, an acid group undergoes partial dissociation when comes into contact with water and produces an acid salt group that contains charged species, giving rise to the formation of ion-dipole interactions and/or ionic bond(s).

In some embodiments, the proportion of structural unit (a) derived from an acid group-containing monomer is from about 15% to about 85%, from about 15% to about 84%, from about 15% to about 83%, from about 15% to about 82%, from about 15% to about 81%, from about 15% to about 80%, from about 15% to about 79%, from about 15% to about 78%, from about 15% to about 77%, from about 15% to about 76%, from about 15% to about 75%, from about 15% to about 74%, from about 15% to about 73%, from about 15% to about 72%, from about 15% to about 71%, from about 15% to about 70%, from about 15% to about 65%, from about 15% to about 60%, from about 15% to about 55%, from about 15% to about 50%, from about 16% to about 85%, from about 17% to about 85%, from about 18% to about 85%, from about 19% to about 85%, from about 20% to about 85%, from about 21% to about 85%, from about 22% to about 85%, from about 25% to about 85%, from about 30% to about 85%, from about 35% to about 85%, from about 40% to about 85%, from about 45% to about 85%, from about 50% to about 85%, from about 55% to about 85%, from about 16% to about 80%, from about 16% to about 75%, from about 16% to about 70%, from about 16% to about 65%, from about 16% to about 60%, from about 18% to about 80%, from about 18% to about 75%, from about 18% to about 70%, from about 18% to about 65%, from about 18% to about 60%, from about 20% to about 80%, from about 20% to about 75%, from about 20% to about 70%, from about 20% to about 65%, from about 20% to about 60%, from about 22% to about 80%, from about 22% to about 75%, from about 22% to about 70%, from about 22% to about 65% or from about 22% to about 60% by mole, based on the total number moles of monomeric units in the copolymer in the polymeric binder.

In some embodiments, the proportion of structural unit (a) derived from an acid group-containing monomer is less than 85%, less than 84%, less than 82%, less than 80%, less than 78%, less than 76%, less than 74%, less than 72%, less than 70%, less than 68%, less than 66%, less than 64%, less than 62%, less than 60%, less than 58%, less than 56%, less than 54%, less than 52%, less than 50%, less than 48%, less than 46%, less than 44%, less than 42%, less than 40%, less than 38%, less than 36%, less than 34%, less than 32%, less than 30%, less than 28%, less than 26%, less than 24%, less than 22%, less than 20% or less than 18% by mole, based on the total number moles of monomeric units in the copolymer in the polymeric binder. In some embodiments, the proportion of structural unit (a) derived from an acid group-containing monomer is more than 15%, more than 16%, more than 18%, more than 20%, more than 22%, more than 24%, more than 26%, more than 28%, more than 30%, more than 32%, more than 34%, more than 36%, more than 38%, more than 40%, more than 42%, more than 44%, more than 46%, more than 48%, more than 50%, more than 52%, more than 54%, more than 56%, more than 58%, more than 60%, more than 62%, more than 64%, more than 66%, more than 68%, more than 70%, more than 72%, more than 74%, more than 76%, more than 78%, more than 80% or more than 82% by mole, based on the total number of moles of monomeric units in the copolymer in the polymeric binder.

Structural unit (b) is derived from a nitrile group-containing monomer. Any monomer that has at least one nitrile group may be used as nitrile group-containing monomer without any specific limitations. In some embodiments, the nitrile group-containing monomer include α,β-ethylenically unsaturated nitrile monomers. In some embodiments, the nitrile group-containing monomer is acrylonitrile, α-halogenoacrylonitrile, α-alkylacrylonitrile or a combination thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide, or a combination thereof.

In some embodiments, the proportion of structural unit (b) derived from a nitrile group-containing monomer is from about 0% to about 85%, from about 0% to about 80%, from about 0% to about 75%, from about 0% to about 70%, from about 0% to about 65%, from about 0% to about 60%, from about 5% to about 85%, from about 5% to about 80%, from about 5% to about 75%, from about 5% to about 70%, from about 5% to about 65%, from about 5% to about 60%, from about 10% to about 85%, from about 10% to about 80%, from about 10% to about 75%, from about 10% to about 70%, from about 10% to about 65%, from about 10% to about 60%, from about 15% to about 85%, from about 15% to about 84%, from about 15% to about 83%, from about 15% to about 82%, from about 15% to about 81%, from about 15% to about 80%, from about 15% to about 79%, from about 15% to about 78%, from about 15% to about 77%, from about 15% to about 76%, from about 15% to about 75%, from about 15% to about 74%, from about 15% to about 73%, from about 15% to about 72%, from about 15% to about 71%, from about 15% to about 70%, from about 15% to about 65%, from about 15% to about 60%, from about 15% to about 55%, from about 15% to about 50%, from about 16% to about 85%, from about 17% to about 85%, from about 18% to about 85%, from about 19% to about 85%, from about 20% to about 85%, from about 21% to about 85%, from about 22% to about 85%, from about 23% to about 85%, from about 24% to about 85%, from about 30% to about 85%, from about 35% to about 85%, from about 40% to about 85%, from about 45% to about 85%, from about 50% to about 85%, from about 55% to about 85%, from about 16% to about 84%, from about 16% to about 80%, from about 18% to about 84%, from about 18% to about 80%, from about 20% to about 80%, from about 22% to about 80% by mole, based on the total number moles of monomeric units in the copolymer in the polymeric binder.

In some embodiments, the proportion of structural unit (b) derived from a nitrile group-containing monomer is less than 85%, less than 84%, less than 82%, less than 80%, less than 78%, less than 76%, less than 74%, less than 72%, less than 70%, less than 68%, less than 66%, less than 64%, less than 62%, less than 60%, less than 58%, less than 56%, less than 54%, less than 52%, less than 50%, less than 48%, less than 46%, less than 44%, less than 42%, less than 40%, less than 38%, less than 36%, less than 34%, less than 32%, less than 30%, less than 28%, less than 26%, less than 24%, less than 22%, less than 20%, less than 18%, less than 16%, less than 14%, less than 12%, less than 10%, less than 8%, less than 6% or less than 4% by mole, based on the total number moles of monomeric units in the copolymer in the polymeric binder. In some embodiments, the proportion of structural unit (b) derived from a nitrile group-containing monomer is more than 0%, more than 1%, more than 3%, more than 5%, more than 7%, more than 10%, more than 12%, more than 15%, more than 16%, more than 18%, more than 20%, more than 22%, more than 24%, more than 26%, more than 28%, more than 30%, more than 32%, more than 34%, more than 36%, more than 38%, more than 40%, more than 42%, more than 44%, more than 46%, more than 48%, more than 50%, more than 52%, more than 54%, more than 56%, more than 58%, more than 60%, more than 62%, more than 64%, more than 66%, more than 68%, more than 70%, more than 72%, more than 74%, more than 76%, more than 78%, more than 80% or more than 82% by mole, based on the total number of moles of monomeric units in the copolymer in the polymeric binder.

Structural unit (c) is derived from an amide group-containing monomer. Any monomer that has at least one amide group may be used as amide group-containing monomer without any specific limitations. In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl)methacrylamide, N-(propoxymethyl)methacrylamide, N-(butoxymethyl)methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide or a combination thereof.

In some embodiments, the proportion of structural unit (c) derived from an amide group-containing monomer is from about 0% to about 35%, from about 1% to about 35%, from about 2% to about 35%, from about 3% to about 35%, from about 4% to about 35%, from about 5% to about 35%, from about 6% to about 35%, from about 7% to about 35%, from about 8% to about 35%, from about 9% to about 35%, from about 10% to about 35%, from about 11% to about 35%, from about 12% to about 35%, from about 13% to about 35%, from about 14% to about 35%, from about 15% to about 35%, from about 16% to about 35%, from about 17% to about 35%, from about 18% to about 35%, from about 19% to about 35%, from about 20% to about 35%, from about 20% to about 34%, from about 20% to about 33%, from about 20% to about 32%, from about 20% to about 31%, from about 20% to about 30%, from about 0% to about 34%, from about 0% to about 33%, from about 0% to about 32%, from about 0% to about 31%, from about 0% to about 30%, from about 1% to about 29%, from about 1% to about 28%, from about 1% to about 27%, from about 1% to about 26%, from about 1% to about 25%, from about 1% to about 24%, from about 1% to about 23%, from about 1% to about 22%, from about 1% to about 21% or from about 1% to about 20% by mole, based on the total number of moles of monomeric units in the copolymer in the polymeric binder.

In some embodiments, the proportion of structural unit (c) derived from an amide group-containing monomer is less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11% or less than 10% by mole, based on the total number of moles of monomeric units in the copolymer in the polymeric binder. In some embodiments, the proportion of structural unit (c) derived from an amide group-containing monomer is more than 0%, more than 1%, more than 2%, more than 3%, more than 4%, more than 5%, more than 6%, more than 7%, more than 8%, more than 9%, more than 10%, more than 11%, more than 12%, more than 13%, more than 14%, more than 15%, more than 16%, more than 17%, more than 18%, more than 19%, more than 20%, more than 21%, more than 22%, more than 23%, more than 24% or more than 25% by mole, based on the total number of moles of monomeric units in the copolymer in the polymeric binder.

Structural unit (d) is derived from a hydroxyl group-containing monomer. Any monomer that has at least one hydroxyl group may be used as hydroxyl group-containing monomer without any specific limitations. In some embodiments, the hydroxyl group-containing monomer is a $C_1$ to $C_{20}$ alkyl group or a $C_5$ to $C_{20}$ cycloalkyl group-containing methacrylate having a hydroxyl group. In some embodiments, the hydroxyl group-containing monomer is 2-hydroxyethylacrylate, 2-hydroxyethyl methacrylate, 2-hydroxypropyl acrylate, 2-hydroxypropyl methacrylate, 2-hydroxybutyl methacrylate, 3-hydroxypropylacrylate, 3-hydroxypropylmethacrylate, 4-hydroxybutyl methacrylate, 5-hydroxypentylacrylate, 6-hydroxyhexyl methacrylate, 1,4-cyclohexanedimethanol mono(meth)acrylate, 3-chloro-2-hydroxypropyl methacrylate, diethylene glycol mono(meth)acrylate, allyl alcohol or a combination thereof.

Structural unit (e) is derived from an ester group-containing monomer. Any monomer that has at least one ester group may be used as ester group-containing monomer without any specific limitations. In some embodiments, the ester group-containing monomer is $C_1$ to $C_{20}$ alkyl acrylate, $C_1$ to $C_{20}$ alkyl (meth)acrylate, cycloalkyl acrylate or a combination thereof. In some embodiments, the ester group-containing monomer is methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, octadecyl acrylate, cyclohexyl acrylate, phenyl acrylate, methoxymethyl acrylate, methoxyethyl acrylate, ethoxymethyl acrylate, ethoxyethyl acrylate, perfluorooctyl acrylate, stearyl acrylate or a combination thereof. In some embodiments, the ester group-containing monomer is cyclohexyl acrylate, cyclohexyl methacrylate, isobornyl acrylate, isobornyl methacrylate, 3,3,5-trimethylcyclohexylacrylate, or a combination thereof. In some embodiments, the ester group-containing monomer is methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, 2,2,2-trifluoroethyl methacrylate, phenyl methacrylate, benzyl methacrylate, or a combination thereof.

Structural unit (f) is derived from an epoxy group-containing monomer. Any monomer that has at least one epoxy group may be used as epoxy group-containing monomer without any specific limitations. In some embodiments, the epoxy group-containing monomer is vinyl glycidyl ether, allyl glycidyl ether, allyl 2,3-epoxypropyl ether, butenyl glycidyl ether, butadiene monoepoxide, chloroprene monoepoxide, 3,4-epoxy-1-butene, 4,5-epoxy-2-pentene, 3,4-epoxy-1-vinylcyclohexane, 1,2-epoxy-4-vinylcyclohexane, 3,4-epoxy cyclohexylethylene, epoxy-4-vinylcyclohexene, 1,2-epoxy-5,9-cyclododecadiene or a combination thereof.

In some embodiments, the epoxy group-containing monomer is 3,4-epoxy-1-butene, 1,2-epoxy-5-hexene, 1,2-epoxy-9-decene, glycidyl acrylate, glycidyl methacrylate, glycidyl crotonate, glycidyl 2,4-dimethyl pentenoate, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl-4-methyl-3-pentenoate or a combination thereof.

Structural unit (g) is derived from a fluorine-containing monomer. Any monomer that has at least one fluorine atom may be used as fluorine-containing monomer without any specific limitations. In some embodiments, the fluorine-containing monomer is a $C_1$ to $C_{20}$ alkyl group-containing acrylate, methacrylate or a combination thereof having at least one fluorine atom. In some embodiments, the fluorine-containing monomer is perfluoro alkyl acrylate such as perfluoro dodecyl acrylate, perfluoro n-octyl acrylate, perfluoro n-butyl acrylate, perfluoro hexylethyl acrylate and perfluoro octylethyl acrylate; perfluoro alkyl methacrylate such as perfluoro dodecyl methacrylate, perfluoro n-octyl methacrylate, perfluoro n-butyl methacrylate, perfluoro hexylethyl methacrylate and perfluoro octylethyl methacrylate; perfluoro oxyalkyl acrylate such as perfluoro dodecyloxyethyl acrylate and perfluoro decyloxyethyl acrylate; perfluoro oxyalkyl methacrylate such as perfluoro dodecyloxyethyl methacrylate and perfluoro decyloxyethyl methacrylate and combinations thereof. In some embodiments, the fluorine-containing monomer is a carboxylate containing at least one $C_1$ to $C_{20}$ alkyl group and at least one fluorine atom; wherein the carboxylate is selected from the group consisting of crotonate, malate, fumarate, itaconate or a combination thereof. In some embodiments, the fluorine-containing monomer is vinyl fluoride, trifluoroethylene, trifluorochloroethylene, fluoroalkyl vinyl ether, perfluoroalkyl vinyl ether, hexafluoropropylene, 2,3,3,3-tetrafluoropropene, vinylidene fluoride, tetrafluoroethylene, 2-fluoro acrylate and combinations thereof.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently from about 0% to about 50%, from about 1% to about 50%, from about 2% to about 50%, from about 3% to about 50%, from about 4% to about 50%, from about 5% to about 50%, from about 6% to about 50%, from about 7% to about 50%, from about 8% to about 50%, from about 9% to about 50%, from about 10% to about 50%, from about 11% to about 50%, from about 12% to about 50%, from about 13% to about 50%, from about 14% to about 50%, from about 15% to about 50%, from about 16% to about 50%, from about 17% to about 50%, from about 18% to about 50%, from about 19% to about 50%, from about 20% to about 50%, from about 20% to about 49%, from about 20% to about 48%, from about 20% to about 47%, from about 20% to about 46%, from about 20% to about 45%, from about 20% to about 44%, from about 20% to about 43%, from about 20% to about 42%, from about 20% to about 41%, from about 20% to about 40%, from about 0% to about 45%, from about 0% to about 44%, from about 0% to about 43%, from about 0% to about 42%, from about 0% to about 41%, from about 0% to about 40%, from about 0% to about 39%, from about 0% to about 38%, from about 0% to about 37%, from about 0% to about 36%, from about 0% to about 35%, from about 0% to about 34%, from about 0% to about 33%, from about 0% to about 32%, from about 0% to about 31%, from about 0% to about 30%, from about 2% to about 50%, from about 2% to about 45%, from about 2% to about 40%, from about 2% to about 35%, from about 2% to about 30%, from about 2% to about 25%, from about 5% to about 50%, from about 5% to about 45%, from about 5% to about 40%, from about 5% to about 35%, from about 5% to about 30%, from about 5% to about 25%, from about 10% to about 50%, from about 10% to about 45%, from about 10% to about 40%, from about 10% to about 35% or from about 10% to about 30% by mole, based on the total number of moles of monomeric units in the copolymer in the polymeric binder.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently less than 50%, less than 49%, less than 48%, less than 47%, less than 46%, less than 45%, less than 44%, less than 43%, less than 42%, less than 41%, less than 40%, less than 39%, less than 38%, less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 8%, less than 6%, less than 4% or less than 2% by mole, based on the total number of moles of monomeric units in the copolymer in the polymeric binder.

In some embodiments, the proportion of each of structural unit (d) derived from a hydroxyl group-containing monomer, structural unit (e) derived from an ester group-containing monomer, structural unit (f) derived from an epoxy group-containing monomer and structural unit (g) derived from a fluorine-containing monomer is independently more than 0%, more than 1%, more than 2%, more than 3%, more than 4%, more than 5%, more than 6%, more than 7%, more than 8%, more than 9%, more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27%, more than 28%, more than 29%, more than 30%, more than 31%, more than 32%, more than 33%, more than 34%, more than 35%, more than 36%, more than 37%, more than 38%, more than 39%, more than 40%, more than 41%, more than 42%, more than 43%, more than 44%, more than 45%, more than 46%, more than 47% or more than 48% by mole, based on the total number of moles of monomeric units in the copolymer in the polymeric binder.

In other embodiments, the copolymer may additionally comprise a structural unit derived from an olefin. Any hydrocarbon that has at least one carbon-carbon double bond may be used as an olefin without any specific limitations. In some embodiments, the olefin includes a $C_2$ to $C_{20}$ aliphatic compound, a $C_8$ to $C_{20}$ aromatic compound or a cyclic compound containing vinylic unsaturation, a $C_4$ to $C_{40}$ diene or a combination thereof. In some embodiments, the olefin is styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene, cyclooctene or a combination thereof. In some embodiments, the copolymer does not comprise a structural unit derived from an olefin. In some embodiments, the copolymer does not comprise styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene or cyclooctene.

A conjugated diene group-containing monomer constitutes as an olefin. In some embodiments, a conjugated diene group-containing monomer is $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes, substituted side chain conjugated hexadienes or a combination thereof. In some embodiments, the copolymer does not comprise $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes or substituted side chain conjugated hexadienes.

In other embodiments, the copolymer may additionally comprise a structural unit derived from an aromatic vinyl group-containing monomer. In some embodiments, the aromatic vinyl group-containing monomer is styrene, α-methylstyrene, vinyltoluene, divinylbenzene or a combination thereof. In some embodiments, the copolymer does not comprise a structural unit derived from an aromatic vinyl group-containing monomer. In some embodiments, the copolymer does not comprise styrene, α-methylstyrene, vinyltoluene or divinylbenzene.

In some embodiments, the substrate can be in the form of a foil, sheet or film. In certain embodiments, the substrate is a metal. In some embodiments, the substrate is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, an electrically-conductive resin or a combination thereof.

In certain embodiments, the substrate has a two-layered structure comprising an outer layer and an inner layer, wherein the outer layer comprises a conductive material and the inner layer comprises an insulating material or another conductive material; for example, a polymeric insulating material coated with an aluminum layer or an aluminum mounted with a conductive resin layer. In some embodiments, the conductive material is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof. In some embodiments, the substrate has a three-layered structure comprising an outer layer, a middle layer and an inner layer, wherein the outer and inner layers comprise a conductive material and the middle layer comprises an insulating material or another conductive material; for example, a plastic material coated with a metal layer on both sides. In certain embodiments, each of the outer layer, middle layer and inner layer is independently stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof. In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer and combinations thereof. In certain embodiments, the substrate has more than three layers. In some embodiments, the substrate is coated with a protective coating. In certain embodiments, the protective coating comprises a carbon-containing material. In some embodiments, the substrate is not coated with a protective coating.

In some embodiments, the coating has a two-layered structure comprising an outer layer and an inner layer, wherein the inner layer and the outer layer each independently comprises a polymeric material.

In some embodiments, the polymeric material is selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer and combinations thereof. In some embodiments, the polymeric material comprises a structural unit (a) derived from an acid group-containing monomer. In some embodiments, the polymeric material comprises a structural unit (a) derived from an acid group-containing monomer and a structural unit (b) derived from a nitrile group-containing monomer. In some embodiments, the polymeric material comprises a structural unit (a) derived from an acid group-containing monomer, a structural unit (b) derived from a nitrile group-containing monomer, a structural unit (c) derived from an amide group-containing monomer or combinations thereof. In some embodiments, the polymeric material further comprises a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof.

In some embodiments, the polymeric material or materials in the inner layer and the outer layer may be the same, or may be different or partially different.

The time taken for the immersion of the composite into the delamination solution is crucial in attaining full delamination of the coating from the metal substrate. When the composite is immersed into the delamination solution for an inadequate amount of time, the delamination agent and the aqueous solvent contained in the delamination solution might not possess sufficient time to destabilize, disrupt and break the bonds that are initially formed between the coating and the metal substrate surface to an extent that complete delamination of the composite is made possible. However, as the composite is immersed into the delamination solution for a prolonged period of time, corrosion of the metal substrate might occur due to extended contact time of the composite with the delamination agent (e.g. weak acid) contained within the delamination solution. In some embodiments, the composite is immersed into the delamination solution for a time period of from about 1 minute to 120 minutes, from about 1 minute to about 110 minutes, from about 1 minute to about 100 minutes, from about 1 minute to about 90 minutes, from about 1 minute to about 80 minutes, from about 1 minute to about 70 minutes, from about 1 minute to about 60 minutes, from about 3 minutes to about 120 minutes, from about 3 minutes to about 110 minutes, from about 3 minutes to about 100 minutes, from about 3 minutes to about 90 minutes, from about 3 minutes to about 80 minutes, from about 3 minutes to about 70 minutes, from about 3 minutes to about 60 minutes, from about 5 minutes to about 120 minutes, from about 5 minutes to about 110 minutes, from about 5 minutes to about 100 minutes, from about 5 minutes to about 90 minutes, from about 5 minutes to about 80 minutes, from about 5 minutes to about 70 minutes, from about 5 minutes to about 60 minutes, from about 10 minutes to about 120 minutes, from about 10 minutes to about 110 minutes, from about 10 minutes to about 100 minutes, from about 10 minutes to about 90 minutes, from about 10 minutes to about 80 minutes, from about 10 minutes to about 70 minutes, from about 10 minutes to about 60 minutes, from about 15 minutes to about 120 minutes, from about 15 minutes to about 110 minutes, from about 15 minutes to about 100 minutes, from about 15 minutes to about 90 minutes, from about 15 minutes to about 80 minutes, from about 15 minutes to about 70 minutes, from about 15 minutes to about 60 minutes, from about 20 minutes to about 120 minutes, from about 20 minutes to about 110 minutes, from about 20 minutes to about 100 minutes, from about 20 minutes to about 90 minutes, from about 20 minutes to about 80 minutes, from about 20 minutes to about 70 minutes, from about 20 minutes to about 60 minutes, from about 25 minutes to about 120 minutes, from about 25 minutes to about 110 minutes, from about 25 minutes to about 100 minutes, from about 25 minutes to about 90 minutes, from about 25 minutes to about 80 minutes, from about 25 minutes to about 70 minutes, from about 25 minutes to about 60 minutes, from about 30 minutes to about 120 minutes, from about 30 minutes to about 110 minutes, from about 30 minutes to about 100 minutes, from about 30 minutes to about 90 minutes, from about 30 minutes to about 80 minutes, from about 30 minutes to about 70 minutes or from about 30 minutes to about 60 minutes.

In some embodiments, the composite is immersed into the delamination solution for a time period of less than 120 minutes, less than 110 minutes, less than 100 minutes, less than 90 minutes, less than 80 minutes, less than 70 minutes, less than 60 minutes, less than 50 minutes, less than 40 minutes, less than 30 minutes, less than 20 minutes, less than 15 minutes, less than 10 minutes or less than 5 minutes. In some embodiments, the composite is immersed into the delamination solution for a time period of more than 1 minute, more than 3 minutes, more than 5 minutes, more than 10 minutes, more than 15 minutes, more than 20 minutes, more than 30 minutes, more than 40 minutes, more than 50 minutes, more than 60 minutes, more than 70 minutes, more than 80 minutes, more than 90 minutes, more than 100 minutes or more than 110 minutes.

In some embodiments, the composite is immersed into the delamination solution at a temperature of from about 25° C. to about 95° C., from about 25° C. to about 90° C., from about 25° C. to about 85° C., from about 25° C. to about 80° C., from about 25° C. to about 75° C., from about 25° C. to about 70° C., from about 25° C. to about 65° C., from about 25° C. to about 60° C., from about 25° C. to about 55° C., from about 25° C. to about 50° C., from about 30° C. to about 95° C., from about 30° C. to about 90° C., from about 30° C. to about 85° C., from about 30° C. to about 80° C., from about 30° C. to about 75° C., from about 30° C. to about 70° C., from about 30° C. to about 65° C., from about 30° C. to about 60° C., from about 30° C. to about 55° C., from about 30° C. to about 50° C., from about 35° C. to about 95° C., from about 35° C. to about 90° C., from about 35° C. to about 85° C., from about 35° C. to about 80° C., from about 35° C. to about 75° C., from about 35° C. to about 70° C., from about 35° C. to about 65° C., from about 35° C. to about 60° C., from about 35° C. to about 55° C., from about 40° C. to about 95° C., from about 40° C. to about 90° C., from about 40° C. to about 85° C., from about 40° C. to about 80° C., from about 40° C. to about 75° C., from about 40° C. to about 70° C., from about 40° C. to about 65° C., from about 40° C. to about 60° C., from about 45° C. to about 95° C., from about 45° C. to about 90° C., from about 45° C. to about 85° C., from about 45° C. to about 80° C., from about 45° C. to about 75° C., from about 45° C. to about 70° C., from about 45° C. to about 65° C., from about 50° C. to about 90° C., from about 50° C. to about 85° C., from about 50° C. to about 80° C. or from about 50° C. to about 70° C.

In some embodiments, the composite is immersed into the delamination solution at a temperature of less than 95° C., less than 90° C., less than 85° C., less than 80° C., less than 75° C., less than 70° C., less than 65° C., less than 60° C., less than 55° C., less than 50° C., less than 45° C., less than 40° C., less than 35° C. or less than 30° C. In some embodiments, the composite is immersed into the delamination solution at a temperature of more than 25° C., more than 30° C., more than 35° C., more than 40° C., more than 45° C., more than 50° C., more than 55° C., more than 60° C., more than 65° C., more than 70° C., more than 75° C., more than 80° C., more than 85° C. or more than 90° C.

The amount of delamination solution used for the immersion of the composite is critical in achieving complete delamination of the coating from the metal substrate. When there is an insufficient amount of delamination solution used for immersion of a given amount of composite, full delamination of the composite cannot take place. An example of the consequence of which is a large proportion of the coating might still be found deposited or adhered on the surface of the metal substrate. On the other hand, in the case where an excessive amount of delamination solution is used for immersion of a given amount of composite, the additional delamination agent and aqueous solvent used are deemed futile and produces unnecessary contaminated or polluted aqueous solvent waste that requires further treatment steps for solvent reuse. In some embodiments, as the composite is immersed into the delamination solution to achieve delamination of the composite, the weight ratio of the composite to the delamination solution is from about 0.01% to about 5%, from about 0.01% to about 4.8%, from about 0.01% to about 4.6%, from about 0.01% to about 4.4%, from about 0.01% to about 4.2%, from about 0.01% to about 4%, from about 0.01% to about 3.8%, from about 0.01% to about 3.6%, from about 0.01% to about 3.4%, from about 0.01% to about 3.2%, from about 0.01% to about 3%, from about 0.01% to about 2.8%, from about 0.01% to about 2.6%, from about 0.01% to about 2.4%, from about 0.01% to about 2.2%, 0.01% to about 2%, from about 0.01% to about 1.9%, from about 0.01% to about 1.8%, from about 0.01% to about 1.7%, from about 0.01% to about 1.6%, from about 0.01% to about 1.5%, from about 0.01% to about 1.4%, from about 0.01% to about 1.3%, from about 0.01% to about 1.2%, from about 0.01% to about 1.1%, from about 0.01% to about 1%, from about 0.01% to about 0.9%, from about 0.01% to about 0.8%, from about 0.1% to about 5%, from about 0.1% to about 4.5%, from about 0.1% to about 4%, from about 0.1% to about 3.5%, from about 0.1% to about 3%, from about 0.1% to about 2.5%, from about 0.1% to about 2%, from about 0.1% to about 1.9%, from about 0.1% to about 1.8%, from about 0.1% to about 1.7%, from about 0.1% to about 1.6%, from about 0.1% to about 1.5%, from about 0.1% to about 1.4%, from about 0.1% to about 1.3%, from about 0.1% to about 1.2%, from about 0.1% to about 1.1%, from about 0.1% to about 1%, from about 0.1% to about 0.9%, from about 0.1% to about 0.8%, from about 0.2% to about 5%, from about 0.2% to about 4.5%, from about 0.2% to about 4%, from about 0.2% to about 3.5%, from about 0.2% to about 3%, from about 0.2% to about 2.5%, from about 0.2% to about 2%, from about 0.2% to about 1.9%, from about 0.2% to about 1.8%, from about 0.2% to about 1.7%, from about 0.2% to about 1.6%, from about 0.2% to about 1.5%, from about 0.2% to about 1.4%, from about 0.2% to about 1.3%, from about 0.2% to about 1.2%, from about 0.2% to about 1.1%, from about 0.2% to about 1%, from about 0.2% to about 0.9%, from about 0.2% to about 0.8%, from about 0.3% to about 4%, from about 0.3% to about 3%, from about 0.3% to about 1.5%, from about 0.3% to about 1% or from about 0.3% to about 0.8%.

In some embodiments, as the composite is immersed into the delamination solution to achieve delamination of the composite, the weight ratio of the composite to the delamination solution is less than 5%, less than 4.5%, less than 4%, less than 3.5%, less than 3%, less than 2.5%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6%, less than 0.5%, less than 0.4%, less than 0.3%, less than 0.2%, less than 0.1% or less than 0.05%. In some embodiments, as the composite is immersed into the delamination solution to achieve delamination of the composite, the weight ratio of the composite to the delamination solution is more than 0.01%, more than 0.05%, more than 0.1%, more than 0.2%, more than 0.3%, more than 0.4%, more than 0.5%, more than 0.6%, more than 0.7%, more than 0.8%, more than 0.9%, more than 1%, more than 1.1%, more than 1.2%, more than 1.3%, more than 1.4%, more than 1.5%, more than 1.6%, more than 1.7%, more than 1.8%, more than 1.9%, more than 2%, more than 2.5%, more than 3%, more than 3.5%, more than 4% or more than 4.5%.

The purpose of the delamination agent is to interrupt and break the ion-dipole interactions and hydrogen bonding interactions between the polymeric binder contained in the coating and the metal substrate surface. A sufficient amount of delamination agent in the delamination solution is required to give rise to the disruption of interactions between the coating and the metal substrate and thus delamination of the composite. However, relatively low concentrations of the delamination agent are adequate to induce disruption of the interactions between the polymeric binder within the coating and the metal substrate surface. The use of delamination agent of low concentrations for immersion of the composite reduces the likelihood of corrosion of the metal substrate and other possible metal constituents of the composite and/or mitigates side reaction(s) that might arise from the use of high-concentration delamination agent. In some embodiments, the concentration of the delamination agent in the delamination solution is from about 0.01% to about 1%, from about 0.01% to about 0.95%, from about 0.01% to about 0.9%, from about 0.01% to about 0.85%, from about 0.01% to about 0.8%, from about 0.01% to about 0.75%, from about 0.01% to about 0.7%, from about 0.01% to about 0.65%, from about 0.01% to about 0.6%, from about 0.01% to about 0.55%, from about 0.01% to about 0.5%, from about 0.01% to about 0.45%, from about 0.01% to about 0.4%, from about 0.01% to about 0.35%, from about 0.01% to about 0.3%, from about 0.05% to about 1%, from about 0.05% to about 0.95%, from about 0.05% to about 0.9%, from about 0.05% to about 0.85%, from about 0.05% to about 0.8%, from about 0.05% to about 0.75%, from about 0.05% to about 0.7%, from about 0.05% to about 0.65%, from about 0.05% to about 0.6%, from about 0.05% to about 0.55%, from about 0.05% to about 0.5%, from about 0.05% to about 0.45%, from about 0.05% to about 0.4%, from about 0.05% to about 0.35%, from about 0.1% to about 1%, from about 0.1% to about 0.95%, from about 0.1% to about 0.9%, from about 0.1% to about 0.85%, from about 0.1% to about 0.8%, from about 0.1% to about 0.75%, from about 0.1% to about 0.7%, from about 0.1% to about 0.65%, from about 0.1% to about 0.6%, from about 0.1% to about 0.55%, from about 0.1% to about 0.5%, from about 0.1% to about 0.45%, from about 0.1% to about 0.4%, from about 0.2% to about 1%, from about 0.2% to about 0.95%, from about 0.2% to about 0.9%, from about 0.2% to about 0.85%, from about 0.2% to about 0.8%, from about 0.2% to about 0.75%, from about 0.2% to about 0.7%, from about 0.2% to about 0.65%, from about 0.2% to about 0.6%, from about 0.2% to about 0.55%, from about 0.2% to about 0.5%, from about 0.25% to about 1%, from about 0.25% to about 0.95%, from about 0.25% to about 0.9%, from about 0.25% to about 0.85%, from about 0.25% to about 0.8%, from about 0.25% to about 0.75%, from about 0.25% to about 0.7%, from about 0.25% to about 0.65%, from about 0.25% to about 0.6%, from about 0.25% to about 0.55%, from about 0.25% to about 0.5%, from about 0.3% to about 1%, from about 0.3% to about 0.95%, from about 0.3% to about 0.9%, from about 0.3% to about 0.85%, from about 0.3% to about 0.8%, from about 0.3% to about 0.75%, from about 0.3% to about 0.7%, from about 0.3% to about 0.65% or from about 0.3% to about 0.6% by weight, based on the total weight of the delamination solution.

In some embodiments, the concentration of the delamination agent in the delamination solution is less than 1%, less than 0.95%, less than 0.9%, less than 0.85%, less than 0.8%, less than 0.75%, less than 0.7%, less than 0.65%, less than 0.6%, less than 0.55%, less than 0.5%, less than 0.45%, less than 0.4%, less than 0.35%, less than 0.3%, less than 0.25%, less than 0.2%, less than 0.15%, less than 0.1% or less than 0.05% by weight, based on the total weight of the delamination solution. In some embodiments, the concentration of the delamination agent in the delamination solution is more than 0.01%, more than 0.05%, more than 0.05%, more than 0.75%, more than 0.1%, more than 0.15%, more than 0.2%, more than 0.25%, more than 0.3%, more than 0.35%, more than 0.4%, more than 0.45%, more than 0.5%, more than 0.55%, more than 0.6%, more than 0.65%, more than 0.7%, more than 0.75%, more than 0.8%, more than 0.85% or more than 0.9% by weight, based on the total weight of the delamination solution.

In some embodiments, the surface density of the coating is from about 1 mg/cm² to about 40 mg/cm², from about 1 mg/cm² to about 35 mg/cm², from about 1 mg/cm² to about 30 mg/cm², from about 1 mg/cm² to about 25 mg/cm², from about 1 mg/cm² to about 15 mg/cm², from about 3 mg/cm² to about 40 mg/cm², from about 3 mg/cm² to about 35 mg/cm², from about 3 mg/cm² to about 30 mg/cm², from about 3 mg/cm² to about 25 mg/cm², from about 3 mg/cm² to about 20 mg/cm², from about 3 mg/cm² to about 15 mg/cm², from about 5 mg/cm² to about 40 mg/cm², from about 5 mg/cm² to about 35 mg/cm², from about 5 mg/cm² to about 30 mg/cm², from about 5 mg/cm² to about 25 mg/cm², from about 5 mg/cm² to about 20 mg/cm², from about 5 mg/cm² to about 15 mg/cm², from about 8 mg/cm² to about 40 mg/cm², from about 8 mg/cm² to about 35 mg/cm², from about 8 mg/cm² to about 30 mg/cm², from about 8 mg/cm² to about 25 mg/cm², from about 8 mg/cm² to about 20 mg/cm², from about 10 mg/cm² to about 40 mg/cm², from about 10 mg/cm² to about 35 mg/cm², from about 10 mg/cm² to about 30 mg/cm², from about 10 mg/cm² to about 25 mg/cm², from about 10 mg/cm² to about 20 mg/cm², from about 15 mg/cm² to about 40 mg/cm², or from about 20 mg/cm² to about 40 mg/cm².

In some embodiments, the surface density of the coating is less than 40 mg/cm², less than 36 mg/cm², less than 32 mg/cm², less than 28 mg/cm², less than 24 mg/cm², less than 20 mg/cm², less than 16 mg/cm², less than 12 mg/cm², less than 8 mg/cm² or less than 4 mg/cm². In some embodiments, the surface density of the coating is more than 1 mg/cm², more than 4 mg/cm², more than 8 mg/cm², more than 12 mg/cm², more than 16 mg/cm², more than 20 mg/cm², more than 24 mg/cm², more than 28 mg/cm², more than 32 mg/cm² or more than 36 mg/cm².

In some embodiments, the density of the coating is from about 0.5 g/cm³ to about 6.5 g/cm³, from about 0.5 g/cm³ to about 6.0 g/cm³, from about 0.5 g/cm³ to about 5.5 g/cm³, from about 0.5 g/cm³ to about 5.0 g/cm³, from about 0.5 g/cm³ to about 4.5 g/cm³, from about 0.5 g/cm³ to about 4.0 g/cm³, from about 0.5 g/cm³ to about 3.5 g/cm³, from about 0.5 g/cm³ to about 3.0 g/cm³, from about 0.5 g/cm³ to about 2.5 g/cm³, from about 1.0 g/cm³ to about 6.5 g/cm³, from about 1.0 g/cm³ to about 5.5 g/cm³, from about 1.0 g/cm³ to about 4.5 g/cm³, from about 1.0 g/cm³ to about 3.5 g/cm³, from about 2.0 g/cm³ to about 6.5 g/cm³, from about 2.0 g/cm³ to about 5.5 g/cm³, from about 2.0 g/cm³ to about 4.5 g/cm³, from about 3.0 g/cm³ to about 6.5 g/cm³ or from about 3.0 g/cm³ to about 6.0 g/cm³.

In some embodiments, the density of the coating is less than 6.5 g/cm³, less than 6.0 g/cm³, less than 5.5 g/cm³, less than 5.0 g/cm³, less than 4.5 g/cm³, less than 4.0 g/cm³, less than 3.5 g/cm³, less than 3.0 g/cm³, less than 2.5 g/cm³, less than 2.0 g/cm³, less than 1.5 g/cm³ or less than 0.5 g/cm³. In some embodiments, the density of the coating is more than 0.5 g/cm³, more than 1.0 g/cm³, more than 1.5 g/cm³, more than 2.0 g/cm³, more than 2.5 g/cm³, more than 3.0 g/cm³, more than 3.5 g/cm³, more than 4.0 g/cm³, more than 4.5 g/cm³, more than 5.0 g/cm³, more than 5.5 g/cm³ or more than 6.0 g/cm³.

With a higher proportion of hydrogen bond-forming group-containing monomer(s) in the copolymer that can form hydrogen bonding with the metal substrate surface, a relatively higher concentration of delamination agent in the delamination solution can be used for immersion of the composite since delamination agent is highly effective and is mainly utilized in disrupting hydrogen bond interactions between the coating and the metal substrate surface.

Conversely, with a higher proportion of charged functional group(s) (e.g. acid salt group) in the copolymer that is/are capable of developing ion-dipole interactions with the partially positively charged metal species on the metal substrate surface, a comparatively lower concentration of delamination agent (i.e. higher proportion of the aqueous solvent) in the delamination solution can be used for immersion of the composite since aqueous solvent is responsible and extremely efficacious in weakening the ion-dipole interactions between the coating and the metal substrate surface.

In some embodiments, the composite-delamination solution mixture is being stirred when the composite is being immersed into the delamination solution to achieve delamination of the composite. In some embodiments, a planetary stirring mixer, a stirring mixer, a blender, an ultrasonicator or a combination thereof is being used to stir the composite-delamination solution mixture.

In some embodiments, the composite-delamination solution mixture is stirred at a speed of from about 10 rpm to about 3000 rpm, from about 20 rpm to about 3000 rpm, from about 50 rpm to about 3000 rpm, from about 100 rpm to about 3000 rpm, from about 200 rpm to about 3000 rpm, from about 300 rpm to about 3000 rpm, from about 400 rpm to about 3000 rpm, from about 500 rpm to about 3000 rpm, from about 600 rpm to about 3000 rpm, from about 700 rpm to about 3000 rpm, from about 800 rpm to about 3000 rpm, from about 900 rpm to about 3000 rpm, from about 1000 rpm to about 3000 rpm, from about 1100 rpm to about 3000 rpm, from about 1200 rpm to about 3000 rpm, from about 1200 rpm to about 2900 rpm, from about 1200 rpm to about 2800 rpm, from about 1200 rpm to about 2700 rpm, from about 1200 rpm to about 2600 rpm, from about 1200 rpm to about 2500 rpm, from about 1200 rpm to about 2400 rpm, from about 1200 rpm to about 2300 rpm, from about 1200 rpm to about 2200 rpm, from about 1200 rpm to about 2100 rpm, from about 1200 rpm to about 2000 rpm, from about 1200 rpm to about 1900 rpm, or from about 1200 rpm to about 1800 rpm.

In some embodiments, the composite-delamination solution mixture is stirred at a speed of less than 3000 rpm, less than 2900 rpm, less than 2800 rpm, less than 2700 rpm, less than 2600 rpm, less than 2500 rpm, less than 2400 rpm, less than 2300 rpm, less than 2200 rpm, less than 2100 rpm, less than 2000 rpm, less than 1900 rpm, less than 1800 rpm, less than 1700 rpm, less than 1600 rpm, less than 1500 rpm, less than 1400 rpm, less than 1300 rpm, less than 1200 rpm, less than 1100 rpm, or less than 1000 rpm. In some embodiments, the composite-delamination solution mixture is stirred at a speed of more than 10 rpm, more than 20 rpm, more than 50 rpm, more than 100 rpm, more than 200 rpm, more than 300 rpm, more than 400 rpm, more than 500 rpm, more than 600 rpm, more than 700 rpm, more than 800 rpm, more than 900 rpm, more than 1000 rpm, more than 1100 rpm, more than 1200 rpm, more than 1300 rpm, more than 1400 rpm, more than 1600 rpm, more than 1700 rpm, more than 1800 rpm, more than 1900 rpm, or more than 2000 rpm.

In some embodiments, the composite-delamination solution mixture is stirred for a time period of from about 15 minutes to about 120 minutes, from about 15 minutes to about 110 minutes, from about 15 minutes to about 100 minutes, from about 15 minutes to about 90 minutes, from about 15 minutes to about 80 minutes, from about 15 minutes to about 70 minutes, from about 15 minutes to about 60 minutes, from about 20 minutes to about 120 minutes, from about 20 minutes to about 110 minutes, from about 20 minutes to about 100 minutes, from about 20 minutes to about 90 minutes, from about 20 minutes to about 80 minutes, from about 20 minutes to about 70 minutes, from about 20 minutes to about 60 minutes, from about 25 minutes to about 120 minutes, from about 25 minutes to about 110 minutes, from about 25 minutes to about 100 minutes, from about 25 minutes to about 90 minutes, from about 25 minutes to about 80 minutes, from about 25 minutes to about 70 minutes, from about 25 minutes to about 60 minutes, from about 30 minutes to about 120 minutes, from about 30 minutes to about 110 minutes, from about 30 minutes to about 100 minutes, from about 30 minutes to about 90 minutes, from about 30 minutes to about 80 minutes, from about 30 minutes to about 70 minutes or from about 30 minutes to about 60 minutes.

In some embodiments, the composite-delamination solution mixture is stirred for a time period of less than 120 minutes, less than 110 minutes, less than 100 minutes, less than 90 minutes, less than 80 minutes, less than 70 minutes, less than 60 minutes, less than 50 minutes, less than 40 minutes, less than 30 minutes or less than 20 minutes. In some embodiments, the composite-delamination solution mixture is stirred for a time period of more than 15 minutes, more than 20 minutes, more than 30 minutes, more than 40 minutes, more than 50 minutes, more than 60 minutes, more than 70 minutes, more than 80 minutes, more than 90 minutes, more than 100 minutes or more than 110 minutes.

In some embodiments, the planetary stirring mixer comprises at least one planetary blade and at least one high-speed dispersion blade. In certain embodiments, the rotational speed of the planetary blade is from about 20 rpm to about 200 rpm, from about 20 rpm to about 150 rpm, from about 30 rpm to about 150 rpm, or from about 50 rpm to about 100 rpm. In certain embodiments, the rotational speed of the dispersion blade is from about 1,000 rpm to about 4,000 rpm, from about 1,000 rpm to about 3,500 rpm, from about 1,000 rpm to about 3,000 rpm, from about 1,000 rpm to about 2,000 rpm, from about 1,500 rpm to about 3,000 rpm, or from about 1,500 rpm to about 2,500 rpm.

In certain embodiments, the ultrasonicator is an ultrasonic bath, a probe-type ultrasonicator or an ultrasonic flow cell. In some embodiments, the ultrasonicator is operated at a power density from about 10 W/L to about 100 W/L, from about 20 W/L to about 100 W/L, from about 30 W/L to about 100 W/L, from about 40 W/L to about 80 W/L, from about 40 W/L to about 70 W/L, from about 40 W/L to about 60 W/L, from about 40 W/L to about 50 W/L, from about 50 W/L to about 60 W/L, from about 20 W/L to about 80 W/L, from about 20 W/L to about 60 W/L, or from about 20 W/L to about 40 W/L. In certain embodiments, the ultrasonicator is operated at a power density of more than 10 W/L, more than 20 W/L, more than 30 W/L, more than 40 W/L, more than 50 W/L, more than 60 W/L, more than 70 W/L, more than 80 W/L or more than 90 W/L.

In some embodiments, the ultrasonicator operates at a power from about 100 W to about 1000 W, from about 200 W to about 1000 W, from about 300 W to about 1000 W, from about 400 W to about 1000 W, from about 500 W to about 1000 W, from about 500 W to about 900 W, from about 500 W to about 800 W, from about 500 W to about 700 W, or from about 500 W to about 600 W. In some embodiments, the ultrasonicator operates at a power of less than 1000 W, less than 900 W, less than 800 W, less than 700 W, less than 600 W, less than 500 W, less than 400 W, or less than 300 W. In some embodiments, the ultrasonicator operates at a power of more than 100 W, more than 200 W, more than 300 W, more than 400 W, more than 500 W, more than 600 W, more than 700 W, or more than 800 W.

In some embodiments, after the immersion of the composite into the delamination solution, the pH of the processed composite-delamination solution mixture is from about 2 to about 5, from about 2 to about 4.9, from about 2 to about 4.8, from about 2 to about 4.7, from about 2 to about 4.6, from about 2 to about 4.5, from about 2 to about 4.4, from about 2 to about 4.3, from about 2 to about 4.2, from about 2 to about 4.1, from about 2 to about 4, from about 2 to about 3.9, from about 2 to about 3.8, from about 2 to about 3.7, from about 2 to about 3.6, from about 2 to about 3.5, from about 2 to about 3.4, from about 2 to about 3.3, from about 2 to about 3.2, from about 2 to about 3.1, from about 2 to about 3, from about 2.5 to about 5, from about 2.5 to about 4.9, from about 2.5 to about 4.8, from about 2.5 to about 4.7, from about 2.5 to about 4.6, from about 2.5 to about 4.5, from about 2.5 to about 4.4, from about 2.5 to about 4.3, from about 2.5 to about 4.2, from about 2.5 to about 4.1, from about 2.5 to about 4, from about 2.5 to about 3.9, from about 2.5 to about 3.8, from about 2.5 to about 3.7, from about 2.5 to about 3.6, from about 2.5 to about 3.5, from about 3 to about 4.9, from about 3 to about 4.8, from about 3 to about 4.7, from about 3 to about 4.6, from about 3 to about 4.5, from about 3 to about 4.4, from about 3 to about 4.3, from about 3 to about 4.2, from about 3 to about 4.1 or from about 3 to about 4.

In some embodiments, after the immersion of the composite into the delamination solution, the pH of the processed composite-delamination solution mixture is less than 5, less than 4.9, less than 4.8, less than 4.7, less than 4.6, less than 4.5, less than 4.4, less than 4.3, less than 4.2, less than 4.1, less than 4, less than 3.9, less than 3.8, less than 3.7, less than 3.6, less than 3.5, less than 3.4, less than 3.3, less than 3.2, less than 3.1, less than 3, less than 2.9, less than 2.8, less than 2.7, less than 2.6, less than 2.5, less than 2.4, less than 2.3 or less than 2.2. In some embodiments, after the immersion of the composite into the delamination solution, the pH of the processed composite-delamination solution mixture is more than 2, more than 2.1, more than 2.2, more than 2.3, more than 2.4, more than 2.5, more than 2.6, more than 2.7, more than 2.8, more than 2.9, more than 3, more than 3.1, more than 3.2, more than 3.3, more than 3.4, more than 3.5, more than 3.6, more than 3.7, more than 3.8, more than 3.9, more than 4, more than 4.1, more than 4.2, more than 4.3, more than 4.4, more than 4.5, more than 4.6, more than 4.7 or more than 4.8.

In some embodiments, after the immersion of the composite into the delamination solution, the composite is delaminated into composite constituents layers. In some embodiments, after the immersion of the composite into the delamination solution, the composite is delaminated into a coating layer and a metal substrate layer.

In some embodiments, the processed composite-delamination solution mixture is screened to separate composite constituents layers from the delamination solution. In some embodiments, the processed composite-delamination solution mixture is screened to separate the coating layer and the metal substrate layer from the delamination solution.

In some embodiments, filtration, sieving, decantation or a combination thereof may be used for screening of the processed composite-delamination solution mixture.

In some embodiments, the mesh width of the sieve is from about 0.1 mm to about 8 mm, from about 0.1 mm to about 7.5 mm, from about 0.1 mm to about 7 mm, from about 0.1 mm to about 6.5 mm, from about 0.1 mm to about 6 mm, from about 0.1 mm to about 5.5 mm, from about 0.1 mm to about 5 mm, from about 0.1 mm to about 4.5 mm, from about 0.1 mm to about 4 mm, from about 0.1 mm to about 3.5 mm, from about 0.1 mm to about 3 mm, from about 0.1 mm to about 2.5 mm, from about 0.1 mm to about 2 mm, from about 0.5 mm to about 8 mm, from about 0.5 mm to about 7.5 mm, from about 0.5 mm to about 7 mm, from about 0.5 mm to about 6.5 mm, from about 0.5 mm to about 6 mm, from about 0.5 mm to about 5.5 mm, from about 0.5 mm to about 5 mm, from about 0.5 mm to about 4.5 mm, from about 0.5 mm to about 4 mm, from about 0.5 mm to about 3.5 mm, from about 0.5 mm to about 3 mm, from about 1 mm to about 8 mm, from about 1 mm to about 7.5 mm, from about 1 mm to about 7 mm, from about 1 mm to about 6.5 mm, from about 1 mm to about 5.5 mm, from about 1 mm to about 5 mm, from about 1 mm to about 4.5 mm, from about 1 mm to about 4 mm, from about 1 mm to about 3.5 mm or from about 1 mm to about 3 mm.

In some embodiments, the mesh width of the sieve is less than 8 mm, less than 7.5 mm, less than 7 mm, less than 6.5 mm, less than 6 mm, less than 5.5 mm, less than 5 mm, less than 4.5 mm, less than 4 mm, less than 3.5 mm, less than 3 mm, less than 2.5 mm, less than 2 mm, less than 1.5 mm, less than 1 mm or less than 0.5 mm. In some embodiments, the mesh width of the sieve is more than 0.1 mm, more than 0.5 mm, more than 1 mm, more than 1.5 mm, more than 2 mm, more than 2.5 mm, more than 3 mm, more than 3.5 mm, more than 4 mm, more than 4.5 mm, more than 5 mm, more than 5.5 mm, more than 6 mm, more than 6.5 mm, more than 7 mm or more than 7.5 mm.

Figure 4:
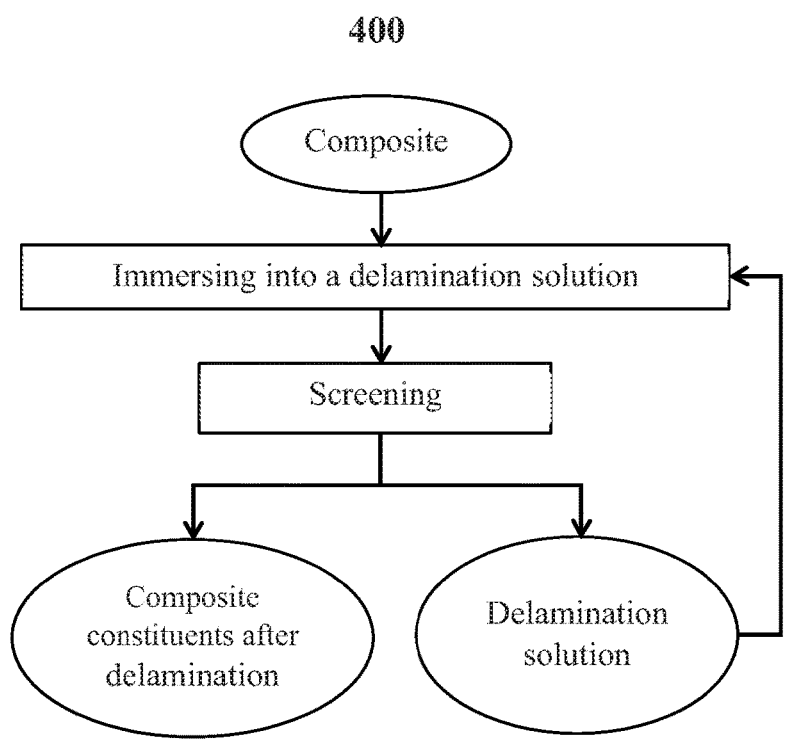
FIG. 4 is a flow chart of an embodiment illustrating the steps for delaminating a composite as disclosed herein and its subsequent further processing for extraction of composite constituents.

FIG. 4 is a flow chart of an embodiment illustrating the steps of method 400 for delaminating a composite as disclosed herein and its subsequent further processing for extraction of composite constituents. Owing to the considerably low corrosion and dissolution tendencies of the metal substrate and other composite metal constituents in the present invention, the extracted delamination solution is not necessarily required to be subjected to purification for further reuse. The extracted delamination solution may be reused for delamination of other composites. This allows the formation of a closed-loop recovery process where materials are repeatedly recycled and reused, and continually engage in a loop arrangement, which helps create a circular economy.

In some embodiments, the recovered delaminated composite constituents may be subjected to additional separation and/or extraction process to further extract their respective constituents contained within. In some embodiments, the recovered coating layer and metal substrate layer may be subjected to additional separation and/or extraction process to further extract their respective constituents contained within.

The method of the present invention is particularly applicable to achieve delamination of an electrode in batteries.

In some embodiments, the battery may be a primary battery or a secondary battery. Some non-limiting examples of the battery include alkaline battery, aluminium-air battery, lithium battery, lithium air battery, magnesium battery, solid-state battery, silver-oxide battery, zinc-air battery, aluminium-ion battery, lead-acid battery, lithium-ion battery, magnesium-ion battery, potassium-ion battery, sodium-ion battery, sodium-air battery, silicon-air battery, zinc-ion battery and sodium-sulphur battery.

Over the past decades, lithium-ion batteries (LIBs) have become to be widely utilized in various applications, especially consumer electronics, because of their outstanding energy density, long cycle life and high discharging capability. Due to rapid market development of electric vehicles (EV) and grid energy storage, high-performance, low-cost LIBs are currently offering one of the most promising options for large-scale energy storage devices.

With the drastic increase of lithium-ion batteries in circulation, concerns have been raised regarding flooding of the market with end-of-life (EoL) batteries. As tremendous amount of lithium-ion batteries are projected to approach their end-of-life, there is a pressing need in developing economical recycling processes for spent lithium-ion batteries to manage the end-of-life packs and cells. Aside from end-of-life batteries, there are large amount of electrode rejects or scraps generated during the battery manufacturing process that would require to be recycled.

There are currently two main recycling strategies, namely pyrometallurgical process and hydrometallurgical process, proposed or employed for recycling end-of-life batteries, especially in the recovery of cathode constituents since cathode materials constitute the major high value added in production.

Pyrometallurgical process involves heating of the electrodes at high temperatures, beyond the decomposition temperature of the polymeric binder but ideally below the melting temperatures of other electrode constituents e.g. current collector and electrode active material. This process brings about the carbonization of the polymeric binder where recycling and/or reclaim of the polymeric binder is not feasible. On top of that, the combustion process might generate toxic compounds and/or pollutants produced by the decomposition of the polymeric binder. For example, in the case where an electrode that comprises polyvinylidene fluoride (PVDF) binder material undergoes pyrometallurgy, toxic compounds that could impose long-term health risks such as hydrogen fluoride would be produced. Pyrometallurgical process is also highly energy intensive and thus results in immense associated energy costs.

Hydrometallurgical process involves the use of a solvent in removing the polymeric binder that enables the separation of the electrode layer from the current collector. This process often involves the use of caustic solvents (e.g. concentrated hydrochloric acid, sulfuric acid and nitric acid) to achieve polymeric binder removal. The use of concentrated mineral acids not only poses high safety and environmental risks, it also runs the risk of reacting with current collector, electrode active materials and other electrode metal constituents, leading to corrosion of metal parts. For example, the current collector of the cathode, mostly commonly aluminium, is very likely to react with concentrated mineral acids, where aluminium leaches out from the current collector, making the recovery of the aluminium difficult. In addition, hydrometallurgical process requires complicated subsequent purification and separation steps for recovering electrode constituents. Hydrometallurgical processes have been mainly used for delamination of an electrode layer derived from organic-based slurries which require the use of some specific organic solvents such as N-methyl-2-pyrrolidone (NMP) which is toxic and hence requires specific handling. The use such hydrometallurgical processes in attaining electrode delamination would only be applicable to electrodes manufactured using organic-based slurries.

Current methods in delaminating electrode layers from current collectors have their own shortcomings and are ineffective in delaminating an electrode layer derived from water-based slurries. In view of this, there is a need to develop a method to achieve highly efficient and complete delamination of electrode layer derived from water-based slurries from the metal collector.

Accordingly, the method of the present invention is particularly applicable to achieve delamination of an electrode in lithium-ion batteries (LIBs) by immersing the electrode into a delamination solution; wherein the electrode comprises a current collector and an electrode layer coated on one side or both sides of the current collector comprising a polymeric binder; and wherein the polymeric binder comprises a copolymer comprising a structural unit derived from an acid group-containing monomer.

Figure 5:
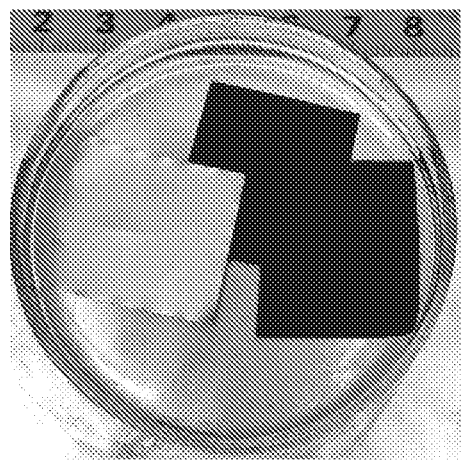
FIG. 5 depicts the recovered cathode layers and current collector of Example 2 after the immersion of the double side-coated cathode into the delamination solution comprising a citric acid of 0.50 wt % concentration and DI water.

FIG. 5 depicts the recovered cathode layers and current collector of Example 2 after the immersion of the double side-coated cathode into the delamination solution comprising a citric acid of 0.50 wt % concentration and DI water. The cathode layers are shown to completely delaminated from the aluminium current collector and the shiny glare on the aluminium foil surface indicates that there is no observable corrosion on the aluminium.

The method of the present invention is particularly applicable to delaminate the electrode layer manufactured via a water-based slurry from the current collector. The aqueous slurry utilizes an aqueous polymeric binder for adhering the active material particles and the conductive agent together with the current collector to form a continuous electrical conduction path. Along with an enhanced adhesive capability, the polymeric binder disclosed herein is capable of facilitating electron and ion transportation to reduce the impedance between the current collector and the electrode materials and have sufficient elasticity to prevent the electrode from swelling due to volume expansion and contraction during charging and discharging.

The delamination method disclosed herein allows an electrode comprising a current collector and an electrode layer coated on one side or both sides of the current collector by means of an aqueous polymeric binder to be effectively delaminated by the simple use of a delaminating solution.

In some embodiments, the polymeric binder comprises a copolymer comprising a structural unit (a) derived from an acid group-containing monomer. In some embodiments, the proportion of structural unit (a) derived from an acid group-containing monomer present in the polymeric binder is at least 15% by mole, based on the total number moles of monomeric units in the copolymer in the polymeric binder, which allows for the polymeric binder disclosed herein exhibiting excellent dispersibility and stability in water.

Figure 6:
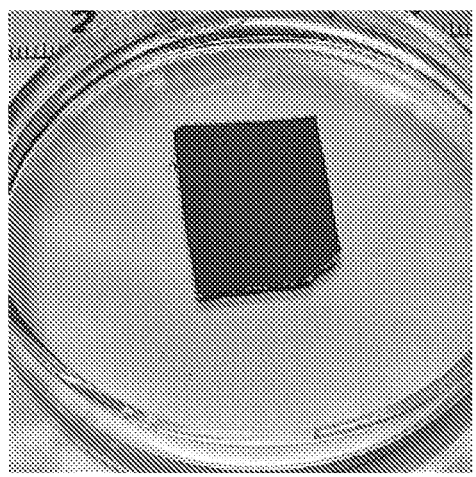
FIG. 6 depicts the recovered cathode of Comparative Example 1 wherein the double side-coated cathode that is being immersed in the delamination solution comprises polyvinylidene fluoride (PVDF) as the polymeric binder.

FIG. 6 depicts the recovered cathode of Comparative Example 1 wherein the double side-coated cathode that is being immersed in the delamination solution comprises polyvinylidene fluoride (PVDF) as the polymeric binder. The delamination solution used herein comprises a citric acid of 0.50 wt % concentration and DI water. The delamination of the cathode layers from the aluminium current collector is shown to be unsuccessful where the cathode layers still strongly adhere onto the aluminium current collector despite being immersed into the delamination solution. This indicates that the use of the delamination agent disclosed in the present invention to achieve electrode delamination is not applicable to electrode comprising non-aqueous polymeric binder such as PVDF.

The current collector acts to collect electrons generated by electrochemical reactions of the cathode active material or to supply electrons required for the electrochemical reactions. In some embodiments, the current collector can be in the form of a foil, sheet or film. In some embodiments, the current collector is a metal. In some embodiments, the current collector is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, an electrically-conductive resin or a combination thereof.

In certain embodiments, the current collector has a two-layered structure comprising an outer layer and an inner layer, wherein the outer layer comprises a conductive material and the inner layer comprises an insulating material or another conductive material; for example, a polymeric insulating material coated with an aluminum layer or an aluminum mounted with a conductive resin layer. In some embodiments, the conductive material is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof.

In some embodiments, the current collector has a three-layered structure comprising an outer layer, a middle layer and an inner layer, wherein the outer and inner layers comprise a conductive material and the middle layer comprises an insulating material or another conductive material;

for example, a plastic material coated with a metal layer on both sides. In certain embodiments, each of the outer layer, middle layer and inner layer is independently stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof.

In some embodiments, the insulating material is a polymeric material selected from the group consisting of polycarbonate, polyacrylate, polyacrylonitrile, polyester, polyamide, polystyrene, polyurethane, polyepoxy, poly (acrylonitrile butadiene styrene), polyimide, polyolefin, polyethylene, polypropylene, polyphenylene sulfide, poly (vinyl ester), polyvinyl chloride, polyether, polyphenylene oxide, cellulose polymer and combinations thereof. In certain embodiments, the current collector has more than three layers. In some embodiments, the current collector is coated with a protective coating. In certain embodiments, the protective coating comprises a carbon-containing material. In some embodiments, the current collector is not coated with a protective coating.

The thickness of the current collector affects the volume it occupies within the battery, the amount of the electrode active material needed, and hence the capacity in the battery. In some embodiments, the current collector has a thickness from about 5 μm to about 30 μm. In certain embodiments, the current collector has a thickness from about 5 μm to about 20 μm, from about 5 μm to about 15 μm, from about 10 μm to about 30 μm, from about 10 μm to about 25 μm, or from about 10 μm to about 20 μm.

In some embodiments, the current collector has a thickness of less than 30 μm, less than 28 μm, less than 26 μm, less than 24 μm, less than 22 μm, less than 20 μm, less than 18 μm, less than 16 μm, less than 14 μm, less than 12 μm, less than 10 μm, less than 8 μm or less than 6 μm. In some embodiments, the current collector has a thickness of more than 5 μm, more than 7 μm, more than 10 μm, more than 12 μm, more than 14 μm, more than 16 μm, more than 18 μm, more than 20 μm, more than 22 μm, more than 24 μm, more than 26 μm or more than 28 μm.

In some embodiments, the electrode may be a cathode or an anode. In some embodiments, the electrode layer further comprises an electrode active material.

In some embodiments, the active battery electrode material is a cathode active material, wherein the cathode active material is selected from the group consisting of $LiCoO_2$, $LiNiO_2$, $LiNi_xMn_yO_2$, $LiCo_xNi_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.1 to 0.9; each y is independently from 0 to 0.9; each z is independently from 0 to 0.4. In certain embodiments, each x in the above general formula is independently selected from 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each y in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each z in the above general formula is independently selected from 0, 0.025, 0.05, 0.075, 0.1, 0.125, 0.15, 0.175, 0.2, 0.225, 0.25, 0.275, 0.3, 0.325, 0.35, 0.375 and 0.4. In some embodiments, each x, y and z in the above general formula independently has a 0.01 interval.

In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiCo_xNi_yO_2$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode active material is not $LiNi_xMn_yO_2$, $Li_{1+z}Ni_xMn_yCo_{1-x-y}O_2$, $LiNi_xCo_yAl_zO_2$ or $LiCo_xNi_yO_2$, wherein each x is independently from 0.1 to 0.9; each y is independently from 0 to 0.45; and each z is independently from 0 to 0.2. In certain embodiments, the cathode active material is $Li_{1+x}Ni_aMn_bCo_cAl_{(1-a-b-c)}O_2$; wherein $-0.2 \leq x \leq 0.2$, $0 \leq a < 1$, $0 \leq b < 1$, $0 \leq c < 1$, and $a+b+c \leq 1$. In some embodiments, the cathode active material has the general formula $Li_{1+x}Ni_aMn_bCo_cAl_{(1-a-b-c)}O_2$, with $0.33 \leq a \leq 0.92$, $0.33 \leq a \leq 0.9$, $0.33 \leq a \leq 0.8$, $0.4 \leq a \leq 0.92$, $0.4 \leq a \leq 0.9$, $0.4 \leq a \leq 0.8$, $0.5 \leq a \leq 0.92$, $0.5 \leq a \leq 0.9$, $0.5 \leq a \leq 0.8$, $0.6 \leq a \leq 0.92$, or $0.6 \leq a \leq 0.9$; $0 \leq b \leq 0.5$, $0 \leq b \leq 0.4$, $0 \leq b \leq 0.3$, $0 \leq b \leq 0.2$, $0.1 \leq b \leq 0.5$, $0.1 \leq b \leq 0.4$, $0.1 \leq b \leq 0.3$, $0.1 \leq b \leq 0.2$, $0.2 \leq b \leq 0.5$, $0.2 \leq b \leq 0.4$, or $0.2 \leq b \leq 0.3$; $0 \leq c \leq 0.5$, $0 \leq c \leq 0.4$, $0 \leq c \leq 0.3$, $0.1 \leq c \leq 0.5$, $0.1 \leq c \leq 0.4$, $0.1 \leq c \leq 0.3$, $0.1 \leq c \leq 0.2$, $0.2 \leq c \leq 0.5$, $0.2 \leq c \leq 0.4$, or $0.2 \leq c \leq 0.3$. In some embodiments, the cathode active material has the general formula $LiMPO_4$, wherein M is selected from the group consisting of Fe, Co, Ni, Mn, Al, Mg, Zn, Ti, La, Ce, Sn, Zr, Ru, Si, Ge and combinations thereof. In some embodiments, the cathode active material is selected from the group consisting of $LiFePO_4$, $LiCoPO_4$, $LiNiPO_4$, $LiMnPO_4$, $LiMnFePO_4$, $LiMn_xFe_{(1-x)}PO_4$ and combinations thereof; wherein $0 < x < 1$. In some embodiments, the cathode active material is $LiNi_xMn_yO_4$; wherein $0.1 \leq x \leq 0.9$ and $0 \leq y \leq 2$. In certain embodiments, the cathode active material is $xLi_2MnO_3 \cdot (1-x)LiMO_2$, wherein M is selected from the group consisting of Ni, Co, Mn and combinations thereof; and wherein $0 < x < 1$. In some embodiments, the cathode active material is $Li_3V_2(PO_4)_3$, $LiVPO_4F$. In certain embodiments, the cathode active material has the general formula $Li_2MSiO_4$, wherein M is selected from the group consisting of Fe, Co, Mn, Ni, and combinations thereof.

In certain embodiments, the cathode active material is doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In some embodiments, the dopant is not Co, Cr, V, Mo, Nb, Pd, F, Na, Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.8}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.3302}$, $LiNi_{0.4}Mn_{0.4}Co_{0.2}O_2$, $LiNi_{0.8}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCo_aNi_bO_2$, $LiMn_aNi_bO_2$, and combinations thereof; wherein $-0.2 \leq x \leq 0.2$, $0 \leq a < 1$, $0 \leq b < 1$, $0 \leq c < 1$, and $a+b+c \leq 1$. In certain embodiments, each x in the above general formula is independently selected from −0.2, −0.175, −0.15, −0.125, −0.1, −0.075, −0.05, −0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiment, each x, a, b and c in the above general formula independently has a 0.01 interval. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCo_aNi_bO_2$, $LiMn_aNi_bO_2$, and combinations thereof; wherein $-0.2 \leq x \leq 0.2$, $0 \leq a < 1$, $0 \leq b < 1$, $0 \leq c < 1$, and $a+b+c \leq 1$. In certain embodiments, x in the above general formula is independently selected from −0.2, −0.175, −0.15, −0.125, −0.1, −0.075, −0.05, −0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiment, each x, a, b and c in the above general formula independently has a 0.01 interval. In some embodiments, the transition metal oxide is selected from the group consisting of $Fe_2O_3$, $MnO_2$, $Al_2O_3$, MgO, ZnO, $TiO_2$, $La_2O_3$, $CeO_2$, $SnO_2$, $ZrO_2$, $RuO_2$, and combinations thereof. In certain embodiments, the shell comprises a lithium transition metal oxide and a transition metal oxide.

In some embodiments, the diameter of the core is from about 1 μm to about 15 μm, from about 3 μm to about 15 μm, from about 3 μm to about 10 μm, from about 5 μm to about 10 μm, from about 5 μm to about 45 μm, from about 5 μm to about 35 μm, from about 5 μm to about 25 μm, from about 10 μm to about 45 μm, from about 10 μm to about 40 μm, or from about 10 μm to about 35 μm, from about 10 μm to about 25 μm, from about 15 μm to about 45 μm, from about 15 μm to about 30 μm, from about 15 μm to about 25 μm, from about 20 μm to about 35 μm, or from about 20 μm to about 30 μm. In certain embodiments, the thickness of the shell is from about 1 μm to about 45 μm, from about 1 μm to about 35 μm, from about 1 μm to about 25 μm, from about 1 μm to about 15 μm, from about 1 μm to about 10 μm, from about 1 μm to about 5 μm, from about 3 μm to about 15 μm, from about 3 μm to about 10 μm, from about 5 μm to about 10 μm, from about 10 μm to about 35 μm, from about 10 μm to about 20 μm, from about 15 μm to about 30 μm, from about 15 μm to about 25 μm, or from about 20 μm to about 35 μm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

In some embodiments, the electrode active material is an anode active material, wherein the anode active material is selected the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is doped with a metallic element or a nonmetal element. In some embodiments, the metallic element is selected from the group consisting of Fe, Ni, Mn, Al, Mg, Zn, Ti, La, Ce, Sn, Zr, Ru and combinations thereof. In some embodiments, the nonmetal element is B, Si, Ge, N, P, F, S, Cl, I, Se and combinations thereof.

In some embodiments, the anode active material comprises or is a core-shell composite having a core and shell structure, wherein the core and the shell each is independently selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the core-shell composite comprises a core comprising a carbonaceous material and a shell coated on the carbonaceous material core. In some embodiments, the carbonaceous material is selected from the group consisting of soft carbon, hard carbon, natural graphite particulate, synthetic graphite particulate, mesocarbon microbeads, Kish graphite, pyrolytic carbon, mesophase pitches, mesophase pitch-based carbon fiber, and combinations thereof. In certain embodiments, the shell is selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is not doped with a metallic element or a nonmetal element. In some embodiments, the anode active material is not doped with Fe, Ni, Mn, Al, Mg, Zn, Ti, La, Ce, Sn, Zr, Ru, B, Si, Ge, N, P, F, S, Cl, I, or Se.

In some embodiments, the electrode layer may additionally comprise other additives for enhancing electrode properties. In some embodiments, the additives may include conductive agents, surfactants, dispersants and flexibility enhancement additives.

In other embodiments, the electrode layer further comprises a conductive agent. The conductive agent is for enhancing the electrically-conducting property of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P, 0-dimensional KS6, 1-dimensional vapor grown carbon fibers (VGCF), mesoporous carbon and combinations thereof.

The polymeric binder applied in the present invention exhibits strong adhesion to the current collector. It is important for the polymeric binder to have good adhesive strength to the current collector as it promotes the binding force of the electrode layer to the current collector in the making of battery electrode, prevents separation and enhances the mechanical stability of the electrode. In some embodiments, the adhesive strength between the polymeric binder and the current collector is from about 2 N/cm to about 6 N/cm, from about 2 N/cm to about 5.8 N/cm, from about 2 N/cm to about 5.6 N/cm, from about 2 N/cm to about 5.4 N/cm, from about 2 N/cm to about 5.2 N/cm, from about 2 N/cm to about 5 N/cm, from about 2 N/cm to about 4.8 N/cm, from about 2 N/cm to about 4.6 N/cm, from about 2 N/cm to about 4.4 N/cm, from about 2 N/cm to about 4.2 N/cm, from about 2 N/cm to about 4 N/cm, from about 2 N/cm to about 3.9 N/cm, from about 2 N/cm to about 3.8 N/cm, from about 2 N/cm to about 3.7 N/cm, from about 2 N/cm to about 3.6 N/cm, from about 2 N/cm to about 3.5 N/cm, from about 2 N/cm to about 3.4 N/cm, from about 2 N/cm to about 3.3 N/cm, from about 2 N/cm to about 3.2 N/cm, from about 2 N/cm to about 3.1 N/cm, from about 2 N/cm to about 3 N/cm, from about 2.1 N/cm to about 6 N/cm, from about 2.2 N/cm to about 6 N/cm, from about 2.3 N/cm to about 6 N/cm, from about 2.4 N/cm to about 6 N/cm, from about 2.5 N/cm to about 6 N/cm, from about 2.6 N/cm to about 6 N/cm, from about 2.7 N/cm to about 6 N/cm, from about 2.8 N/cm to about 6 N/cm, from about 2.9 N/cm to about 6 N/cm, from about 3 N/cm to about 6 N/cm, from about 3.1 N/cm to about 6 N/cm, from about 3.2 N/cm to about 6 N/cm, from about 3.3 N/cm to about 6 N/cm, from about 3.4 N/cm to about 6 N/cm, from about 3.5 N/cm to about 6 N/cm, from about 3.6N/cm to about 6 N/cm, from about 3.7 N/cm to about 6 N/cm, from about 3.8 N/cm to about 6 N/cm, from about 3.9 N/cm to about 6 N/cm, from about 4 N/cm to about 6 N/cm, from about 2.5 N/cm to about 5.5 N/cm, from about 2.5 N/cm to about 5 N/cm, from about 2.5 N/cm to about 4.5 N/cm, from about 2.5 N/cm to about 4 N/cm, from about 2.5 N/cm to about 3.5 N/cm, from about 3 N/cm to about 5 N/cm, from about 2.2 N/cm to about 4.2 N/cm or from about 2.2 N/cm to about 5.2 N/cm.

In some embodiments, the adhesive strength between the polymeric binder and the current collector is less than 6 N/cm, less than 5.8 N/cm, less than 5.6 N/cm, less than 5.4 N/cm, less than 5.2 N/cm, less than 5 N/cm, less than 4.8 N/cm, less than 4.6 N/cm, less than 4.4 N/cm, less than 4.2 N/cm, less than 4 N/cm, less than 3.9 N/cm, less than 3.8 N/cm, less than 3.7 N/cm, less than 3.6 N/cm, less than 3.5 N/cm, less than 3.4 N/cm, less than 3.3 N/cm, less than 3.2 N/cm, less than 3.1 N/cm, less than 3 N/cm, less than 2.9 N/cm, less than 2.8 N/cm, less than 2.7 N/cm, less than 2.6 N/cm, less than 2.5 N/cm, less than 2.4 N/cm, less than 2.3 N/cm or less than 2.2 N/cm. In some embodiments, the adhesive strength between the polymeric binder and the current collector is more than 2 N/cm, more than 2.1 N/cm, more than 2.2 N/cm, more than 2.3 N/cm, more than 2.4 N/cm, more than 2.5 N/cm, more than 2.6 N/cm, more than 2.7 N/cm, more than 2.8 N/cm, more than 2.9 N/cm, more than 3 N/cm, more than 3.1 N/cm, more than 3.2 N/cm, more than 3.3 N/cm, more than 3.4 N/cm, more than 3.5 N/cm, more than 3.6 N/cm, more than 3.7 N/cm, more than 3.8 N/cm, more than 3.9 N/cm, more than 4 N/cm, more than 4.2 N/cm, more than 4.4 N/cm, more than 4.6 N/cm, more than 4.8 N/cm, more than 5 N/cm, more than 5.2 N/cm, more than 5.4 N/cm, more than 5.6 N/cm or more than 5.8 N/cm.

In addition, the polymeric binder applied in the present invention allows the exhibition of strong adhesion of the electrode layer to the current collector in an electrode. It is important for the electrode layer to have good peeling strength to the current collector as this would greatly influence the mechanical stability of the electrodes and the cyclability of the battery. Therefore, the electrodes should have sufficient peeling strength to withstand the rigors of battery manufacture.

In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5 N/cm to about 2.0 N/cm from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm.

In some embodiments, the peeling strength between the current collector and the electrode layer is 1.0 N/cm or more, 1.2 N/cm or more, 1.5 N/cm or more, 2.0 N/cm or more, 2.2

N/cm or more, 2.5 N/cm or more, 3.0 N/cm or more, 3.5 N/cm or more, 4.5 N/cm or more, 5.0 N/cm or more, 5.5 N/cm or more, 6.0 N/cm or more, 6.5 N/cm or more, 7.0 N/cm or more or 7.5 N/cm or more. In some embodiments, the peeling strength between the current collector and the electrode layer is less than 8.0 N/cm, less than 7.5 N/cm, less than 7.0 N/cm, less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

In some embodiments, the surface density of each of the cathode and anode electrode layer is independently from about 1 mg/cm$^2$ to about 40 mg/cm$^2$, from about 1 mg/cm$^2$ to about 35 mg/cm$^2$, from about 1 mg/cm$^2$ to about 30 mg/cm$^2$, from about 1 mg/cm$^2$ to about 25 mg/cm$^2$, from about 1 mg/cm$^2$ to about 15 mg/cm$^2$, from about 3 mg/cm$^2$ to about 40 mg/cm$^2$, from about 3 mg/cm$^2$ to about 35 mg/cm$^2$, from about 3 mg/cm$^2$ to about 30 mg/cm$^2$, from about 3 mg/cm$^2$ to about 25 mg/cm$^2$, from about 3 mg/cm$^2$ to about 20 mg/cm$^2$, from about 3 mg/cm$^2$ to about 15 mg/cm$^2$, from about 5 mg/cm$^2$ to about 40 mg/cm$^2$, from about 5 mg/cm$^2$ to about 35 mg/cm$^2$, from about 5 mg/cm$^2$ to about 30 mg/cm$^2$, from about 5 mg/cm$^2$ to about 25 mg/cm$^2$, from about 5 mg/cm$^2$ to about 20 mg/cm$^2$, from about 5 mg/cm$^2$ to about 15 mg/cm$^2$, from about 8 mg/cm$^2$ to about 40 mg/cm$^2$, from about 8 mg/cm$^2$ to about 35 mg/cm$^2$, from about 8 mg/cm$^2$ to about 30 mg/cm$^2$, from about 8 mg/cm$^2$ to about 25 mg/cm$^2$, from about 8 mg/cm$^2$ to about 20 mg/cm$^2$, from about 10 mg/cm$^2$ to about 40 mg/cm$^2$, from about 10 mg/cm$^2$ to about 35 mg/cm$^2$, from about 10 mg/cm$^2$ to about 30 mg/cm$^2$, from about 10 mg/cm$^2$ to about 25 mg/cm$^2$, from about 10 mg/cm$^2$ to about 20 mg/cm$^2$, from about 15 mg/cm$^2$ to about 40 mg/cm$^2$, or from about 20 mg/cm$^2$ to about 40 mg/cm$^2$.

In some embodiments, the surface density of each of the cathode and anode electrode layer is independently less than 40 mg/cm$^2$, less than 36 mg/cm$^2$, less than 32 mg/cm$^2$, less than 28 mg/cm$^2$, less than 24 mg/cm$^2$, less than 20 mg/cm$^2$, less than 16 mg/cm$^2$, less than 12 mg/cm$^2$, less than 8 mg/cm$^2$ or less than 4 mg/cm$^2$. In some embodiments, the surface density of each of the cathode and anode electrode layer is independently more than 1 mg/cm$^2$, more than 4 mg/cm$^2$, more than 8 mg/cm$^2$, more than 12 mg/cm$^2$, more than 16 mg/cm$^2$, more than 20 mg/cm$^2$, more than 24 mg/cm$^2$, more than 28 mg/cm$^2$, more than 32 mg/cm$^2$ or more than 36 mg/cm$^2$.

In some embodiments, the density of each of the cathode and anode electrode layer is independently from about 0.5 g/cm$^3$ to about 6.5 g/cm$^3$, from about 0.5 g/cm$^3$ to about 6.0 g/cm$^3$, from about 0.5 g/cm$^3$ to about 5.5 g/cm$^3$, from about 0.5 g/cm$^3$ to about 5.0 g/cm$^3$, from about 0.5 g/cm$^3$ to about 4.5 g/cm$^3$, from about 0.5 g/cm$^3$ to about 4.0 g/cm$^3$, from about 0.5 g/cm$^3$ to about 3.5 g/cm$^3$, from about 0.5 g/cm$^3$ to about 3.0 g/cm$^3$, from about 0.5 g/cm$^3$ to about 2.5 g/cm$^3$, from about 1.0 g/cm$^3$ to about 6.5 g/cm$^3$, from about 1.0 g/cm$^3$ to about 5.5 g/cm$^3$, from about 1.0 g/cm$^3$ to about 4.5 g/cm$^3$, from about 1.0 g/cm$^3$ to about 3.5 g/cm$^3$, from about 2.0 g/cm$^3$ to about 6.5 g/cm$^3$, from about 2.0 g/cm$^3$ to about 5.5 g/cm$^3$, from about 2.0 g/cm$^3$ to about 4.5 g/cm$^3$, from about 3.0 g/cm$^3$ to about 6.5 g/cm$^3$ or from about 3.0 g/cm$^3$ to about 6.0 g/cm$^3$.

In some embodiments, the density of each of the cathode and anode electrode layer is independently less than 6.5 g/cm$^3$, less than 6.0 g/cm$^3$, less than 5.5 g/cm$^3$, less than 5.0 g/cm$^3$, less than 4.5 g/cm$^3$, less than 4.0 g/cm$^3$, less than 3.5 g/cm$^3$, less than 3.0 g/cm$^3$, less than 2.5 g/cm$^3$, less than 2.0 g/cm$^3$, less than 1.5 g/cm$^3$ or less than 0.5 g/cm$^3$. In some embodiments, the density of each of the cathode and anode electrode layer is independently more than 0.5 g/cm$^3$, more than 1.0 g/cm$^3$, more than 1.5 g/cm$^3$, more than 2.0 g/cm$^3$, more than 2.5 g/cm$^3$, more than 3.0 g/cm$^3$, more than 3.5 g/cm$^3$, more than 4.0 g/cm$^3$, more than 4.5 g/cm$^3$, more than 5.0 g/cm$^3$, more than 5.5 g/cm$^3$ or more than 6.0 g/cm$^3$.

In some embodiments, as the electrode is immersed into the delamination solution to achieve delamination of the electrode, the weight ratio of the electrode to the delamination solution is from about 0.01% to about 5%, from about 0.01% to about 4.8%, from about 0.01% to about 4.6%, from about 0.01% to about 4.4%, from about 0.01% to about 4.2%, from about 0.01% to about 4%, from about 0.01% to about 3.8%, from about 0.01% to about 3.6%, from about 0.01% to about 3.4%, from about 0.01% to about 3.2%, from about 0.01% to about 3%, from about 0.01% to about 2.8%, from about 0.01% to about 2.6%, from about 0.01% to about 2.4%, from about 0.01% to about 2.2%, 0.01% to about 2%, from about 0.01% to about 1.9%, from about 0.01% to about 1.8%, from about 0.01% to about 1.7%, from about 0.01% to about 1.6%, from about 0.01% to about 1.5%, from about 0.01% to about 1.4%, from about 0.01% to about 1.3%, from about 0.01% to about 1.2%, from about 0.01% to about 1.1%, from about 0.01% to about 1%, from about 0.01% to about 0.9%, from about 0.01% to about 0.8%, from about 0.1% to about 5%, from about 0.1% to about 4.5%, from about 0.1% to about 4%, from about 0.1% to about 3.5%, from about 0.1% to about 3%, from about 0.1% to about 2.5%, from about 0.1% to about 2%, from about 0.1% to about 1.9%, from about 0.1% to about 1.8%, from about 0.1% to about 1.7%, from about 0.1% to about 1.6%, from about 0.1% to about 1.5%, from about 0.1% to about 1.4%, from about 0.1% to about 1.3%, from about 0.1% to about 1.2%, from about 0.1% to about 1.1%, from about 0.1% to about 1%, from about 0.1% to about 0.9%, from about 0.1% to about 0.8%, from about 0.2% to about 5%, from about 0.2% to about 4.5%, from about 0.2% to about 4%, from about 0.2% to about 3.5%, from about 0.2% to about 3%, from about 0.2% to about 2.5%, from about 0.2% to about 2%, from about 0.2% to about 1.9%, from about 0.2% to about 1.8%, from about 0.2% to about 1.7%, from about 0.2% to about 1.6%, from about 0.2% to about 1.5%, from about 0.2% to about 1.4%, from about 0.2% to about 1.3%, from about 0.2% to about 1.2%, from about 0.2% to about 1.1%, from about 0.2% to about 1%, from about 0.2% to about 0.9%, from about 0.2% to about 0.8%, from about 0.3% to about 4%, from about 0.3% to about 3%, from about 0.3% to about 1.5%, from about 0.3% to about 1% or from about 0.3% to about 0.8%.

In some embodiments, as the electrode is immersed into the delamination solution to achieve delamination of the electrode, the weight ratio of the electrode to the delamination solution is less than 5%, less than 4.5%, less than 4%, less than 3.5%, less than 3%, less than 2.5%, less than 2%, less than 1.9%, less than 1.8%, less than 1.7%, less than 1.6%, less than 1.5%, less than 1.4%, less than 1.3%, less than 1.2%, less than 1.1%, less than 1%, less than 0.9%, less than 0.8%, less than 0.7%, less than 0.6%, less than 0.5%, less than 0.4%, less than 0.3%, less than 0.2%, less than 0.1% or less than 0.05%. In some embodiments, as the electrode is immersed into the delamination solution to achieve delamination of the electrode, the weight ratio of the electrode to the delamination solution is more than 0.01%, more than 0.05%, more than 0.1%, more than 0.2%, more than 0.3%, more than 0.4%, more than 0.5%, more than 0.6%, more than 0.7%, more than 0.8%, more than 0.9%, more than 1%, more than 1.1%, more than 1.2%, more than 1.3%, more than 1.4%, more than 1.5%, more than 1.6%, more than 1.7%, more than 1.8%, more than 1.9%, more than 2%, more than 2.5%, more than 3%, more than 3.5%, more than 4% or more than 4.5%.

The utilization of the method of the present invention in delaminating an electrode comprising an aqueous polymeric binder, wherein the polymeric binder comprises a copolymer comprising a structural unit (a) derived from an acid group-containing monomer, results in a delamination success rate of 100% and an exceptionally high recovery rate (>95%).

In some embodiments, delamination of the electrode occurs along the electrode layer-current collector interface. The delamination success rate refers to the extent of delamination of electrode layer from the current collector and was observed via visual inspection. In the case of the present invention where an electrode layer is completely delaminated from the current collector with no visible deposits of the electrode layer remaining on the current collector, the delamination success rate is 100%. In other cases where an electrode layer is not delaminated from the current collector or an electrode layer is partially delaminated from the current collector with visible deposits of the electrode layer remaining on the current collector, the delamination is deemed to be incomplete or unsuccessful, and thus the delamination success rate cannot be determined.

The recovery rate refers to the proportion of the sum of the weight of the recovered electrode layer and current collector, based on the initial weight of electrode before immersion into the delamination solution. Recovery rate can only be calculated in the case where there is a complete delamination of the electrode with no visible deposits of the electrode layer remaining on the current collector (i.e. with a 100% delamination success rate). It serves as a reflection of the extent of corrosion of invaluable metal materials in the electrode and/or dissolution of the invaluable metal materials into the delamination solution. With the method disclosed herein yielding a high recovery rate indicates that extent of corrosion of electrode metal constituents or dissolution of the electrode metal constituents into the delamination solution is negligible.

Figure 7:
FIG. 7 depicts the recovered cathode layers and current collector of Comparative Example 11 after the immersion of the double side-coated cathode into the delamination solution comprising a citric acid of 2.00 wt % concentration and DI water.

The use of delamination agent of low concentrations for immersion of the electrode not only is sufficient to attain complete delamination of the electrode via disrupting the interactions between the polymeric binder within the electrode layer and the current collector surface but also reduces the likelihood of corrosion of the current collector, electrode active material and other electrode metal constituents. FIG. 7 depicts the recovered cathode layers and current collector of Comparative Example 11 after the immersion of the double side-coated cathode into the delamination solution comprising a citric acid of 2.00 wt % concentration and DI water. The cathode layers delaminate from the aluminium current collector with a slight proportion of the cathode layers remain adhering on the current collector. In addition, the flaky cathode layers and the corroded aluminium foil surface indicate that the citric acid of a high concentration of 2.00 wt % induces dissolution of cathode active material and corrosion of current collector.

The present invention provides a simple method that can be used to delaminate the electrode layer from the current collector, taking into account the different compositions of polymeric binders used. As separation of electrode layers and current collectors constitutes a vital step in the recycling of batteries, the method disclosed herein offers a technical solution in fulfilling the demand in battery recycling. The method of the present invention circumvents both complex separation process and contamination of current collector, and enables an excellent materials recovery (i.e. high recovery rate).

The method disclosed in the present invention considerably reduces the time required to delaminate the electrode layer from the current collector in a battery without damaging the underlying current collector. With a shorter contact time between the electrode and the weak acid-containing delamination solution, corrosion of current collector and electrode active material and other electrode constituents made up of metals could be circumvented. For example, the shorter contact time allows the natural oxide layer formed on the surface of the aluminium current collector to achieve sufficient protection against corrosion when an electrode comprising an aluminium current collector is immersed into a weak acid-containing delamination solution.

Use of weak acid as the delamination agent, rather than strong acid, in the present invention also severely reduces the corrosion and dissolution tendencies of electrode metal constituents. Table 2 below shows the Inductively Coupled Plasma (ICP) mass spectroscopy data of the cathode constituents after delamination and their associated delamination solutions of two different delamination arrangements with (1) LCO as the cathode active material, aluminium as the current collector and citric acid of 0.50 wt % concentration as the delamination agent (as shown in Example 15) and (2) NMC532 as the cathode active material, aluminium as the current collector and sulfuric acid of 0.50 wt % concentration as the delamination agent (as shown in Comparative Example 8). The data demonstrates that with the use of citric acid (which is a weak acid) as the delamination agent, significantly less lithium (Li) and cobalt (Co) from the cathode layer and aluminium (Al) from the current collector are dissolved in the delamination solution, thus showing that weak acid reduces the extent of corrosion and dissolution of cathode active material and current collector. Meanwhile, with the use of sulfuric acid (which is a strong acid) as the delamination agent, high amount of Li, nickel (Ni), manganese (Mn) and Co from the cathode layer and unreasonably high amount of Al from the current collector are dissolved in the delamination solution, thus showing that strong acid significant promotes corrosion and dissolution of cathode active material and current collector.

Figure 8:
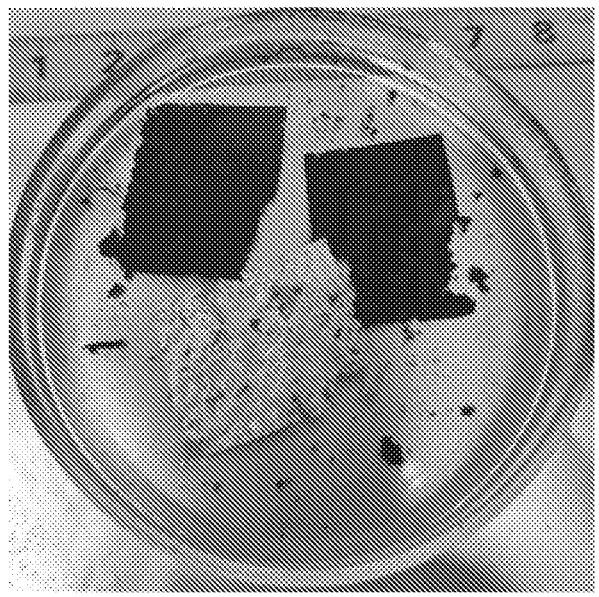
FIG. 8 depicts the recovered cathode layers and current collector of Comparative Example 8 after the immersion of the double side-coated cathode into the delamination solution comprising a sulfuric acid of 0.50 wt % concentration and DI water.

FIG. 8 depicts the recovered cathode layers and current collector of Comparative Example 8 after the immersion of the double side-coated cathode into the delamination solution comprising a sulfuric acid of 0.50 wt % concentration and DI water. The cathode layers delaminate from the aluminium current collector. However, the flaky cathode layers and the corroded aluminium foil surface indicate that the sulfuric acid (strong acid) induces dissolution of cathode active material and corrosion of current collector.

Figure 9:
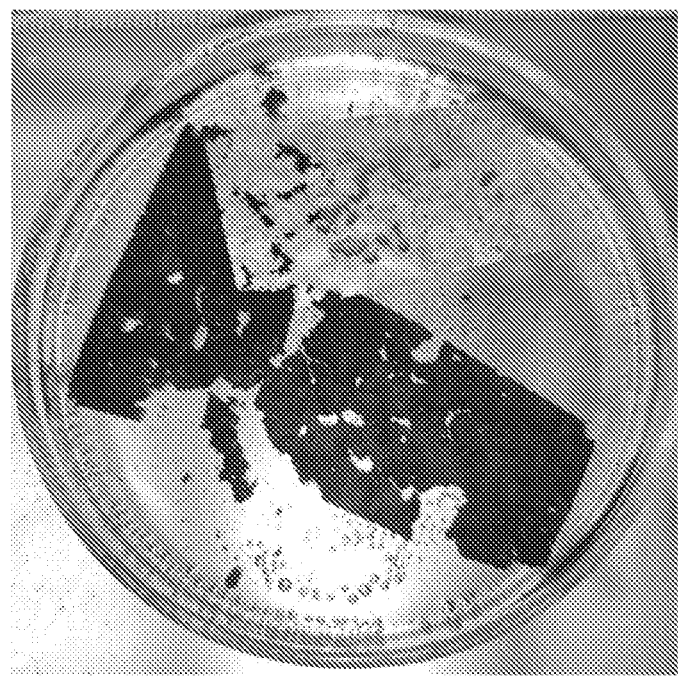
FIG. 9 depicts the recovered cathode layers and current collector of Comparative Example 16 after the immersion of the double side-coated cathode into the delamination solution comprising citric acid and sulfuric acid with an acid concentration of 3.00 wt % and DI water.

FIG. 9 depicts the recovered cathode layers and current collector of Comparative Example 16 after the immersion of the double side-coated cathode into the delamination solution comprising citric acid and sulfuric acid with an acid concentration of 3.00 wt % and DI water. Most of the cathode layers delaminates from the aluminium current collector with a slight proportion of the cathode layers remain adhering on the current collector. In addition, the flaky cathode layers and the corroded aluminium foil surface indicate that the combined use of a citric acid (weak acid) and a sulfuric acid (strong acid) induces dissolution of cathode active material and corrosion of current collector.

The method of the present invention is also applicable to achieve delamination of a packaging material by immersing the packaging material into a delamination solution; wherein the packaging material comprises a metal and a coating layer coated on one side or both sides of the metal comprising a polymeric binder; and wherein the polymeric binder comprises a copolymer comprising a structural unit derived from an acid group-containing monomer.

The coating layer can comprise metal, plastic, paper or possibly cardboard. The metal and the coating layer are separated from each other by treating the packaging material with a weak acid-containing delamination solution. The method disclosed herein could be utilized in delaminating a wide range of packaging materials, particularly in food packaging and beverage packaging, to bring about the recovery and recycling of individual material components used in packaging.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH values of the processed electrode-delamination solution mixture were measured by an electrode-type pH meter (ION 2700, Eutech Instruments).

The recovery rate refers to the proportion of the sum of the weight of the recovered electrode layer and current collector, based on the initial weight of electrode before immersion into the delamination solution.

The delamination success rate refers to the extent of delamination of electrode layer from the current collector and was observed via visual inspection.

The adhesive strengths of the dried polymeric binder layers were measured by a tensile testing machine (DZ-106A, obtained from Dongguan Zonhow Test Equipment Co. Ltd., China). This test measures the average force required to peel a polymeric binder layer from the current collector at 1800 angle in Newtons. The mean roughness depth ($R_z$) of the current collector is 2 µm. The polymeric binder was coated on the current collector and dried to obtain a polymeric binder layer of thickness 10 µm to 12 µm. The coated current collector was then placed in an environment of constant temperature of 25° C. and humidity of 50% to 60% for 30 minutes. A strip of adhesion tape (3M; US; model no. 810) with a width of 18 mm and a length of 20 mm was attached onto the surface of the polymeric binder layer. The polymeric binder strip was clipped onto the testing machine and the tape was folded back on itself at 180 degrees, and placed in a moveable jaw and pulled at room temperature and a peel rate of 300 mm per minute. The maximum stripping force measured was taken as the adhesive strength. Measurements were repeated three times to find the average value.

The peeling strengths of the dried electrode layers were measured by a tensile testing machine (DZ-106A, obtained from Dongguan Zonhow Test Equipment Co. Ltd., China). This test measures the average force required to peel an electrode layer from the current collector at 1800 angle in Newtons. The mean roughness depth ($R_z$) of the current collector is 2 µm. A strip of adhesion tape (3M; US; model no. 810) with a width of 18 mm and a length of 20 mm was attached onto the surface of the cathode electrode layer. The cathode strip was clipped onto the testing machine and the tape was folded back on itself at 180 degrees, and placed in a moveable jaw and pulled at room temperature and a peel rate of 200 mm per minute. The maximum stripping force measured was taken as the peeling strength. Measurements were repeated three times to find the average value.

Example 1

Assembling of Pouch-Type Full Lithium-Ion Batteries

A) Preparation of Polymeric Binder 16 g of sodium hydroxide (NaOH) was added into a round-bottom flask containing 380 g of distilled water. The mixture was stirred at 80 rpm for 30 mins to obtain a first suspension.

36.04 g of acrylic acid (AA) was added into the first suspension. The mixture was further stirred at 80 rpm for 30 mins to obtain a second suspension.

19.04 g of acrylamide (AM) was dissolved in 10 g of DI water to form an AM solution. Thereafter, 29.04 g of AM solution was added into the second suspension. The mixture was further heated to 55° C. and stirred at 80 rpm for 45 mins to obtain a third suspension.

12.92 g of acrylonitrile (AN) was added into the third suspension. The mixture was further stirred at 80 rpm for 10 mins to obtain a fourth suspension.

Further, 0.015 g of water-soluble free radical initiator (ammonium persulfate, APS; obtained from Aladdin Industries Corporation, China) was dissolved in 3 g of DI water and 0.0075 g of reducing agent (sodium bisulfite; obtained from Tianjin Damao Chemical Reagent Factory, China) was dissolved in 1.5 g of DI water. 3.015 g of APS solution and 1.5075 g of sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 3.72 g of NaOH was dissolved in 400 g of DI water. Thereafter, 403.72 g of sodium hydroxide solution was added dropwise into the fifth suspension for 1 h to adjust pH to 7.31 to form the sixth suspension. The polymeric binder was furnished by filtration using 200 µm nylon mesh. The solid content of the polymeric binder was 9.00 wt. %. The adhesive strength between the polymeric binder and the current collector was 3.27 N/cm. The components of the polymeric binder of Example 1 and their respective proportions are shown in Table 1 below.

B) Preparation of Positive Electrode

A first mixture was prepared by dispersing 12 g of conductive agent (SuperP; obtained from Timcal Ltd, Bodio, Switzerland) and 100 g of polymeric binder (9.00 wt. % solid content) in 74 g of deionized water while stirring with an overhead stirrer (R20, IKA). After the addition, the first mixture was further stirred for about 30 minutes at 25° C. at a speed of 1,200 rpm.

Thereafter, a second mixture was prepared by adding 276 g of NMC532 (obtained from Shandong Tianjiao New Energy Co., Ltd, China) in the first mixture at 25° C. while stirring with an overhead stirrer. Then, the second mixture was degassed under a pressure of about 10 kPa for 1 hour. Then, the second mixture was further stirred for about 60 minutes at 25° C. at a speed of 1,200 rpm to form a homogenized cathode slurry.

The homogenized cathode slurry was coated onto both sides of an aluminum foil having a thickness of 16 μm as a current collector using a doctor blade coater with a gap width of 120 μm. The coated slurry of 80 μm on the aluminum foil was dried to form a cathode electrode layer by an electrically heated oven at 70° C. The drying time was about 10 minutes. The electrode was then pressed to decrease the thickness of a cathode electrode layer to 34 μm. The surface density of the cathode electrode layer on the current collector was 15.00 mg/cm$^2$.

C) Preparation of Negative Electrode

A negative electrode slurry was prepared by mixing 93 wt. % of graphite (BTR New Energy Materials Inc., Shenzhen, Guangdong, China) with 1 wt. % carboxymethyl cellulose (CMC, BSH-12, DKS Co. Ltd., Japan) and 3 wt. % SBR (AL-2001, NIPPON A&L INC., Japan) as a binder, and 3 wt. % carbon black as a conductive agent in deionized water. The solid content of the anode slurry was 51.5 wt. %. The slurry was coated onto both sides of a copper foil having a thickness of 8 μm using a doctor blade with a gap width of about 120 μm. The coated slurry on the copper foil was dried at about 50° C. for 2.4 minutes by a hot air dryer to obtain a negative electrode. The electrode was then pressed to decrease the thickness of an anode electrode layer to 60 μm and the surface density of the anode electrode layer was 10 mg/cm$^2$.

D) Assembling of Pouched-Type Batteries

After drying, the resulting cathode coating and anode coating were used to prepare the cathode sheet and anode sheet respectively by cutting into pieces of rectangular shape in the size of 5.2 cm×8.5 cm and 5.4 cm×8.7 cm correspondingly. Pouch-type batteries were prepared by stacking the cathode and anode sheets in an alternating manner and separated by porous polyethylene separators (Celgard, LLC, US) having a thickness of 25 μm. The electrolyte was a solution of LiPF$_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content<1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 800 cycles.

Recycling of Batteries

A) Discharging and Disassembling of Pouched-Type Batteries

Used lithium-ion batteries (0.5 kg) were fully discharged by soaking in 6% NaCl solution for 12 hours. After discharging, the lithium-ion batteries were mechanically disassembled to recover the electrodes. Electrodes were cut into smaller pieces having an average length of from about 2 cm to about 4 cm.

B) Preparation of Delamination Solution 9.8 g of anhydrous citric acid (Sigma-Aldrich, USA) was added to 990.2 g of DI water to form a delamination solution with a citric acid concentration of 0.98 wt %.

C) Immersion of Cathode in Delamination Solution 5.07 g of cathode was placed in a vessel containing 1000 g of the delamination solution for 40 mins at 50° C. The cathode layer was detached from the aluminum foil. The processed electrode-delamination solution mixture has a pH value of 2.05. After immersing, the delamination solution comprising critic acid and DI water was removed by passing through a sieve having a mesh width of 4 mm to recover the cathode layer and the aluminum foil. The delamination solution could be further reused for delaminating electrodes. The recovered cathode layer and the aluminum foil were dried in an oven for 5 hours at 80° C. under atmospheric pressure and obtained a recovery rate of 96.8%. The delamination success rate and recovery rate of the cathode constituents after delamination were measured and is shown in Table 1 below.

Assembling of Pouch-Type Full Lithium-Ion Batteries of Examples 2-4

Pouch-type lithium-ion batteries were prepared by the method described in Example 1. The assembled pouch-type batteries were then subjected to repeated cycling in the same manner as in Example 1.

Recycling of Batteries of Example 2

A) Discharging and Disassembling of Pouched-Type Batteries

Used lithium-ion batteries (0.5 kg) were fully discharged by soaking in 6% NaCl solution for 12 hours. After discharging, the lithium-ion batteries were mechanically disassembled to recover the electrodes. Electrodes were cut into smaller pieces having an average length of from about 2 cm to about 4 cm.

B) Preparation of Delamination Solution 5 g of anhydrous citric acid (Sigma-Aldrich, USA) was added to 995 g of DI water to form a delamination solution with a citric acid concentration of 0.50 wt %.

C) Immersion of Cathode in Delamination Solution 5.08 g of cathode was placed in a vessel containing 1000 g of the delamination solution for 50 mins at 50° C. The cathode layer was detached from the aluminum foil. The processed electrode-delamination solution mixture has a pH value of 2.30. After immersing, the delamination solution comprising critic acid and DI water was removed by passing through a sieve having a mesh width of 4 mm to recover the cathode layer and the aluminum foil. The delamination solution could be further reused for delaminating electrodes. The recovered cathode layer and the aluminum foil were dried in an oven for 5 hours at 80° C. under atmospheric pressure and obtained a recovery rate of 99.4%.

As a supplement, pouch-type full lithium-ion batteries were being assembled and cycled in the same manner as in Example 2 and the cathode contained within was being immersed into the delamination solution for 3 mins at 50° C. during recycling. The cathode layer was detached from the aluminum foil. After immersing, the delamination solution comprising critic acid and DI water was removed by passing through a sieve having a mesh width of 4 mm to recover the cathode layer and the aluminum foil. The delamination solution could be further reused for delaminating electrodes. The recovered cathode layer and the aluminum foil were dried in an oven for 5 hours at 80° C. under atmospheric pressure and obtained a recovery rate of 99.2%.

Recycling of Batteries of Example 3

A) Discharging and Disassembling of Pouched-Type Batteries

Used lithium-ion batteries (0.5 kg) were fully discharged by soaking in 6% NaCl solution for 12 hours. After discharging, the lithium-ion batteries were mechanically disassembled to recover the electrodes. Electrodes were cut into smaller pieces having an average length of from about 2 cm to about 4 cm.

B) Preparation of Delamination Solution 2.5 g of anhydrous citric acid (Sigma-Aldrich, USA) was added to 997.5 g of DI water to form a delamination solution with a citric acid concentration of 0.25 wt %.

C) Immersion of Cathode in Delamination Solution 5.08 g of cathode was placed in a vessel containing 1000 g of the delamination solution for 60 mins at 50° C. The cathode layer was detached from the aluminum foil. The processed electrode-delamination solution mixture has a pH value of 2.46. After immersing, the delamination solution comprising critic acid and DI water was removed by passing through a sieve having a mesh width of 4 mm to recover the cathode layer and the aluminum foil. The delamination solution could be further reused for delaminating electrodes. The recovered cathode layer and the aluminum foil were dried in an oven for 5 hours at 80° C. under atmospheric pressure and obtained a recovery rate of 96.5%.

Recycling of Batteries of Example 4

A) Discharging and Disassembling of Pouched-Type Batteries

Used lithium-ion batteries (0.5 kg) were fully discharged by soaking in 6% NaCl solution for 12 hours. After discharging, the lithium-ion batteries were mechanically disassembled to recover the electrodes. Electrodes were cut into smaller pieces having an average length of from about 2 cm to about 4 cm.

B) Preparation of Delamination Solution 1 g of anhydrous citric acid (Sigma-Aldrich, USA) was added to 999 g of DI water to form a delamination solution with a citric acid concentration of 0.01 wt %.

C) Immersion of Cathode in Delamination Solution 5.07 g of cathode was placed in a vessel containing 1000 g of the delamination solution for 70 mins at 50° C. The cathode layer was detached from the aluminum foil. The processed electrode-delamination solution mixture has a pH value of 2.62. After immersing, the delamination solution comprising critic acid and DI water was removed by passing through a sieve having a mesh width of 4 mm to recover the cathode layer and the aluminum foil. The delamination solution could be further reused for delaminating electrodes. The recovered cathode layer and the aluminum foil were dried in an oven for 5 hours at 80° C. under atmospheric pressure and obtained a recovery rate of 96.6%.

Assembling of Pouch-Type Full Lithium-Ion Batteries of Examples 5-14

Pouch-type lithium-ion batteries were prepared by the method described in Example 2. The assembled pouch-type batteries were then subjected to repeated cycling in the same manner as in Example 2.

Recycling of Batteries of Example 5

Recycling of batteries was performed in the same manner as in Example 2, except that the cathode was immersed in the delamination solution for 50 mins at 90° C.

Recycling of Batteries of Example 6

Recycling of batteries was performed in the same manner as in Example 2, except that the cathode was immersed in the delamination solution for 50 mins at 70° C.

Recycling of Batteries of Example 7

Recycling of batteries was performed in the same manner as in Example 2, except that the cathode was immersed in the delamination solution for 50 mins at 25° C.

Recycling of Batteries of Example 8

Recycling of batteries was performed in the same manner as in Example 2, except that the cathode was immersed in the delamination solution for 30 mins at 50° C.

Recycling of Batteries of Example 9

Recycling of batteries was performed in the same manner as in Example 2, except that the cathode was immersed in the delamination solution for 60 mins at 50° C.

Recycling of Batteries of Example 10

Recycling of batteries was performed in the same manner as in Example 2, except that the cathode was immersed in the delamination solution for 80 mins at 50° C.

Recycling of Batteries of Example 11

Recycling of batteries was performed in the same manner as in Example 2, except that 5 g of anhydrous citric acid was replaced with butanedioic acid of the same weight in the preparation of delamination solution.

Recycling of Batteries of Example 12

Recycling of batteries was performed in the same manner as in Example 2, except that 5 g of anhydrous citric acid was replaced with fumaric acid of the same weight in the preparation of delamination solution.

Recycling of Batteries of Example 13

Recycling of batteries was performed in the same manner as in Example 2, except that 5 g of anhydrous citric acid was replaced with sorbic acid of the same weight in the preparation of delamination solution.

Recycling of Batteries of Example 14

Recycling of batteries was performed in the same manner as in Example 2, except that 5 g of anhydrous citric acid was replaced with benzoic acid of the same weight in the preparation of delamination solution.

Assembling of Pouch-Type Full Lithium-Ion Batteries of Example 15

Pouch-type lithium-ion batteries were prepared by the method described in Example 2, except that 276 g of NMC532 was replaced with LCO of the same weight. The assembled pouch-type batteries were then subjected to repeated cycling in the same manner as in Example 2.

Assembling of Pouch-Type Full Lithium-Ion Batteries of Example 16

Pouch-type lithium-ion batteries were prepared by the method described in Example 2, except that 276 g of NMC532 was replaced with NMC622 (obtained from Shandong Tianjiao New Energy Co., Ltd, China) of the same weight. The assembled pouch-type batteries were then subjected to repeated cycling in the same manner as in Example 2.

Assembling of Pouch-Type Full Lithium-Ion Batteries of Example 17

Pouch-type lithium-ion batteries were prepared by the method described in Example 2, except that 276 g of NMC532 was replaced with NMC811 (obtained from Shandong Tianjiao New Energy Co., Ltd, China) of the same weight. The assembled pouch-type batteries were then subjected to repeated cycling in the same manner as in Example 2.

Assembling of Pouch-Type Full Lithium-Ion Batteries of Example 18

Pouch-type lithium-ion batteries were prepared by the method described in Example 2, except that 276 g of NMC532 was replaced with LFP of the same weight. The assembled pouch-type batteries were then subjected to repeated cycling in the same manner as in Example 2.

Recycling of Batteries of Examples 15-18

Recycling of batteries of Examples 15-18 were performed in the same manner as in Example 2. The ICP mass spectroscopy data of the cathode constituents after delamination (i.e. cathode electrode layers and current collector) and the delamination solution of Example 15 are shown in Table 2 below.

Assembling of Pouch-Type Full Lithium-Ion Batteries of Example 19

Pouch-type lithium-ion batteries were prepared by the method described in Example 3, except that in the preparation of polymeric binder, 57.80 g of AA was added in the preparation of the second suspension, no AM was added in the preparation of the third suspension and 10.20 g of AN was added in the preparation of the fourth suspension. The assembled pouch-type batteries were then subjected to repeated cycling in the same manner as in Example 3.

Recycling of Batteries of Example 19

Recycling of batteries was performed in the same manner as in Example 3, except that the cathode was immersed in the delamination solution for 50 mins at 50° C.

Example 20

Assembling of Pouch-Type Full Lithium-Ion Batteries

A) Preparation of Polymeric Binder 5.13 g of lithium hydroxide was dissolved in 3.85 g of DI water. Thereafter, 8.98 g of lithium hydroxide solution was added into a 500 mL round-bottom flask containing 289.17 g of distilled water. The mixture was stirred at 200 rpm for 30 mins to obtain a first suspension.

Further, 31.54 g of AA was added into the first suspension. The mixture was further stirred at 200 rpm for 30 mins to obtain a second suspension.

13.52 g of AM was dissolved in 51.67 g of DI water. Thereafter, 67.65 g of AM solution was added into the second suspension. The mixture was further stirred at 200 rpm for 30 mins to obtain a third suspension.

67.60 g of AN was then added into the third suspension. The fourth suspension was obtained by stirring the mixture at 200 rpm for 40 mins.

The fourth suspension was heated up to 60° C. and stirred at 60 rpm for 45 mins. 0.23 g of APS was dissolved in 82.68 g of DI water and 0.04 g of sodium bisulfite was dissolved in 17.22 g of DI water. 17.26 g of sodium bisulfite solution was added into the fourth suspension and the mixture was stirred for 10 minutes. 82.91 g of APS solution was added into the mixture dropwise for 3 h to form a fifth suspension. The fifth suspension was further stirred at 200 rpm for 20 h at 65° C.

After the complete reaction, the temperature of the fifth suspension was lowered to 40° C. and 5.62 g of lithium hydroxide (dissolved in 116.64 g of DI water) was added into the fifth suspension to adjust pH to 7.44 to form the sixth suspension. The temperature of the sixth suspension was lowered to 30° C. and the polymeric binder was furnished by filtration using 200 μm nylon mesh. The solid content of the polymeric binder was 14.93 wt. %. The adhesive strength between the polymeric binder and the current collector was 3.41 N/cm. The components of the polymeric binder of Example 20 and their respective proportions are shown in Table 1 below.

B) Preparation of Positive Electrode

A first mixture was prepared by dispersing 12 g of conductive agent (SuperP; obtained from Timcal Ltd, Bodio, Switzerland) and 100 g of polymeric binder (14.93 wt. % solid content) in 74 g of deionized water while stirring with an overhead stirrer (R20, IKA). After the addition, the first mixture was further stirred for about 30 minutes at 25° C. at a speed of 1,200 rpm.

Thereafter, a second mixture was prepared by adding 276 g of NMC532 in the first mixture at 25° C. while stirring with an overhead stirrer. Then, the second mixture was degassed under a pressure of about 10 kPa for 1 hour. Then, the second mixture was further stirred for about 60 minutes at 25° C. at a speed of 1,200 rpm to form a homogenized cathode slurry.

The homogenized cathode slurry was coated onto both sides of an aluminum foil having a thickness of 16 μm as a current collector using a doctor blade coater with a gap width of 120 μm. The coated slurry of 80 μm on the aluminum foil was dried to form a cathode electrode layer by an electrically heated oven at 70° C. The drying time was about 10 minutes. The electrode was then pressed to decrease the thickness of the cathode electrode layer to 34 μm. The surface density of the cathode electrode layer on the current collector was 15.00 mg/cm$^2$.

C) Preparation of Negative Electrode

A negative electrode slurry was prepared by mixing 93 wt. % of graphite (BTR New Energy Materials Inc., Shenzhen, Guangdong, China) with 1 wt. % carboxymethyl cellulose (CMC, BSH-12, DKS Co. Ltd., Japan) and 3 wt. % SBR (AL-2001, NIPPON A&L INC., Japan) as a binder, and 3 wt. % carbon black as a conductive agent in deionized water. The solid content of the anode slurry was 51.5 wt. %. The slurry was coated onto both sides of a copper foil having a thickness of 8 μm using a doctor blade with a gap width of about 120 μm. The coated slurry on the copper foil was dried at about 50° C. for 2.4 minutes by a hot air dryer to obtain a negative electrode. The electrode was then pressed to decrease the thickness of the anode electrode layer to 60 μm and the surface density of the anode electrode layer was 10 mg/cm$^2$.

D) Assembling of Pouched-Type Batteries

After drying, the resulting cathode coating and anode coating were used to prepare the cathode sheet and anode sheet respectively by cutting into pieces of rectangular shape in the size of 5.2 cm×8.5 cm and 5.4 cm×8.7 cm correspondingly. Pouch-type batteries were prepared by stacking the cathode and anode sheets in an alternating manner and separated by porous polyethylene separators (Celgard, LLC, US) having a thickness of 25 μm. The electrolyte was a solution of LiPF$_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content<1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 800 cycles.

Recycling of Batteries

A) Discharging and Disassembling of Pouched-Type Batteries

Used lithium-ion batteries (0.5 kg) were fully discharged by soaking in 6% NaCl solution for 12 hours. After discharging, the lithium-ion batteries were mechanically disassembled to recover the electrodes. Electrodes were cut into smaller pieces having an average length of from about 2 cm to about 4 cm.

B) Preparation of Delamination Solution 9.8 g of anhydrous citric acid (Sigma-Aldrich, USA) was added to 990.2 g of DI water to form a delamination solution with a citric acid concentration of 0.98 wt %.

C) Immersion of Cathode in Delamination Solution 5.07 g of cathode was placed in a vessel containing 1000 g of the delamination solution for 50 mins at 50° C. The cathode layer was detached from the aluminum foil. After immersing, the delamination solution comprising critic acid and DI water was removed by passing through a sieve having a mesh width of 4 mm to recover the cathode layer and the aluminum foil. The delamination solution could be further reused for delaminating electrodes. The recovered cathode layer and the aluminum foil were dried in an oven for 5 hours at 80° C. under atmospheric pressure and obtained a recovery rate of 96.8%. The delamination success rate and recovery rate of the cathode constituents after delamination were measured and is shown in Table 1 below.

Assembling of Pouch-Type Full Lithium-Ion Batteries of Examples 21-22

Pouch-type lithium-ion batteries were prepared by the method described in Example 20. The assembled pouch-type batteries were then subjected to repeated cycling in the same manner as in Example 20.

Recycling of Batteries of Example 21

Recycling of batteries was performed in the same manner as in Example 20, except that 5 g of anhydrous citric acid was added to 995 g of DI water in the preparation of delamination solution with a citric acid concentration of 0.50 wt %.

Recycling of Batteries of Example 22

Recycling of batteries was performed in the same manner as in Example 20, except that 1 g of anhydrous citric acid was added to 999 g of DI water in the preparation of delamination solution with a citric acid concentration of 0.01 wt %.

Assembling of Pouch-Type Full Lithium-Ion Batteries of Examples 23-30

Pouch-type lithium-ion batteries were prepared by the method described in Example 21. The assembled pouch-type batteries were then subjected to repeated cycling in the same manner as in Example 21.

Recycling of Batteries of Example 23

Recycling of batteries was performed in the same manner as in Example 21, except that the cathode was immersed in the delamination solution for 50 mins at 90° C.

Recycling of Batteries of Example 24

Recycling of batteries was performed in the same manner as in Example 21, except that the cathode was immersed in the delamination solution for 50 mins at 40° C.

Recycling of Batteries of Example 25

Recycling of batteries was performed in the same manner as in Example 21, except that the cathode was immersed in the delamination solution for 30 mins at 50° C.

Recycling of Batteries of Example 26

Recycling of batteries was performed in the same manner as in Example 21, except that the cathode was immersed in the delamination solution for 100 mins at 50° C.

Recycling of Batteries of Example 27

Recycling of batteries was performed in the same manner as in Example 21, except that 5 g of anhydrous citric acid was replaced with butanedioic acid of the same weight in the preparation of delamination solution.

Recycling of Batteries of Example 28

Recycling of batteries was performed in the same manner as in Example 21, except that 5 g of anhydrous citric acid was replaced with fumaric acid of the same weight in the preparation of delamination solution.

Recycling of Batteries of Example 29

Recycling of batteries was performed in the same manner as in Example 21, except that 5 g of anhydrous citric acid was replaced with sorbic acid of the same weight in the preparation of delamination solution.

Recycling of Batteries of Example 30

Recycling of batteries was performed in the same manner as in Example 21, except that 5 g of anhydrous citric acid was replaced with benzoic acid of the same weight in the preparation of delamination solution.

Assembling of Pouch-Type Full Lithium-Ion Batteries of Example 31

Pouch-type lithium-ion batteries were prepared by the method described in Example 21, except that 276 g of NMC532 was replaced with LCO of the same weight. The assembled pouch-type batteries were then subjected to repeated cycling in the same manner as in Example 21.

Assembling of Pouch-Type Full Lithium-Ion Batteries of Example 32

Pouch-type lithium-ion batteries were prepared by the method described in Example 21, except that 282 g of NMC532 was replaced with NMC622 of the same weight. The assembled pouch-type batteries were then subjected to repeated cycling in the same manner as in Example 21.

Assembling of Pouch-Type Full Lithium-Ion Batteries of Example 33

Pouch-type lithium-ion batteries were prepared by the method described in Example 21, except that 282 g of NMC532 was replaced with NMC811 the same weight. The assembled pouch-type batteries were then subjected to repeated cycling in the same manner as in Example 21.

Assembling of Pouch-Type Full Lithium-Ion Batteries of Example 34

Pouch-type lithium-ion batteries were prepared by the method described in Example 21, except that 282 g of NMC532 was replaced with LFP of the same weight. The assembled pouch-type batteries were then subjected to repeated cycling in the same manner as in Example 21.

Recycling of Batteries of Examples 31-34

Recycling of batteries of Examples 31-34 were performed in the same manner as in Example 21.

Assembling of Pouch-Type Full Lithium-Ion Batteries of Example 35

Pouch-type lithium-ion batteries were prepared by the method described in Example 21, except that in the preparation of polymeric binder, 22.53 g of AA was added in the preparation of the second suspension, no AM was added in the preparation of the third suspension and 90.13 g of AN was added in the preparation of the fourth suspension. The assembled pouch-type batteries were then subjected to repeated cycling in the same manner as in Example 21.

Recycling of Batteries of Example 35

Recycling of batteries was performed in the same manner as in Example 21.

Assembling of Pouch-Type Full Lithium-Ion Batteries of Example 36

Pouch-type lithium-ion batteries were prepared by the method described in Example 2, except that in the preparation of the polymeric binder, 36.04 g of AA was replaced with 2-ethylacrylic acid of the same weight in the preparation of the second suspension. The assembled pouch-type batteries were then subjected to repeated cycling in the same manner as in Example 2.

Recycling of Batteries of Example 36

Recycling of batteries was performed in the same manner as in Example 2.

Assembling of Pouch-Type Full Lithium-Ion Batteries of Example 37

Pouch-type lithium-ion batteries were prepared by the method described in Example 2, except that in the preparation of the polymeric binder, 36.04 g of AA was replaced with vinylsulfonic acid of the same weight in the preparation of the second suspension. The assembled pouch-type batteries were then subjected to repeated cycling in the same manner as in Example 2.

Recycling of Batteries of Example 37

Recycling of batteries was performed in the same manner as in Example 2.

Assembling of Pouch-Type Full Lithium-Ion Batteries of Example 38

Pouch-type lithium-ion batteries were prepared by the method described in Example 21, except that in the preparation of the polymeric binder, 31.54 g of AA was replaced with 2-ethylacrylic acid of the same weight in the preparation of the second suspension. The assembled pouch-type batteries were then subjected to repeated cycling in the same manner as in Example 21.

Recycling of Batteries of Example 38

Recycling of batteries was performed in the same manner as in Example 21.

Assembling of Pouch-Type Full Lithium-Ion Batteries of Example 39

Pouch-type lithium-ion batteries were prepared by the method described in Example 21, except that in the preparation of the polymeric binder, 31.54 g of AA was replaced with vinylsulfonic acid of the same weight in the preparation of the second suspension. The assembled pouch-type batteries were then subjected to repeated cycling in the same manner as in Example 21.

Recycling of Batteries of Example 39

Recycling of batteries was performed in the same manner as in Example 21.

Assembling of Pouch-Type Full Lithium-Ion Batteries of Comparative Example 1

A) Preparation of Polymeric Binder

A polymeric binder was prepared by dispersing 10 g of polyvinylidene fluoride, PVDF (Solef® 5130, obtained from Solvay S.A., Belgium) in 100 g of N-methyl-2-pyrrolidone, NMP (≥99%, Sigma-Aldrich, USA) while stirring at 500 rpm for about 3 hours.

B) Preparation of Positive Electrode

A first suspension was prepared by dispersing 110 g of polymeric binder above in 150 g of NMP in a 500 mL round bottom flask while stirring with an overhead stirrer. After the addition, the first suspension was further stirred for about 10 minutes at a speed of 500 rpm.

Thereafter, 15 g of SuperP was added into the first suspension and stirred at 1,200 rpm for 30 minutes to obtain the second suspension.

A third suspension was prepared by dispersing 225 g of NMC532 into the second suspension at 25° C. while stirring with an overhead stirrer. Then, the third suspension was degassed under a pressure of about 10 kPa for 1 hour. The third suspension was further stirred for about 90 minutes at 25° C. at a speed of 1,200 rpm to form a homogenized cathode slurry.

The homogenized cathode slurry was coated onto both sides of an aluminum foil having a thickness of 16 μm as a current collector using a doctor blade coater with a gap width of 120 μm. The coated slurry of 80 μm on the aluminum foil was dried to form a cathode electrode layer by an electrically heated oven at 70° C. The drying time was about 10 minutes. The electrode was then pressed to decrease the thickness of the cathode electrode layer to 34 μm.

C) Preparation of Negative Electrode

The negative electrode was prepared in the same manner as in Example 2.

D) Assembling of Pouched-Type Batteries

The pouch-type batteries were assembled in the same manner as in Example 2. The assembled pouch-type batteries were then subjected to repeated cycling in the same manner as in Example 2.

Recycling of Batteries of Comparative Example 1

Recycling of batteries was performed in the same manner as in Example 2.

Assembling of Pouch-Type Full Lithium-Ion Batteries of Comparative Example 2

Pouch-type lithium-ion batteries were prepared by the method described in Example 21, except that polyacrylonitrile (PAN) was used as the polymeric binder in the preparation of the positive electrode. The assembled pouch-type batteries were then subjected to repeated cycling in the same manner as in Example 21.

Recycling of Batteries of Comparative Example 2

Recycling of batteries was performed in the same manner as in Example 21.

Assembling of Pouch-Type Full Lithium-Ion Batteries of Comparative Examples 3-6

Pouch-type lithium-ion batteries were prepared by the method described in Example 21. The assembled pouch-type batteries were then subjected to repeated cycling in the same manner as in Example 21.

Recycling of Batteries of Comparative Example 3

Recycling of batteries was performed in the same manner as in Example 21, except that 30 g of sulfuric acid was added to 970 g of DI water in the preparation of delamination solution with a sulfuric acid concentration of 3 wt % and the cathode was immersed in the delamination solution for 10 mins at 50° C.

Recycling of Batteries of Comparative Example 4

Recycling of batteries was performed in the same manner as in Example 21, except that 5 g of sulfuric acid was added to 995 g of DI water in the preparation of delamination solution with a sulfuric acid concentration of 0.50 wt % and the cathode was immersed in the delamination solution for 10 mins at 50° C.

Recycling of Batteries of Comparative Example 5

Recycling of batteries was performed in the same manner as in Example 21, except that 30 g of sulfuric acid was added to 970 g of DI water in the preparation of delamination solution with a sulfuric acid concentration of 3 wt %.

Recycling of Batteries of Comparative Example 6

Recycling of batteries was performed in the same manner as in Example 21, except that 5 g of sulfuric acid was added to 995 g of DI water in the preparation of delamination solution with a sulfuric acid concentration of 0.50 wt %.

Assembling of Pouch-Type Full Lithium-Ion Batteries of Comparative Examples 7-10

Pouch-type lithium-ion batteries were prepared by the method described in Example 2. The assembled pouch-type batteries were then subjected to repeated cycling in the same manner as in Example 2.

Recycling of Batteries of Comparative Example 7

Recycling of batteries was performed in the same manner as in Example 2, except that 30 g of sulfuric acid was added to 970 g of DI water in the preparation of delamination solution with a sulfuric acid concentration of 3 wt % and the cathode was immersed in the delamination solution for 10 mins at 50° C.

Recycling of Batteries of Comparative Example 8

Recycling of batteries was performed in the same manner as in Example 2, except that 5 g of sulfuric acid was added to 995 g of DI water in the preparation of delamination solution with a sulfuric acid concentration of 0.50 wt % and the cathode was immersed in the delamination solution for 10 mins at 50° C. The ICP mass spectroscopy data of the cathode constituents after delamination (i.e. cathode electrode layers and current collector) and the delamination solution of Comparative Example 8 are shown in Table 2 below.

Recycling of Batteries of Comparative Example 9

Recycling of batteries was performed in the same manner as in Example 2, except that 30 g of sulfuric acid was added to 970 g of DI water in the preparation of delamination solution with a sulfuric acid concentration of 3 wt %.

Recycling of Batteries of Comparative Example 10

Recycling of batteries was performed in the same manner as in Example 2, except that 5 g of sulfuric acid was added to 995 g of DI water in the preparation of delamination solution with a sulfuric acid concentration of 0.50 wt %.

Assembling of Pouch-Type Full Lithium-Ion Batteries of Comparative Example 11

Pouch-type lithium-ion batteries were prepared by the method described in Example 2. The assembled pouch-type batteries were then subjected to repeated cycling in the same manner as in Example 2.

Recycling of Batteries of Comparative Example 11

Recycling of batteries was performed in the same manner as in Example 2, except that 20 g of anhydrous citric acid was added to 980 g of DI water in the preparation of delamination solution with a citric acid concentration of 2 wt %.

Assembling of Pouch-Type Full Lithium-Ion Batteries of Comparative Example 12

Pouch-type lithium-ion batteries were prepared by the method described in Example 21. The assembled pouch-type batteries were then subjected to repeated cycling in the same manner as in Example 21.

Recycling of Batteries of Comparative Example 12

Recycling of batteries was performed in the same manner as in Example 21, except that 20 g of anhydrous citric acid was added to 980 g of DI water in the preparation of delamination solution with a citric acid concentration of 2 wt %.

Assembling of Pouch-Type Full Lithium-Ion Batteries of Comparative Examples 13-15

Pouch-type lithium-ion batteries were prepared by the method described in Example 21. The assembled pouch-type batteries were then subjected to repeated cycling in the same manner as in Example 21.

Recycling of Batteries of Comparative Example 13

Recycling of batteries was performed in the same manner as in Example 21, except that 15 g of anhydrous citric acid and 15 g of sulfuric acid were added to 970 g of DI water in the preparation of delamination solution with an acid concentration of 3 wt % and the cathode was immersed in the delamination solution for 10 mins at 50° C.

Recycling of Batteries of Comparative Example 14

Recycling of batteries was performed in the same manner as in Example 21, except that 2.5 g of anhydrous citric acid and 2.5 g of sulfuric acid were added to 995 g of DI water in the preparation of delamination solution with an acid concentration of 0.50 wt % and the cathode was immersed in the delamination solution for 10 mins at 50° C.

Recycling of Batteries of Comparative Example 15

Recycling of batteries was performed in the same manner as in Example 21, except that 2.5 g of anhydrous citric acid and 2.5 g of sulfuric acid were added to 995 g of DI water in the preparation of delamination solution with an acid concentration of 0.50 wt %.

Assembling of Pouch-Type Full Lithium-Ion Batteries of Comparative Examples 16-18

Pouch-type lithium-ion batteries were prepared by the method described in Example 2. The assembled pouch-type batteries were then subjected to repeated cycling in the same manner as in Example 2.

Recycling of Batteries of Comparative Example 16

Recycling of batteries was performed in the same manner as in Example 2, except that 15 g of anhydrous citric acid and 15 g of sulfuric acid were added to 970 g of DI water in the preparation of delamination solution with an acid concentration of 3 wt % and the cathode was immersed in the delamination solution for 10 mins at 50° C.

Recycling of Batteries of Comparative Example 17

Recycling of batteries was performed in the same manner as in Example 2, except that 2.5 g of anhydrous citric acid and 2.5 g of sulfuric acid were added to 995 g of DI water in the preparation of delamination solution with an acid concentration of 0.50 wt % and the cathode was immersed in the delamination solution for 10 mins at 50° C.

Recycling of Batteries of Comparative Example 18

Recycling of batteries was performed in the same manner as in Example 2, except that 2.5 g of anhydrous citric acid and 2.5 g of sulfuric acid were added to 995 g of DI water in the preparation of delamination solution with an acid concentration of 0.50 wt %.

Assembling of Pouch-Type Full Lithium-Ion Batteries of Comparative Examples 19-21

Pouch-type lithium-ion batteries were prepared by the method described in Example 21. The assembled pouch-type batteries were then subjected to repeated cycling in the same manner as in Example 21.

Recycling of Batteries of Comparative Example 19

Recycling of batteries was performed in the same manner as in Example 21, except that 10 g of acetic acid, 10 g of anhydrous citric acid and 10 g of sulfuric acid were added to 970 g of DI water in the preparation of delamination solution with an acid concentration of 3 wt % and the cathode was immersed in the delamination solution for 10 mins at 50° C.

Recycling of Batteries of Comparative Example 20

Recycling of batteries was performed in the same manner as in Example 21, except that 1.67 g of acetic acid, 1.67 g of anhydrous citric acid and 1.67 g of sulfuric acid were added to 995 g of DI water in the preparation of delamination solution with an acid concentration of 0.50 wt % and the cathode was immersed in the delamination solution for 10 mins at 50° C.

Recycling of Batteries of Comparative Example 21

Recycling of batteries was performed in the same manner as in Example 21, except that 1.67 g of acetic acid, 1.67 g of anhydrous citric acid and 1.67 g of sulfuric acid were added to 995 g of DI water in the preparation of delamination solution with an acid concentration of 0.50 wt %.

Assembling of Pouch-Type Full Lithium-Ion Batteries of Comparative Examples 22-24

Pouch-type lithium-ion batteries were prepared by the method described in Example 2. The assembled pouch-type batteries were then subjected to repeated cycling in the same manner as in Example 2.

Recycling of Batteries of Comparative Example 22

Recycling of batteries was performed in the same manner as in Example 2, except that 10 g of acetic acid, 10 g of anhydrous citric acid and 10 g of sulfuric acid were added to 970 g of DI water in the preparation of delamination solution with an acid concentration of 3 wt % and the cathode was immersed in the delamination solution for 10 mins at 50° C.

Recycling of Batteries of Comparative Example 23

Recycling of batteries was performed in the same manner as in Example 2, except that 1.67 g of acetic acid, 1.67 g of anhydrous citric acid and 1.67 g of sulfuric acid were added to 995 g of DI water in the preparation of delamination solution with an acid concentration of 0.50 wt % and the cathode was immersed in the delamination solution for 10 mins at 50° C.

Recycling of Batteries of Comparative Example 24

Recycling of batteries was performed in the same manner as in Example 2, except that 1.67 g of acetic acid, 1.67 g of anhydrous citric acid and 1.67 g of sulfuric acid were added to 995 g of DI water in the preparation of delamination solution with an acid concentration of 0.50 wt %.

Assembling of Pouch-Type Full Lithium-Ion Batteries of Comparative Example 25

Pouch-type lithium-ion batteries were prepared by the method described in Example 21, except that in the preparation of polymeric binder, 16.90 g of AA was added in the preparation of the second suspension, AM was not added in the preparation of the third suspension and 95.76 g of AN was added in the preparation of the fourth suspension. The assembled pouch-type batteries were then subjected to repeated cycling in the same manner as in Example 21.

Recycling of Batteries of Comparative Example 25

Recycling of batteries was performed in the same manner as in Example 21.

Assembling of Pouch-Type Full Lithium-Ion Batteries of Comparative Example 26

Pouch-type lithium-ion batteries were prepared by the method described in Example 21. The assembled pouch-type batteries were then subjected to repeated cycling in the same manner as in Example 21.

Recycling of Batteries of Comparative Example 26

Recycling of batteries was performed in the same manner as in Example 21, except that delamination agent was not added and only 1000 g of DI water was added in the preparation of the delamination solution.

Assembling of Pouch-Type Full Lithium-Ion Batteries of Comparative Example 27

Pouch-type lithium-ion batteries were prepared by the method described in Example 2. The assembled pouch-type batteries were then subjected to repeated cycling in the same manner as in Example 2.

Recycling of Batteries of Comparative Example 27

Recycling of batteries was performed in the same manner as in Example 2, except that delamination agent was not added and only 1000 g of DI water was added in the preparation of the delamination solution.

Assembling of Pouch-Type Full Lithium-Ion Batteries of Comparative Example 28

Pouch-type lithium-ion batteries were prepared by the method described in Example 2, except that in the preparation of polymeric binder, 57.80 g of AA was added in the preparation of the second suspension, AM was not added in the preparation of the third suspension and 10.20 g of AN was added in the preparation of the fourth suspension. The assembled pouch-type batteries were then subjected to repeated cycling in the same manner as in Example 2.

Recycling of Batteries of Comparative Example 28

Recycling of batteries was performed in the same manner as in Example 2, except that delamination agent was not added and only 1000 g of DI water was added in the preparation of the delamination solution.

TABLE 1

| | Structural units in the copolymer | | | | | | | Cathode active material | Delamination solution | | | Delamination success rate (%) | Recovery rate (%) |
|---|---|---|---|---|---|---|---|---|---|---|---|---|---|
| | Derived from nitrile group-containing monomer | | Derived from amide group-containing monomer | | Derived from acid group-containing monomer | | | | Aqueous solvent | Delamination agent | | | |
| | Monomer type | Proportion of structural unit (mol %) | Monomer type | Proportion of structural unit (mol %) | Monomer type | Proportion of structural unit (mol %) | | | | Type | Concentration (wt %) | | |
| Example 1 | AN* | 24.07 | AM* | 26.48 | AA* | 49.45 | | NCM532 | Water | Citric acid | 0.98 | 100 | 96.8 |
| Example 2 | AN | 24.07 | AM | 26.48 | AA | 49.45 | | NCM532 | Water | Citric acid | 0.5 | 100 | 99.4 |
| Example 3 | AN | 24.07 | AM | 26.48 | AA | 49.45 | | NCM532 | Water | Citric acid | 0.25 | 100 | 96.5 |
| Example 4 | AN | 24.07 | AM | 26.48 | AA | 49.45 | | NCM532 | Water | Citric acid | 0.01 | 100 | 96.6 |
| Example 5 | AN | 24.07 | AM | 26.48 | AA | 49.45 | | NCM532 | Water | Citric acid | 0.5 | 100 | 96.1 |
| Example 6 | AN | 24.07 | AM | 26.48 | AA | 49.45 | | NCM532 | Water | Citric acid | 0.5 | 100 | 98.7 |
| Example 7 | AN | 24.07 | AM | 26.48 | AA | 49.45 | | NCM532 | Water | Citric acid | 0.5 | 100 | 97.3 |
| Example 8 | AN | 24.07 | AM | 26.48 | AA | 49.45 | | NCM532 | Water | Citric acid | 0.5 | 100 | 97.2 |
| Example 9 | AN | 24.07 | AM | 26.48 | AA | 49.45 | | NCM532 | Water | Citric acid | 0.5 | 100 | 98.6 |
| Example 10 | AN | 24.07 | AM | 26.48 | AA | 49.45 | | NCM532 | Water | Citric acid | 0.5 | 100 | 96.5 |
| Example 11 | AN | 24.07 | AM | 26.48 | AA | 49.45 | | NCM532 | Water | Butanedioic acid | 0.5 | 100 | 98.8 |
| Example 12 | AN | 24.07 | AM | 26.48 | AA | 49.45 | | NCM532 | Water | Fumaric Acid | 0.5 | 100 | 99.2 |
| Example 13 | AN | 24.07 | AM | 26.48 | AA | 49.45 | | NCM532 | Water | Sorbic acid | 0.5 | 100 | 99.3 |
| Example 14 | AN | 24.07 | AM | 26.48 | AA | 49.45 | | NCM532 | Water | Benzoic acid | 0.5 | 100 | 98.7 |
| Example 15 | AN | 24.07 | AM | 26.48 | AA | 49.45 | | LCO | Water | Citric acid | 0.5 | 100 | 98.8 |
| Example 16 | AN | 24.07 | AM | 26.48 | AA | 49.45 | | NCM622 | Water | Citric acid | 0.5 | 100 | 99.2 |
| Example 17 | AN | 24.07 | AM | 26.48 | AA | 49.45 | | NCM811 | Water | Citric acid | 0.5 | 100 | 98.7 |
| Example 18 | AN | 24.07 | AM | 26.48 | AA | 49.45 | | LFP | Water | Citric acid | 0.5 | 100 | 97.8 |
| Example 19 | AN | 19.33 | AM | 0.00 | AA | 80.67 | | NCM532 | Water | Citric acid | 0.5 | 100 | 98.6 |
| Example 20 | AN | 66.99 | AM | 10.00 | AA | 23.01 | | NCM532 | Water | Citric acid | 0.98 | 100 | 96.8 |
| Example 21 | AN | 66.99 | AM | 10.00 | AA | 23.01 | | NCM532 | Water | Citric acid | 0.5 | 100 | 99.4 |
| Example 22 | AN | 66.99 | AM | 10.00 | AA | 23.01 | | NCM532 | Water | Citric acid | 0.01 | 100 | 96.2 |
| Example 23 | AN | 66.99 | AM | 10.00 | AA | 23.01 | | NCM532 | Water | Citric acid | 0.5 | 100 | 96.6 |
| Example 24 | AN | 66.99 | AM | 10.00 | AA | 23.01 | | NCM532 | Water | Citric acid | 0.5 | 100 | 97.1 |
| Example 25 | AN | 66.99 | AM | 10.00 | AA | 23.01 | | NCM532 | Water | Citric acid | 0.5 | 100 | 97.2 |
| Example 26 | AN | 66.99 | AM | 10.00 | AA | 23.01 | | NCM532 | Water | Citric acid | 0.5 | 100 | 96.5 |
| Example 27 | AN | 66.99 | AM | 10.00 | AA | 23.01 | | NCM532 | Water | Butanedioic acid | 0.5 | 100 | 99.1 |
| Example 28 | AN | 66.99 | AM | 10.00 | AA | 23.01 | | NCM532 | Water | Fumaric Acid | 0.5 | 100 | 98.7 |
| Example 29 | AN | 66.99 | AM | 10.00 | AA | 23.01 | | NCM532 | Water | Sorbic acid | 0.5 | 100 | 98.3 |
| Example 30 | AN | 66.99 | AM | 10.00 | AA | 23.01 | | NCM532 | Water | Benzoic acid | 0.5 | 100 | 99.2 |
| Example 31 | AN | 66.99 | AM | 10.00 | AA | 23.01 | | LCO | Water | Citric acid | 0.5 | 100 | 99.2 |
| Example 32 | AN | 66.99 | AM | 10.00 | AA | 23.01 | | NCM622 | Water | Citric acid | 0.5 | 100 | 99.4 |
| Example 33 | AN | 66.99 | AM | 10.00 | AA | 23.01 | | NCM811 | Water | Citric acid | 0.5 | 100 | 99.5 |
| Example 34 | AN | 66.99 | AM | 10.00 | AA | 23.01 | | LFP | Water | Citric acid | 0.5 | 100 | 97.6 |
| Example 35 | AN | 84.46 | AM | 0.00 | AA | 15.54 | | NCM532 | Water | Citric acid | 0.5 | 100 | 99.1 |
| Example 36 | AN | 27.95 | AM | 30.74 | 2-ethylacrylic acid | 41.31 | | NCM532 | Water | Citric acid | 0.5 | 100 | 98.1 |
| Example 37 | AN | 28.83 | AM | 31.71 | Vinylsulfonic acid | 39.46 | | NCM532 | Water | Citric acid | 0.5 | 100 | 99.2 |
| Example 38 | AN | 71.60 | AM | 10.69 | 2-ethylacrylic acid | 17.71 | | NCM532 | Water | Citric acid | 0.5 | 100 | 97.8 |
| Example 39 | AN | 72.55 | AM | 10.83 | Vinylsulfonic acid | 16.62 | | NCM532 | Water | Citric acid | 0.5 | 100 | 98.6 |

TABLE 1-continued

| | Structural units in the copolymer | | | | | | Cathode active material | Delamination solution | | | Delamination | Recovery rate (%) |
| | Derived from nitrile group-containing monomer | | Derived from amide group-containing monomer | | Derived from acid group-containing monomer | | | | Delamination agent | | | |
| | Monomer type | Proportion of structural unit (mol %) | Monomer type | Proportion of structural unit (mol %) | Monomer type | Proportion of structural unit (mol %) | | Aqueous solvent | Type | Concentration (wt %) | success rate (%) | |
|---|---|---|---|---|---|---|---|---|---|---|---|---|
| Comparative Example 1 | | | | PVDF | | | NCM532 | Water | Citric acid | 0.5 | —# | — |
| Comparative Example 2 | AN | 100.00 | | 0.00 | | 0.00 | NCM532 | Water | Citric acid | 0.5 | —# | — |
| Comparative Example 3 | AN | 66.99 | AM | 10.00 | AA | 23.01 | NCM532 | Water | Sulfuric acid | 3 | 100 | 67.2 |
| Comparative Example 4 | AN | 66.99 | AM | 10.00 | AA | 23.01 | NCM532 | Water | Sulfuric acid | 0.5 | 100 | 72.6 |
| Comparative Example 5 | AN | 66.99 | AM | 10.00 | AA | 23.01 | NCM532 | Water | Sulfuric acid | 3 | 100 | 15.7 |
| Comparative Example 6 | AN | 24.07 | AM | 26.48 | AA | 49.45 | NCM532 | Water | Sulfuric acid | 3 | 100 | 36.4 |
| Comparative Example 7 | AN | 24.07 | AM | 26.48 | AA | 49.45 | NCM532 | Water | Sulfuric acid | 0.5 | 100 | 68.1 |
| Comparative Example 8 | AN | 24.07 | AM | 26.48 | AA | 49.45 | NCM532 | Water | Sulfuric acid | 3 | 100 | 72.1 |
| Comparative Example 9 | AN | 24.07 | AM | 26.48 | AA | 49.45 | NCM532 | Water | Sulfuric acid | 0.5 | 100 | 17.4 |
| Comparative Example 10 | AN | 24.07 | AM | 26.48 | AA | 49.45 | NCM532 | Water | Sulfuric acid | 3 | 100 | 34.7 |
| Comparative Example 11 | AN | 66.99 | AM | 10.00 | AA | 23.01 | NCM532 | Water | Citric acid | 2 | 100 | 62.5 |
| Comparative Example 12 | AN | 66.99 | AM | 10.00 | AA | 23.01 | NCM532 | Water | Citric acid | 2 | 100 | 59.5 |
| Comparative Example 13 | AN | 66.99 | AM | 10.00 | AA | 23.01 | NCM532 | Water | Citric acid and sulfuric acid | 3 | 100 | 68.1 |
| Comparative Example 14 | AN | 66.99 | AM | 10.00 | AA | 23.01 | NCM532 | Water | Citric acid and sulfuric acid | 0.5 | 100 | 72.8 |
| Comparative Example 15 | AN | 66.99 | AM | 10.00 | AA | 23.01 | NCM532 | Water | Citric acid and sulfuric acid | 0.5 | 100 | 31.9 |
| Comparative Example 16 | AN | 24.07 | AM | 26.48 | AA | 49.45 | NCM532 | Water | Citric acid and sulfuric acid | 3 | 100 | 64.2 |
| Comparative Example 17 | AN | 24.07 | AM | 26.48 | AA | 49.45 | NCM532 | Water | Citric acid and sulfuric acid | 0.5 | 100 | 69.6 |
| Comparative Example 18 | AN | 24.07 | AM | 26.48 | AA | 49.45 | NCM532 | Water | Citric acid and sulfuric acid | 0.5 | 100 | 26.1 |
| Comparative Example 19 | AN | 66.99 | AM | 10.00 | AA | 23.01 | NCM532 | Water | Acetic acid, citric acid and sulfuric acid | 3 | 100 | 69.1 |

TABLE 1-continued

| | Structural units in the copolymer | | | | | | | | Delamination solution | | | Delamination | |
|---|---|---|---|---|---|---|---|---|---|---|---|---|---|
| | Derived from nitrile group-containing monomer | | Derived from amide group-containing monomer | | Derived from acid group-containing monomer | | | | | Delamination agent | | | |
| | Monomer type | Proportion of structural unit (mol %) | Monomer type | Proportion of structural unit (mol %) | Monomer type | Proportion of structural unit (mol %) | Cathode active material | Aqueous solvent | Type | Concentration (wt %) | success rate (%) | Recovery rate (%) |
| Comparative Example 20 | AN | 66.99 | AM | 10.00 | AA | 23.01 | NCM532 | Water | Acetic acid, citric acid and sulfuric acid | 0.5 | 100 | 73.7 |
| Comparative Example 21 | AN | 66.99 | AM | 10.00 | AA | 23.01 | NCM532 | Water | Acetic acid, citric acid and sulfuric acid | 0.5 | 100 | 29.6 |
| Comparative Example 22 | AN | 24.07 | AM | 26.48 | AA | 49.45 | NCM532 | Water | Acetic acid, citric acid and sulfuric acid | 3 | 100 | 70.3 |
| Comparative Example 23 | AN | 24.07 | AM | 26.48 | AA | 49.45 | NCM532 | Water | Acetic acid, citric acid and sulfuric acid | 0.5 | 100 | 75.4 |
| Comparative Example 24 | AN | 24.07 | AM | 26.48 | AA | 49.45 | NCM532 | Water | Acetic acid, citric acid and sulfuric acid | 0.5 | 100 | 32.2 |
| Comparative Example 25 | AN | 88.50 | AM | 0.00 | AA | 11.50 | NCM532 | Water | Citric acid | 0.5 | —# | — |
| Comparative Example 26 | AN | 66.99 | AM | 10.00 | AA | 23.01 | NCM532 | Water | — | — | —# | — |
| Comparative Example 27 | AN | 24.07 | AM | 26.48 | AA | 49.45 | NCM532 | Water | — | — | —# | — |
| Comparative Example 28 | AN | 19.33 | AM | 0.00 | AA | 80.67 | NCM532 | Water | — | — | —# | — |

*AN refers to acrylonitrile, AM refers to acrylamide and AA refers to acrylic acid.
is an indicator of incomplete or unsuccessful delamination of the electrode layer from the current collector, and hence unable to determine delamination success rate.

TABLE 2

| Elements detected by ICP (ppm) | Example 15 | | | | Comparative Example 8 | | | |
|---|---|---|---|---|---|---|---|---|
| | Test sample | | | % of element dissolved from cathode to delamination solution | Test sample | | | % of element dissolved from cathode to delamination solution |
| | Cathode constituents after delamination | | | | Cathode constituents after delamination | | | |
| | Cathode electrode layer(s) | Current collector | Delamination solution | | Cathode electrode layer(s) | Current collector | Delamination solution | |
| Li | 67392 | — | 95 | 0.14 | 43042 | — | 290.1 | 0.67 |
| Ni | — | — | — | — | 298547 | — | 561.6 | 0.19 |
| Mn | — | — | — | — | 143410 | — | 461.2 | 0.32 |
| Co | 585987 | — | 59.1 | 0.01 | 108207 | — | 397.2 | 0.37 |
| Al | — | 451 | 8.2 | 1.79 | — | 4350 | 647.5 | 12.96 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method for delaminating a composite by immersing the composite into a delamination solution; wherein the composite comprises a substrate and a coating applied on one side or both sides of the substrate comprising a polymeric binder; wherein the polymeric binder comprises a copolymer comprising a structural unit derived from an acid group-containing monomer; and wherein the proportion of structural unit derived from an acid group-containing monomer is from about 15% to about 85% by mole, based on the total number moles of monomeric units in the copolymer in the polymeric binder.

2. The method of claim 1, wherein the copolymer further comprises a structural unit derived from a hydrogen bond-forming group-containing monomer that is selected from the group consisting of a nitrile group-containing monomer, an amide group-containing monomer, a hydroxyl group-containing monomer, an ester group-containing monomer, an epoxy group-containing monomer, a fluorine-containing monomer or combinations thereof.

3. The method of claim 2, wherein the proportion of structural unit derived from a hydrogen bond-forming group-containing monomer is from about 5% to about 85% by mole, based on the total number moles of monomeric units in the copolymer in the polymeric binder.

4. The method of claim 1, wherein the substrate is in the form of a foil, sheet, film or a combination thereof; wherein the substrate is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof; and wherein the substrate has a two-layered structure comprising an outer layer and an inner layer, wherein the outer layer comprises a conductive material and the inner layer comprises an insulating material or another conductive material.

5. The method of claim 4, wherein the conductive material is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof; and wherein the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer and combinations thereof.

6. The method of claim 1, wherein the acid group-containing monomer is selected from the group consisting of a carboxylic acid group-containing monomer, a sulfonic acid group-containing monomer, a phosphonic acid group-containing monomer or combinations thereof.

7. The method of claim 6, wherein the carboxylic acid group-containing monomer is selected from the group consisting of acrylic acid, methacrylic acid, crotonic acid, 2-butyl crotonic acid, cinnamic acid, maleic acid, maleic anhydride, fumaric acid, itaconic acid, itaconic anhydride, tetraconic acid, 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid, methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, maleic anhydride, methyl maleic anhydride, dimethyl maleic anhydride, acrylic anhydride, methacrylic anhydride, methacrolein, methacryloyl chloride, methacryloyl fluoride, methacryloyl bromide and combinations thereof.

8. The method of claim 6, wherein the sulfonic acid group-containing monomer is selected from the group consisting of vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid and combinations thereof.

9. The method of claim 6, wherein the phosphonic acid group-containing monomer is selected from the group consisting of vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid and combinations thereof.

10. The method of claim 1, wherein the copolymer further comprises a structural unit derived from a nitrile group-containing monomer and a structural unit derived from an amide group-containing monomer.

11. The method of claim 10, wherein the nitrile group-containing monomer is selected from the group consisting of acrylonitrile, α-halogenoacrylonitrile, α-alkylacrylonitrile, α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl) acrylonitrile, α-(chlorophenyl) acrylonitrile, α-(cyanophenyl) acrylonitrile, vinylidene cyanide and combinations thereof; and wherein the proportion of structural unit derived from a nitrile group-containing monomer is from about 15% to about 85% by mole, based on the total number moles of monomeric units in the copolymer in the polymeric binder.

12. The method of claim 10, wherein the amide group-containing monomer is selected from the group consisting of acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl) methacrylamide, N-(ethoxymethyl) methacrylamide, N-(propoxymethyl) methacrylamide, N-(butoxymethyl) methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide and combinations thereof; and wherein the proportion of structural unit derived from an amide group-containing monomer is from about 0% to about 35% by mole, based on the total number of moles of monomeric units in the copolymer in the polymeric binder.

13. The method of claim 1, wherein the delamination solution comprises a delamination agent and an aqueous solvent.

14. The method of claim 13, wherein the delamination agent is selected from the group consisting of formic acid, acetic acid, glycolic acid, glyoxylic acid, oxalic acid, propionic acid, acrylic acid, propiolic acid, lactic acid, 3-hydroxipropionic acid, glyceric acid, pyruvic acid, 3-oxopropionic acid, 2,3-dioxopropionic acid, malonic acid, tartronic acid, dihydroxymalonic acid, mesoxalic acid, glycidic acid, butyric acid, isobutyric acid, crotonic acid, isocrotonic acid, methacrylic acid, vinylacetic acid, tetrolic acid, 2-hydroxybutyric acid, 3-hydroxybutyric acid, 4-hydroxybutyric acid, 2-oxobutanoic acid, acetoacetic acid, 4-oxobutanoic acid, butanedioic acid, methylmalonic acid, fumaric acid, maleic acid, 2-hydroxybutanedioic acid, tartaric acid, oxaloacetic acid, dioxosuccinic acid, valeric acid, isovaleric acid, 2-methylbutiric acid, pivalic acid, 3-hydroxyvaleric acid, 4-hydroxypentanoic acid, 3-hydroxyisovaleric acid, glutaric acid, 2-oxoglutaric acid, 3-oxoglutaric acid, 2-furoic acid, tetrahydrofuroic acid, hexanoic acid, hexanedioic acid, citric acid, aconitic acid, isocitric acid, sorbic acid, pimelic acid, benzoic acid, salicylic acid, 4-carboxybenzoic acid, trimesic acid, mellitic acid, malic acid and combinations thereof; and wherein the aqueous solvent is water or a solution containing water as the major component and a minor component.

15. The method of claim 14, wherein the proportion of water in the aqueous solvent is from about 51% to about 100% by weight; and wherein the minor component is selected from the group consisting of methanol, ethanol, isopropanol, n-propanol, tert-butanol, n-butanol, acetone, dimethyl ketone, methyl ethyl ketone, ethyl acetate, isopropyl acetate, propyl acetate, butyl acetate and combinations thereof.

16. The method of claim 1, wherein the weight ratio of the composite to the delamination solution is from about 0.01% to about 5%.

17. The method of claim 13, wherein the concentration of the delamination agent in the delamination solution is from about 0.01% to about 1% by weight, based on the total weight of the delamination solution.

18. The method of claim 1, wherein the composite is immersed into the delamination solution for a time period of from about 15 minutes to about 120 minutes; and wherein the composite is immersed into the delamination solution at a temperature of from about 25° C. to about 95° C.

19. The method of claim 1, wherein the composite-delamination solution mixture is stirred at a speed of from about 10 rpm to about 3000 rpm; and wherein the composite-delamination solution mixture is stirred for a time period of from about 1 minute to about 120 minutes.

20. The method of claim 1, wherein the coating is an electrode layer.

21. The method of claim 20, wherein the electrode layer is a cathode electrode layer; and wherein the cathode electrode layer further comprises a cathode active material selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiCo_xNi_yO_2$, and combinations thereof, wherein each x is independently from 0.4 to 0.6; each y is independently from 0.2 to 0.4; and each z is independently from 0 to 0.1.

22. The method of claim 20, wherein the electrode layer is an anode electrode layer; and wherein the anode electrode layer further comprises an anode active material selected the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

23. The method of claim 13, wherein the delamination agent is a weak acid.

* * * * *